US008605754B2

(12) United States Patent  (10) Patent No.: US 8,605,754 B2
Siriwongpairat et al.  (45) Date of Patent: Dec. 10, 2013

(54) SYSTEMS AND METHODS FOR INTEROPERABILITY POSITIVE TRAIN CONTROL

(71) Applicant: MeteorComm LLC, Renton, WA (US)

(72) Inventors: Wipawee Siriwongpairat, Kent, WA (US); Thanongsak Himsoon, Kent, WA (US)

(73) Assignee: Meteorcomm LLC, Renton, WA (US)

( * ) Notice: Subject to any disclaimer, the term of this patent is extended or adjusted under 35 U.S.C. 154(b) by 0 days.

(21) Appl. No.: 13/718,729

(22) Filed: Dec. 18, 2012

(65) Prior Publication Data

US 2013/0107813 A1 May 2, 2013

Related U.S. Application Data

(62) Division of application No. 12/924,242, filed on Sep. 23, 2010, now Pat. No. 8,340,056.

(60) Provisional application No. 61/281,901, filed on Nov. 24, 2009, provisional application No. 61/277,507, filed on Sep. 25, 2009.

(51) Int. Cl.
*H04J 3/24* (2006.01)

(52) U.S. Cl.
USPC .......................................... 370/474; 709/236

(58) Field of Classification Search
None
See application file for complete search history.

(56) References Cited

U.S. PATENT DOCUMENTS

| 3,628,147 | A | | 12/1971 | Makino |
| 5,113,392 | A | * | 5/1992 | Takiyasu et al. .............. 370/473 |
| 5,335,357 | A | * | 8/1994 | Fennell et al. ................ 455/503 |
| 5,425,032 | A | | 6/1995 | Shloss et al. |
| 5,598,417 | A | | 1/1997 | Crisler et al. |
| 5,720,455 | A | | 2/1998 | Kull et al. |
| 5,721,725 | A | | 2/1998 | Want et al. |
| 5,721,732 | A | | 2/1998 | Emeott et al. |
| 5,896,561 | A | | 4/1999 | Schrader et al. |
| 6,026,083 | A | | 2/2000 | Albrow et al. |
| 6,084,969 | A | * | 7/2000 | Wright et al. ................ 380/271 |
| 6,275,739 | B1 | | 8/2001 | Ireland |
| 6,484,030 | B1 | | 11/2002 | Antoine et al. |
| 6,545,996 | B1 | | 4/2003 | Falco et al. |
| 6,711,144 | B1 | | 3/2004 | Kim et al. |
| 6,760,308 | B1 | | 7/2004 | Ghanma et al. |
| 6,778,557 | B1 | | 8/2004 | Yuki et al. |
| 1,365,556 | A1 | | 11/2006 | Brown et al. |

(Continued)

OTHER PUBLICATIONS

U.S. Appl. No. 11/985,809, filed Nov. 16, 2007, Fulthorp et al.

(Continued)

*Primary Examiner* — Bunjob Jaroenchonwanit
(74) *Attorney, Agent, or Firm* — Thompson & Knight LLP; James J. Murphy

(57) ABSTRACT

A method of messaging in a communications system includes generating a message at an application layer. The message and associated message handling codes are passed to a transport layer and the message fragmented. The fragmented message and the message handling codes are passed to a network layer and the fragmented message selectively segmented as indicated by the message handling code. The selectively segmented message and the message handling code are passed to a link layer and formed into a packet including packet type information and data parts. The packet is passed to a physical layer and a preamble is added. The preamble and packet are transmitted with a radio.

20 Claims, 31 Drawing Sheets

(56) References Cited

U.S. PATENT DOCUMENTS

| | | | |
|---|---|---|---|
| RE39,454 E * | 1/2007 | Cantoni et al. | 370/473 |
| 7,305,009 B2 | 12/2007 | Gaskill | |
| 7,388,849 B2 | 6/2008 | Kim et al. | |
| 7,546,135 B2 | 6/2009 | Janky et al. | |
| 7,639,663 B1 | 12/2009 | Nerses et al. | |
| 7,664,130 B2 | 2/2010 | Sakoda et al. | |
| 7,719,981 B2 | 5/2010 | Ghanma et al. | |
| 7,729,321 B2 | 6/2010 | Liu | |
| 7,729,372 B2 | 6/2010 | Yonge et al. | |
| 7,738,608 B2 | 6/2010 | Feher | |
| 7,808,892 B1 | 10/2010 | Babcock et al. | |
| 7,813,373 B2 | 10/2010 | Joshi et al. | |
| 7,822,059 B2 | 10/2010 | Katar et al. | |
| 7,826,818 B2 | 11/2010 | Gollnick et al. | |
| 2002/0071413 A1 | 6/2002 | Choi | |
| 2003/0078006 A1 | 4/2003 | Mahany | |
| 2003/0123484 A1* | 7/2003 | Harriman | 370/471 |
| 2003/0137986 A1 | 7/2003 | Kaku et al. | |
| 2003/0214417 A1 | 11/2003 | Peltz et al. | |
| 2003/0223387 A1 | 12/2003 | Davenport et al. | |
| 2004/0156342 A1 | 8/2004 | Amouris | |
| 2004/0208243 A1 | 10/2004 | Feher | |
| 2004/0240411 A1 | 12/2004 | Suzuki | |
| 2005/0180453 A1 | 8/2005 | Gaskill | |
| 2006/0167784 A1 | 7/2006 | Hoffberg | |
| 2006/0209746 A1 | 9/2006 | Asai et al. | |
| 2007/0025383 A1 | 2/2007 | Katar et al. | |
| 2007/0072560 A1 | 3/2007 | Ishikawa | |
| 2007/0076745 A1 | 4/2007 | Manjeshwar et al. | |
| 2007/0195798 A1 | 8/2007 | Peng et al. | |
| 2007/0229270 A1 | 10/2007 | Rofougaran | |
| 2007/0230497 A1 | 10/2007 | Choi et al. | |
| 2009/0010233 A1 | 1/2009 | Pratt, Jr. et al. | |
| 2009/0054033 A1 | 2/2009 | Pratt, Jr. et al. | |
| 2009/0310571 A1 | 12/2009 | Matischek et al. | |
| 2013/0107813 A1* | 5/2013 | Siriwongpairat et al. | 370/328 |

OTHER PUBLICATIONS

International Search Report, PCT/US2010/002611.

* cited by examiner

SYSTEMS AND METHODS FOR INTEROPERABILITY POSITIVE TRAIN CONTROL

CROSS-REFERENCE TO RELATED APPLICATION

The present application is a divisional of pending U.S. patent application Ser. No. 12/924,242, filed Sep. 23, 2010, which claims the benefit of U.S. Provisional Patent Application Ser. No. 61/277,507, filed Sep. 25, 2009, and U.S. Provisional Patent Application Ser. No. 61/281,901, filed Nov. 24, 2009.

FIELD OF THE INVENTION

The present invention relates in general to wireless communications techniques and in particular to methods systems and methods for interoperability positive train control.

BACKGROUND OF THE INVENTION

In any transportation industry, reliable communications systems are mandatory for avoiding serious, if not catastrophic, accidents. In the particular case of the railroads, the railroad central offices normally communicate through wired telecommunications links with a network of radio base stations, which are typically dispersed over very large geographical areas. The radio base stations in turn maintain wireless communication links with locomotives, service vehicles, and wayside systems operating within the base station coverage areas.

In designing and operating a communications system for a transportation industry, a number of different constraints must be addressed. In the railroad industry, for example, a reliable and efficient communications system must be capable of handling different types of information, including data transmitted from the railroad central office and wayside systems to the locomotive on-board computers, as well as voice transmissions between train crews and the central office.

One particularly critical application for wireless communications is in interoperability positive train control systems. A positive train control (PTC) system is a system that is designed for the express purpose of preventing train-to-train collisions, over-speed derailments, incursions into established work zone limits, and the movement of a train through a switch left in the wrong position. A PTC system is "interoperable" if it allows locomotives of a host railroad and a tenant railroad to communicate with and respond to the PTC system, while supporting uninterrupted movements over property boundaries. Interoperability PTC (IPTC) systems have been mandated for some railroads under the Rail Safety Improvement Act of 2008 (Public Law 110-432 of 2008).

Any wireless system communication system used in an IPTC system must not only meet the requirements and goals of the Rail Safety Improvement Act of 2008, but also must meet the transmission band requirements mandated by the Federal Communications Commission (FCC), including, for example, those related to frequency band allocation, channel width and spacing. Moreover, in addition to meeting all of the government imposed requirements, an IPTC system must also meet all of the engineering demands placed on any system being deployed in the harsh railroad operating environment.

SUMMARY OF THE INVENTION

The principles of the present invention are embodied in methods and systems for supporting railroad communications, particularly interoperability positive train control systems. According to one representative embodiment, a method is disclosed for implementing communications in a railroad communications system having a base station radio and remote radios, the remote radios including a mobile radio and a wayside radio. A common radio communications channel is assigned for allowing a remote radio to connect with the base station radio using a carrier sense multiple access (CSMA) communications protocol. A local channel is assigned for allowing communications between the radio base station and the remote radios and between the remote radios, wherein communications on the local channel utilizes a selected one of fixed time division multiple access (FTDMA) and dynamic time division multiple access (DTDMA) communications protocols.

According to another representative embodiment, a method of messaging in a railroad communications system is disclosed, which includes generating a message with at an application layer, the message associated with a message handling code. The message and the message handling codes are passed to a transport layer and the message is fragmented. The fragmented message and the message handling code are passed to a network layer implemented, where the fragmented message is selectively segmented as indicated by the message handling code. The selectively segmented message and the message handling code are passed to a link layer and a packet is formed, which includes packet type information and data parts. The packet is passed to a physical layer and a preamble is added. The preamble and packet are transmitted with a radio.

The embodiments of the principles of the present invention realize a number of significant advantages. Among other things, using a combination of FTDMA, DTDMA, and CSMA protocols, groups of fixed and mobile radios (e.g. locomotive radios, base station radios, and wayside radios) can efficiently communicate within the constraints imposed by the FCC, including restrictions on frequency band allocation, channel width and spacing, transmission power, and so on. Embodiments of the principles of the present invention are particularly advantageous in implementing ITPC systems, since they support multi-channel communications, prioritized messaging, wayside monitoring, and unicast and broadcast transmissions, among other things. These principles can be implemented using different radio frequency waveforms and data bit rates. Messages can be forward error correction encoded or transmitted without forward error correction encode, as required to optimize efficiency.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-35 of the drawings, in which like numbers designate like parts. Definitions of selected terms and acronyms used in the present text and drawings are provided in Table 1 of the Appendix.

Figure 1:
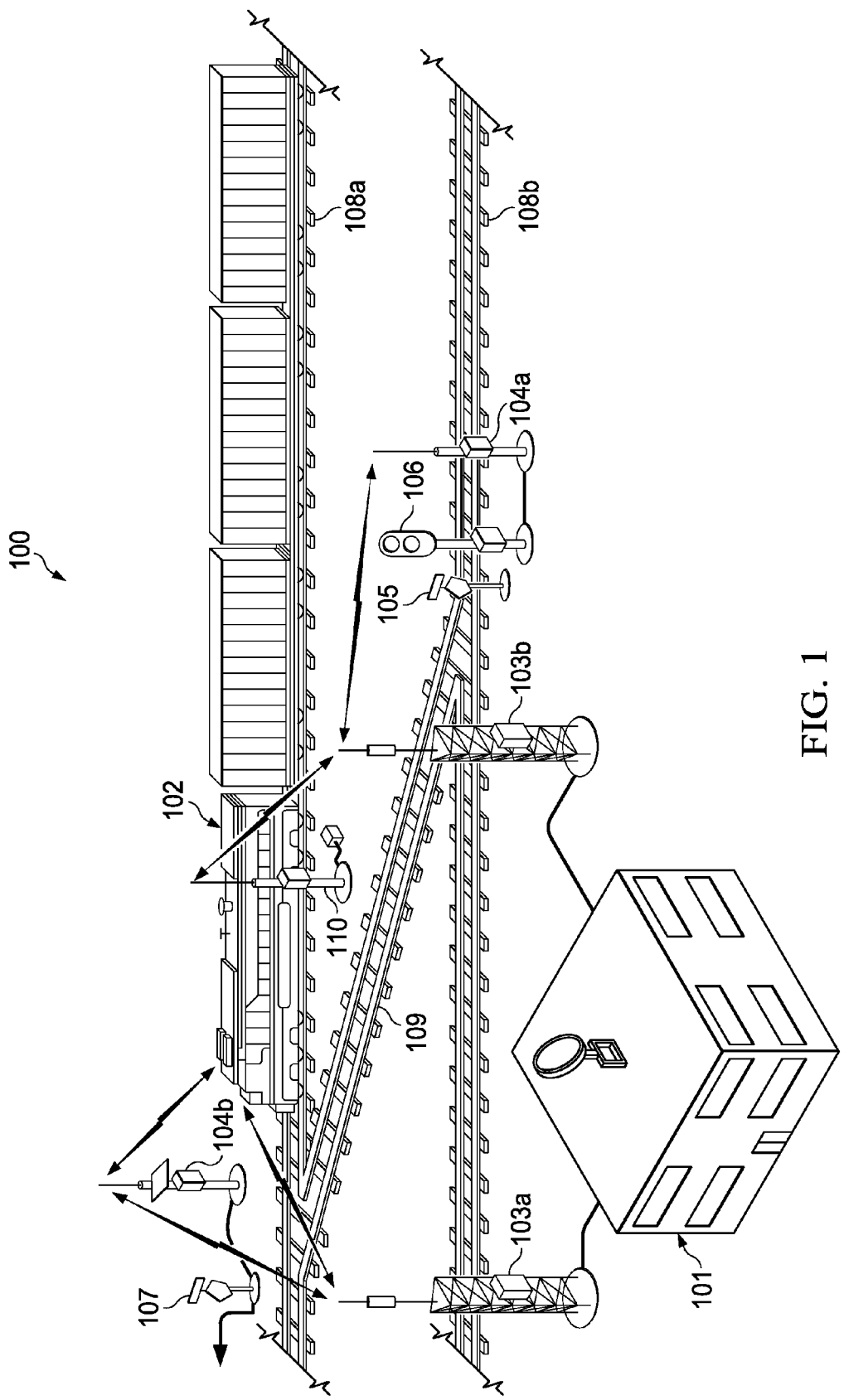
FIG. 1 is a high level block diagram of a small portion of a representative communications system utilized in the railroad industry and suitable for describing a typical application of the present inventive principles.

FIG. 1 is high-level diagram showing a small portion of a railroad communications system 100 embodying the principles of the present invention. Generally, system 100 supports wireless communications between a central office (network operating center) 101 and locomotives 102 and other railroad vehicles located at various points around a rail system, as well as direct communications between locomotives 102 and the electronic wayside monitoring subsystems, discussed below in detail.

In communications system 100, central office 101 communicates with packet data radios on locomotives 102 through a wired telecommunications network and a series of packet radio base stations dispersed over thousands of square miles of geographical area through which the rail system operates. In the diagram of FIG. 1, two radio base stations 103a and 103b are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101, though base stations 103. FIG. 1 shows two representative wayside monitoring subsystems 104a and 104b. As examples of typical uses of wayside monitoring subsystems 104, wayside monitoring subsystem 104a is shown monitoring a switch 105 and a signal 106, and wayside monitoring subsystem 104b is shown monitoring a hand-throw switch 107. Also for illustrative purposes, two parallel sections of track 108a and 108b and a connecting section 109 are shown in FIG. 1, which represent only a very small part of the overall track system.

In the following discussion, "remote" radios means radios disposed on locomotives 102 and other railroad vehicles, the radios at waysides 104, and other radios geographically separated from central office 101 and which are not radios at base stations 103. Mobile remote radios are those radios disposed on locomotives 102 and other railroad vehicles.

The present inventive principles are generally embodied in wireless communications systems for IPTC applications. One challenge with such IPTC applications is the need to maintain multiple communications paths between various communications nodes within the system. In addition, these multiple communications paths must support the exchange of different types of information while still meeting all of the wireless regulatory requirements imposed by the FCC.

For example, a communication path must be maintained between mobile remote radios on locomotives 102 and central office 101 to support the exchange of such information as locomotive location reports, locomotive health and diagnostic data, movement authorities, files, and network management data. Another communication path must be established between the mobile remote radios on railroad non-locomotive vehicles (not shown) and the central office 101. The data traffic in this path includes vehicle location reports, work reports, email, and material requisitions.

Another set of communication paths are required for maintaining communications with the fixed remote radios at railroad waysides 104. In this case, a communication path is required between the radios at waysides 104 and central office 101 for supporting signal system health and status monitoring, centralized control of control points, and wayside defect detector system data and alarms. A further communication path is required between the mobile radios on locomotives 102 and the radios at waysides 104, which supports wayside status updates provided to locomotives 102 in the proximity of a given set of waysides. (In a PTC system, trains require a status update from each approaching wayside. For each wayside 104 within 3.5 miles ahead of a train, the age of the wayside status must not exceed 12 seconds with six 9s (i.e., 99.9999%) reliability. It is also desirable that the wayside status updates are forwarded to central office 101.)

Finally, another communications path is required between the mobile remote radios on locomotives 102 and non-locomotive railroad vehicles and the mobile remote radios on other locomotives 102 and non-locomotive railroad vehicles. This path supports peer-to-peer proximity position reports so that one mobile radio is aware of the locations of nearby mobile radios.

For IPTC applications, the FCC has allocated frequency channels in the 222 MHz band for providing all data communication paths for wireless communication in the IPTC system. In particular, the frequency channels in the 220 MHz band are paired into base radio frequency channels and mobile radio frequency channels, with each base radio transmit frequency taken from the 220-221 MHz range and paired with a mobile radio frequency from the 221-222 MHz range. Currently, according to FCC regulations, a mobile radio may transmit or receive on either a mobile radio or base radio frequency, while a base radio can transmit only on a base radio frequency. In the future, the FCC may also allow a base radio to transmit on a mobile radio frequency, subject to certain to antenna height and power restrictions. For example, a base radio transmitting on a mobile radio frequency may be restricted to antennas of less than 7 meters in height or to powers less that 50 Watts ERP.

The multi-channel capability of a software defined radio (SDR) provides several advantages, particularly in railroad applications. Among other things, with multi-channel capability, a locomotive 102 can receive information from a base station 103 and a wayside monitoring subsystem 104 simultaneously. Additionally, locomotives 102 and base stations 103 can receive status messages from multiple wayside monitoring subsystems 104 simultaneously. This in turn provides the ability to support communications with a high density of waysides in city areas, which is highly desirable in IPTC systems.

The subsystems within railroad communications system 100 operate in conjunction with external link manager (ELM), which is a software application that is the bridge between an ITC Messaging System, running on a host computer and the ITC 220 MHz wireless network. The ELM preferably runs on the same hardware platform as the rest of the ITC Messaging System in an area. For example, in the office area, the ELM will run on an office server, and in the locomotive and wayside areas, the ELM will run on a processor within equipment local to the area. In railroad communications system 100, all primary communications to and from a given radio are made through an ELM.

Radios 200 preferably connect to the ELM though an Ethernet connection, using a wire interface protocol designated the host/radio exchange protocol. The ITC Messaging System preferably expects each non-IP underlying transport to provide an ELM that will hide the details of the underlying transport and provide a consistent interface into that transport.

Figure 2A:
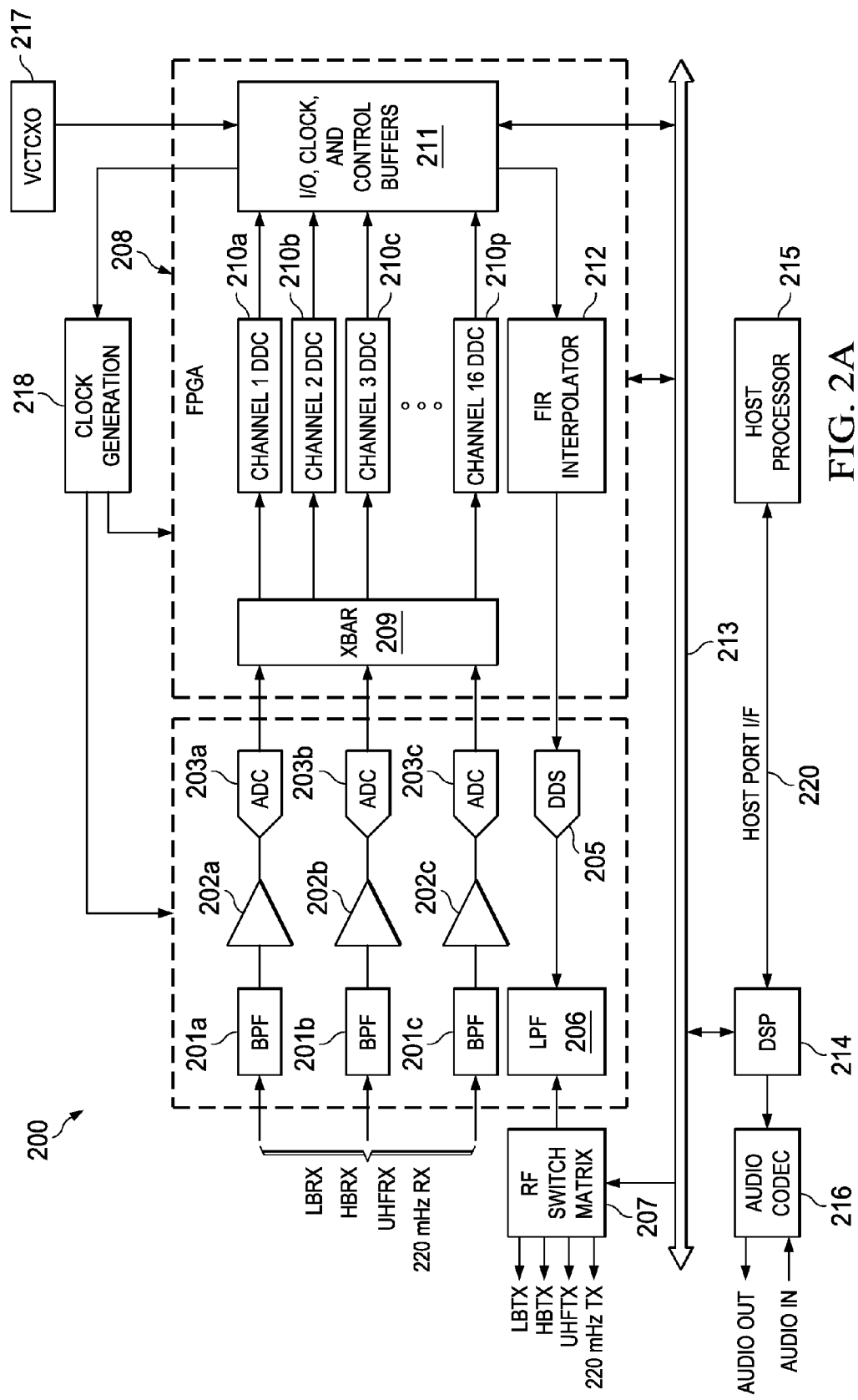
FIG. 2A is a block diagram of the primary operational blocks of a representative software defined radio (SDR) suitable for practicing the principles of the present invention.

FIG. 2A is a block diagram of an exemplary multiple-channel software defined radio (SDR) 200 particularly suitable for practicing the principles of the present invention described in detail below. It should be recognized, however, that different radios, as well as different configurations of SDR 200, could be utilized to practice these principles, depending on the needs of the particular application.

Among other things, SDR 200 realizes the significant advantage of allowing multiple information (voice and data) channels to be simultaneously received on multiple radio frequency (RF) input bands and then simultaneously demodulated using multiple parallel data processing paths. Particularly advantageous is the fact that these information channels can have different frequencies, channel spacing, modulation types, and bit rates. In other words, SDR 200 performs multiple simultaneous receive operations typically requiring a corresponding number of single-channel receivers. Furthermore, SDR 200 also supports simplex data transmission on a selected transmission channel and RF frequency band.

In exemplary system 100 of FIG. 1, SDR radio 200 may be used in base stations 103, locomotives 102, and wayside monitoring subsystems 104. As discussed below, because of its file ability, SDR 200 can be particularly configured as required to meet the requirements of each of these particular applications.

Various communications protocols have been used to support data communications in railroad communications systems. These include a protocol for Interoperable Train Control communications (ITCNET), which is the primary subject of this disclosure, MBNET, which is a communication protocol for extended line of sight communications, Advanced Train Control Systems (ATCS), which specifies a communication protocol for railroad operations, Higher Performance Data Radio (HPDR), which is a wireless communication protocol for railroad communication that supports integration of voice and data transmission, and voice protocols. Generally, ITCNET operates in the 220 MHz band; MBNET operates on a single frequency in three bands: low band VHF, high band VHF, and UHF; ATCS operates in the 900 MHz UHF band and HPDR operates in the 160 MHz band. For railroad communications, analog voice is typically 12.5 kHz data and digital voice is typically 6.25 kHz data.

The illustrated embodiment of SDR 200 operates under any of the ITCNET, MBNET, ATCS, or HPDR protocols, and supports 12.5 kHz analog and 6.25 digital voice, as well. Consequently, SDR 200 transmits and receives data on four (4) RF frequency bands. In the preferred embodiment, the receive bands include low band VHF (39-50 MHz), high band VHF (151-163 MHz), the 220 MHz band (217-222 MHz), and the UHF band (935-940 MHz). The transmit bands include low band VHF (39-50 MHz), high band VHF (151-163 MHz), the 220 MHz band (217-222 MHz), and the UHF band (935-940 MHz).

In order to meet the requirements of the various communications protocols, SDR 200 supports multiple both linear and constant envelope modulation waveforms. Examples of supported linearly modulated signals include DQPSK and $\pi/4$ DQPSK signals. Examples of supported constant envelope modulation signals include 4FM, SOQPSK, GMSK, and GFSK signals. These modulation techniques, which are well known in the art, can be generally be described as follows.

Differential Quadrature Phase Shift Keying (DQPSK) is a linear modulation waveform that relies on the difference between successive phases of a signal rather the absolute phase position. DQPSK modulation uses 2 bits per symbol and a symbol rate of half the bit rate. A variation of DQPSK waveform, called π/4 DQPSK waveform, is a DQPSK waveform with phase transitions rotated by 45°. The π/4 DQPSK waveform, as used in the ITCNET protocol, utilizes a root raised cosine (RRC) pulse shaping filter with the roll-off factor of 0.35. The waveform provides a channel bit rate of 32 kbps in the 25 kHz channel under emission mask 5×F, and a bit rate of 16 kbps in the 12.5 kHz channel under the same emission mask.

4-Level Frequency Modulation (4FM) is a type of constant envelope and continuous phase modulation that carries the information in the frequency of the signal. In particular, in 4FM signaling the carrier is shifted in frequency at a particular rate to a particular location around a center frequency. This allows for each of the four states to represent a binary number, with each state representing a symbol that contains two bits of information. The symbol rate of 4FM signal is half the bit rate. The 4FM waveform is used in the ITCNET and HPDR protocols, using an RRC pulse shaping filter having a roll-off factor of 0.35 for both protocols. The 4FM waveform provides a bit rate of 16 kbps in the 25 kHz channel under emission mask 5×F for the ITCNET protocol, and a bit rate of 24 kbps in the 25 kHz channel under emission mask D for the HPDR protocol.

Shaped-Offset Quadrature Phase Shift Keying (SOQPSK) is a type of constant envelope and continuous phase modulation technique based on a constrained ternary data alphabet. There are two versions of SOQPSK that are widely used, specifically, the military-standard version, SOQPSK-MIL, and the one adopted in the telemetry group, SOQPSK-TG. The SOQPSK-MIL version uses a rectangular pulse shaping filter that spans a single bit time, which gives a full response. The SOQPSK-TG version has a pulse shaping filter that spans eight bit times, which gives a partial response. In the ITCNET protocol, the waveform is based on a SOQPSK-TG pulse, which provides a bit rate of 16 kbps in the 25 kHz channel under emission mask 5×F.

Gaussian Minimum Shift Keying (GMSK) uses a constant envelope and continuous phase modulation to carry information in the frequency of the signal. Specifically, the GMSK waveform is a continuous-phase frequency-shift keying modulation scheme with a Gaussian pulse shaping filter and a frequency separation of one-half the bit rate (i.e., the frequency shift is such that over a bit period the phase of the carrier changes by 90 degrees). A shift of half the bit rate corresponds to the modulation index of 0.5. The symbol rate of a GMSK signal is the same as the bit rate.

The GMSK waveform is used in the MBNET and HPDR protocols and supports various bit rates by allowing an adjustment of the bandwidth-time product (BT) of the Gaussian pulse shaping filter. In the MBNET protocol, the GMSK waveform provides bit rates of 9.6 kbps at BT=1 and 19.2 kbps at BT=0.22 in a 25 kHz channel under emission mask C. The GMSK waveform also provides a bit rate of 9.6 kbps in a 12.5 kHz channel at BT=0.28 under emission mask D and BT=0.33 under emission mask J. In the HPDR protocol, the GMSK waveform provides a bit rate of 9.6 kbps at BT=0.3 in 25 kHz channel under emission mask C.

Gaussian Frequency Shift Keying (GFSK) utilizes constant envelope modulation and carries information in the frequency of the signal. More particularly, GFSK is a Frequency Shift Keying modulation technique that uses a Gaussian for pulse shaping to smooth positive/negative frequency deviations, which represent a binary 1 or 0. While GMSK modulation has an exact frequency shift of half the bit rate, there is no limit on the exact shift for the GFSK modulation. The modulation index of a GFSK signal can thus be any value between 0 and 1, while the modulation index of a GMSK signal is always 0.5. The symbol rate of a GFSK signal is the same as the bit rate.

The GFSK waveform is used in the ATCS protocol. In the ATCS protocol, a Gaussian filter with BT=0.5 is used as the pulse shaping filter and the waveform provides a bit rate of 4.8 kbps in a 12.5 kHz channel under emission mask J. The frequency deviation is 1.7 kHz, which results in the modulation index of 0.7.

As shown in FIG. 2A, the receive bands (LBRX, HBRX, UHFRX, 220 MHz) are provided with three (3) independent hardware paths including an analog bandpass filter (BPF) 201a-201c, an intermediate frequency (IF) amplifier 202a-202c, and an analog to digital converter (ADC) 203a-203c. In the illustrated embodiment, BPFs 201a-201c have a passband of approximately 39-90 MHz, IF amplifiers 202a-202c provide approximately 21 dB of gain with bypass, and ADCs 203a-203c operate at a sampling rate of 57.6 Msps and have an output resolution of fourteen (14) bits. (Front end modules [not shown] perform low-noise amplification and down-convert signals received on the HBRX and the UHFRX bands into the 39-90 MHz IF bands at the inputs to BPFs 201b and 201c). Filters 201a-201c reduce spurious noise generated elsewhere in the system and suppress energy that would otherwise be sampled outside the first two (2) Nyquist zones. IF amplifiers 202a-202c improve the noise figure at the inputs to ADCs 203a-203c. The particular receive hardware parameters may change based on the specific design and application of SDR 200.

The RF transmit path includes a direct data synthesizer (DDS) 204, which performs digital sinusoidal carrier frequency generation and digital to analog conversion, and an analog lowpass filter (LPF) 206. In the illustrated embodiment, LPF 206 has a corner frequency of approximately 90 MHz and passes signals in the 39-90 MHz IF band to an RF switch matrix 207. RF switch matrix 207 switches the IF signals to corresponding transmit modules (not shown), which generate the ultimate RF signals within the appropriate RF transmit band (LBTX, HBTX, UHFTX, or 220 MHz).

According to the principles of the present invention, SDR 200 is based upon a field programmable gate array (FPGA) 208, which may be, for example, an Altera EP2C35 FPGA. Generally, FPGA 208 and accompanying firmware act as a multi-channel receiver tuner and transmit modulator interpolator. FPGA 208 implements, for example, signal routing, channel turning, frequency down conversion, gain control, and CORDIC rotation (Cartesian to polar conversion) independently and simultaneously on multiple input channels.

As shown in FIG. 2A, FPGA 208 implements a cross-bar switch 209, which routes up to sixteen (16) input channels provided by the three (3) receive paths. The sixteen (16) channels of data are processed by sixteen (16) corresponding direct data converters (DDCs) 210a-210p, which will be discussed in detail in further conjunction with FIG. 2B. Any or all of the sixteen (16) DDCs 210a-210p can be routed to any one of the four (4) sampled RF receive bands (LBRX, HBRX, UHFRX, 220 MHz). The simultaneous processed channels can be made up of data channels, voice channels, or a combination of voice and data. Additionally, each channel can be set for a different channel frequency and spacing, modulation type, and bit rate, for example, 9600 bps GMSK data in a 12.5 kHz channel, voice in a 25 kHz channel, 19200 bps GMSK data in a third 25 kHz channel, and 9600 bps 4FM data in a 6.25 kHz fourth channel. Two antennas may be used for each frequency channel to implement receive diversity.

The DDC output vectors from each DDC 210a-210d include Cartesian (I and Q), along with magnitude, phase, and instantaneous frequency, which support data and voice demodulators operating on polar data. The outputs from DDDs 210a-210p are stored in registers within I/O, Clock, and Control Buffers circuit block 211, also implemented within FPGA 208. For the transmit path of SDR 200 (buffers), FPGA 208 implements a finite impulse response (FIR) interpolator 211.

FPGA 208 operates in conjunction with a bus 213 and digital signal processor 214. In the illustrated embodiment, DSP 214 is a Texas Instruments DSP, which supports multiple channel demodulation operations, as defined in firmware. DSP 214 also runs digital signal coding for forward error correction (FEC) and privacy, and can support digital voice decoding using commercially available vocoder firmware applications. Advantageously, SDR 200 redistributes the computational load between FPGA 208 and DSP 214 such that a large portion of the high speed DSP processing typically found in existing radio receivers, for example CORDIC rotation and frequency differentiation, is now implemented in FPGA 208.

A direct memory access (DMA) system implemented with DSP 214 enables the transfer and buffering of blocks of data samples between buffers within buffers block 211 and the DSP memory space. For example, when a prescribed block length of receive data processed by a DDC 210a-210d has been collected within buffer, DSP 214 retrieves those data blocks using DMA and performs the balance of the data or voice demodulation tasks. DSP 214 then outputs from one (1) to four (4) user data streams to host processor 215 via host port interface 220. One (1) of those data streams can be a voice channel routed to an audio codec 216 after preprocessing by DSP 214. Audio codec 216 emits an analog voice audio signal.

Host processor 215 downloads the boot code configuring FPGA 206 and DSP 214. Advantageously, boot downloading can be performed before or after field deployment of SDR 200, and allows field code upgrades to the FPGA, DSP, and host operating systems.

A voltage controlled temperature compensated crystal oscillator (VCTCXO) 217 establishes the time base for the circuitry of SDR 200. In the illustrated embodiment, VCTXO 217 generates a 19.2 MHz clock signal, which is level shifted and buffered within FPGA 208 and then provided to DSP 214 as the master clock (mcLK) signal. This clock signal is also provided as a reference signal to clock generation circuitry 218. Clock generation circuitry 218 includes a 921.6 MHz frequency synthesizer, for example a National Semiconductor LMX2531 frequency synthesizer, along with frequency dividers and level shifters. Clock generation circuitry 218 provides a set of clock signals, and in particular, a 57.6 MHz clock signal for driving ADCs 203a-203c, as well as the clock signals needed by DDS 205 and DDCs 210a-210p.

Figure 2B:
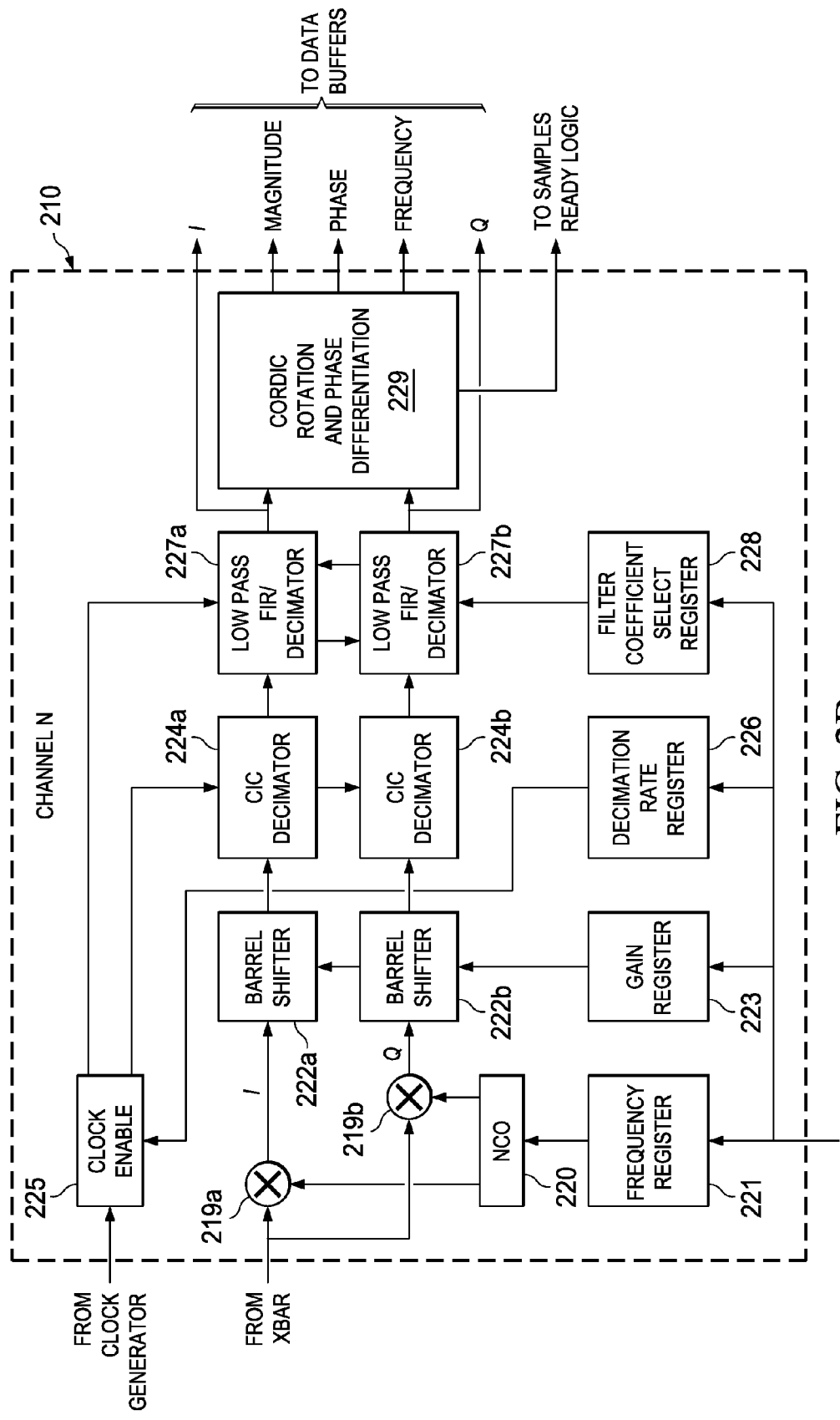
FIG. 2B is a more detailed block diagram of a selected one of the direct data converters (DDC) shown in FIG. 2A.

FIG. 2B is a more detailed block diagram of a selected one of DDCs 210a-210p of FPGA 208. As shown in FIG. 2B, digital mixers 219a and 219b, which are driven by numerically controlled digital oscillator (NCO) 220, generate in-phase (I) and quadrature (Q) signals from the input data received from crossbar switch 209. NCO oscillator 220 is controlled by frequency control data loaded into frequency register 221. Frequency register 221, gain register 223, decimation rate register 226, and filter coefficient register 228 are loaded from bus 213 by DSP 214. In the illustrated embodiment, host 215 sends DSP 214 digital receive and transmit values in Hz, which are then validated and converted into appropriate numerical values, and then stored in the corresponding register. (In alternate embodiments, host 215 may directly the load registers within FPGA 208 using the DSP DMA system.)

The I and Q signals are shifted in barrel shifters 222a-222b, under the control of data stored within gain register 223. Generally, barrel shifters 222a-222b selectively shift the bits of each value output from the corresponding mixer 221a-221b to double the digital gain for each bit shifted (with sign bits maintained in their current states).

The I and Q signals are then filtered and decimated by corresponding cascaded integrator-comb (CIC) filters 224a-224b, under the control of clock enable signals generated by clock enable circuit block 225 and the data loaded into decimation rate register 226. In the preferred embodiment, where the input data stream is received at 57.6 Msps, CIC filters 224a-224b decimate by 1200 in response to 48 kHz clock enable signals.

After decimation, the I and Q data streams are lowpass filtered and further decimated by lowpass filters (LPFs) 227a and 227b, also enabled by clock enable block 221. The FIR filter coefficients are selected through filter coefficient select register 228. In the preferred embodiment, LPFs 227a and 227b are 200-tap FIR filters that implement a cutoff frequency of 6 kHz. The decimated and filtered I and Q samples are then sent to buffers within buffers block 211 of FIG. 2A for collection into blocks for use in signal demodulation by DSP 214.

Each DDC 210a-210d also includes CORDIC rotation and phase differentiation circuitry 229, which generates digital magnitude, phase, and instantaneous frequency information. This feature advantageously supports demodulation algorithms running on DSP 214 that utilize polar data.

During data transmission processing, data packet bits received by DSP 214 through host port 220 from host processor 215 are converted to bipolar format and then passed to buffers within FPGA 208. FPGA 208 then performs pre-modulation FIR filtering (e.g. Gaussian for GMSK modulated data) and interpolation within FIR interpolating filter block 212. The resulting data are combined with the carrier frequency data and sent to DDS 205 for conversion into analog form and ultimate transmission as an RF signal.

For analog voice transmission, voice samples received by DSP 214 from voice Codec 216 are preprocessed prior to delivery to FPGA 208. In the illustrated embodiment, DSP 214 implements analog voice processing operations including pre-emphasis filtering, amplitude limiting, and a FIR filtering for voice frequency band limiting.

As discussed above, the DSP implemented functions, for example modulation and demodulation, generate or operate on blocks of samples that are contained in sample buffers within buffers block 211 of FPGA 208. These sample buffers are maintained by the DSP DMA system. Generally, the DSP DMA and hardware interrupt system services sample buffers for transferring data to and from DSP 214 to peripherals, such as FPGA 208. In the preferred embodiment, the DMA system supports up to eighteen (18) simultaneously active DMA channels, allocated as sixteen (16) receive channels, one (1) transmit channel, and one (1) audio channel.

In particular, the DMA system generates a real time interrupt when a new block of samples is ready (in the receive mode) or data are needed (in the transmit mode) for processing by DSP 214. Generally, the interrupt rate is derived from the system clock and is integrally related to the sampling frequencies, which can range from two (2) to ten (10) times the bit rate of the data stream being processed. In the case of transmission processing, the sample buffers are at the output of the signal processing chain, while during reception processing, the sample buffers are at the input of the signal processing chain.

Receive and transmit band and channel control is implemented by a set of tables accessed by DSP 214 and populated by host processor 215 on system start-up. The channel palette defines, in the preferred embodiment, up to twenty one (21) receive and transmit frequency pairs, along with the modulation parameter value that selects modulation type, FCC designated channel spacing, and bit rate. A channel palette validate routine validates the channel palette contents at system start up and whenever called by host processor 215 after a channel palette change. Generally, valid and invalid receive channels are marked, with the corresponding transmit channel of the pair similarly assumed valid or invalid. Unused channels are indicated by zeros.

A channel assignment table, which is a subset of the channel palette, identifies up to sixteen (16) active assigned receive channel numbers from the validated channel palette. The active assigned channels tune DDCs 210a-210p.

For signal reception on the sixteen (16) assigned receive channels, sixteen (16) corresponding sets of dual sample receive buffers are established in buffers block 211 of FPGA 208. Each pair of buffers stores either the I and Q output data or the phase, magnitude, and instant frequency output data generated by the associated DDC 210a-210p. In a ping-pong fashion, one dual sample buffer is filled by the DMA system while the other dual sample buffer is accessed to provide a sample block to the appropriate DSP demodulator routine. Whenever a sample block buffer is filled, a DMA interrupt occurs and its service routine moves the ping-pong buffer pointer(s) to the alternate buffer of the pair.

During voice operations, audio data samples are transferred by DMA between audio codec 216 and one of a pair of ping-pong audio sample buffers. Specifically, a single ping-pong buffer pair is used to transfer modulation samples from DSP 214 to FPGA 208 while the transmitter is keyed. FPGA 208 then accesses samples from one buffer and when that buffer is empty, the DMA system requests a new sample block from DSP 214 via an interrupt.

In the illustrated embodiment, host processor 215 can initiate transmission on one (1) active transmit channel defined in the channel assignment table. Specifically, a transmit key command, which indicates which of the assigned channels to transmit on, initiates a transmit operation. A receive stop routine interrupts reception on the selected channel. The corresponding modulation routine (e.g. GMSK, 4FM) being run by DSP 214 is initiated, along with activation of the required RF transmit circuits (not shown). A transmit state machine within FPGA 208 is enabled, such that FGPA 208 begins to generate interrupts to DSP 214 to transfer data into the ping-pong transmit buffers. On data channels, either individual transmit packet bytes or the entire packet is transferred to DSP 214 from host processor 215 via host processor interface 220.

Tasks being executed by DSP 214 are put into a task buffer, with each task indicating that an incoming block of samples is ready for processing by the given modulation routine being executed or that the samples in the current transmit buffer have been expended. Once the oldest task is begun, it runs to completion before the next oldest task is called. In particular, the transmit DMA interrupt from FPGA 208 enters the DSP transmit data modulator task in the next available position in the task buffer. When the task loop calls it, the modulator subroutine runs using packet data bits as input. DSP 214, through the DMA system, fills one of the data transmit sample block ping-pong buffers, as its output and then returns to the task buffer to start the next task.

Generally, the baseband modulation routine running on DSP 214 implements data pre-coding. The resulting output samples are scaled to generate a precise frequency offset that is interpolated by a FIR pre-modulation filter and then added to the carrier frequency phase increment in FPGA 208. The phase increment information is used by transmit DDS 205 to generate the desired carrier frequency.

During transmit of analog voice, audio codec 216 quantizes the voice or audio tone input from a microphone (not shown) into 16-bit pulse code modulation (PCM) samples at a fixed rate of around 8 ksps. These samples are collected by the DMA system into audio sample blocks. The baseband voice processor implemented by DSP 214 provides audio pre-emphasis (band-limited differentiation), amplitude limiting (clipping), and lowpass band limiting to about 3 kHz. The resulting samples are scaled for proper frequency deviation and placed in one of the transmit block sample buffers for use by FPGA 208.

During reception, if the desired reception channel has a valid entry in the channel table, the channel is activated. The phase increment is calculated and sent to FPGA 208 and the appropriate demodulation routine on DSP 214 is initiated. The applicable RF front end circuitry (not shown) is energized and initialized, as required. The DMA channel for the assigned DDC 210a-210d within FPGA 208 is also initialized and the DMA appropriate block interrupt is enabled. The DMA block interrupt, which is at the sample block rate, then controls transfer of sample blocks from FPGA 208 to DSP 214.

An interrupt service routine enters receive tasks each time a complete block of either I and Q or magnitude, phase, and instantaneous frequency data has been received in the corresponding receive ping-pong buffer. When the receive task is called, the receive sample block is operated on by the demodulation subroutines running on DSP 214. As discussed above, DDCs 210a-210d advantageously relieve DSP 214 of the burden of channel filtering, automatic gain control, automatic frequency control, decimation, and CORDIC rotation.

During analog voice reception, the sample blocks from the given DDC 210a-210p are passed through a de-emphasis filter (band-limited integrator). These PCM audio samples are put into a Codec output buffer and then delivered by the DMA system to the ADC and anti-alias low pass filter within audio codec 216. DSP 214 implements a separate high pass filter that selects only the high frequency noise output from the discriminator samples, performs amplitude detection, low pass filtering, and threshold detection. The result of the threshold detection is used as a voice audio output SINAD squelch decision for controlling audio gates downstream in the audio path.

A more complete description of SDR radio 200 is provided in co-pending and co-assigned U.S. patent application Ser. No. 11/985,764, filed Nov. 16, 2007 and entitled Multiple Channel Software Defined Radio, and incorporated by reference herein for all purposes.

The principles of the present invention are embodied in an interoperablility train control network protocol (ITCNET). ITCNET protocol provides the equivalent of the first four layers in the Open System Interconnection (OSI) seven layer model. The preferred ITCNET protocol 300 is shown graphically in FIG. 3.

Figure 3:
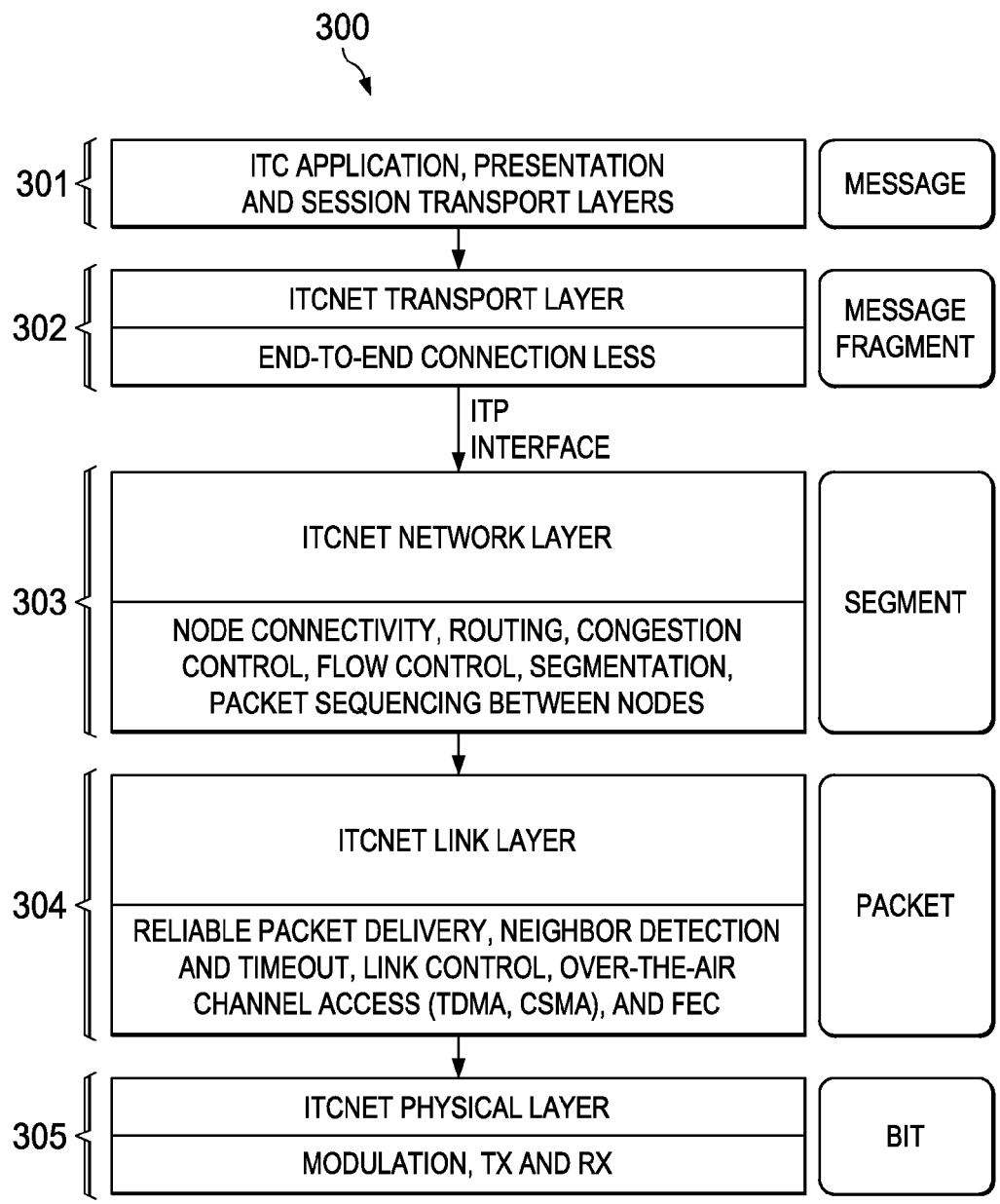
FIG. 3 is a diagram illustrating the high-level organization of an interoperable train control network (ITCNET) protocol according to the principles of the present invention.

ITCNET protocol 300 provides some functionalities of the OSI transport layer, which in the OSI model layer is responsible for transparent transfer of data between end users and for providing reliable data transfer services to the upper layers (e.g. the application, presentation, and session layers shown at 301 in FIG. 3). An ITCNET transport layer protocol 302 provides the means for transferring data between lower layers in the radios and higher layers outside the radios.

An ITCNET network layer 303 is responsible for source-to-destination packet delivery including routing through intermediate hosts. ITCNET network layer 303 provides node connectivity, routing, congestion control, flow control, segmentation, and packet sequencing between nodes. The network nodes can be base station radios, repeaters, or remote radios. The remote radios choose the best base radio or repeater as it roams the network. Direct message exchange between the remotes without relaying through the base can then be made.

An ITCNET link layer 304 provides the functional means to transfer data between nodes in the same communication link and provides the means to detect and possibly correct errors that may occur in the physical Layer 305. ITCNET link layer 305 also provides new-neighbor and neighbor-offline detection as well as reliably transmitting and receiving messages between neighbor nodes. This includes forward error correction (FEC) coding, cyclic redundancy check (CRC), and packet acknowledgement. Additionally, ITCNET link layer 304 supports over-the-air channel access based on TDMA (time division multiple access) and CSMA (carrier sense multiple access) schemes.

An ITCNET physical layer 305 defines the means of sending raw bits over a physical wireless channel from one radio to another radio. In particular, ITCNET physical layer 305 defines the properties of the modulation scheme, bit rate, bandwidth, frequency, synchronization, and multi-channel processing.

In ITCNET protocol 300, multiple access schemes are used by the base and remote radios to share available channel resources. These access schemes include fixed time division multiple access (FTDMA), dynamic time division multiple access (DTDMA), and carrier sense multiple access (CSMA) schemes.

In the FTDMA scheme, a frequency channel is time slotted. The FTDMA slot size can be different from one slot to another, but the allocation of the channel time to each user is fixed. FTDMA communications are used to support constant periodic traffic from the users. More particularly, a fixed number of FTDMA slots, each having a fixed slot size, are periodically reserved for a user at a fixed repetition rate. One FTDMA slot is used to support one FTDMA packet. Each user can be assigned multiple FTDMA slots to transmit multiple FTDMA packets. The FTDMA configuration is done in advance by a network engineer, who pre-determines the channel capacity and the channel frequency required to send FTDMA data for each user in the network.

In ITCNET, the FTDMA configuration comprises two parts, FTDMA channel configuration and FTDMA slot configuration. Specifically, the FTDMA channel configuration specifies the channel number on which a radio will transmit FTDMA packets. The FTDMA channel number is a configurable parameter that is set in a given radio either at initial radio setup and/or during update by the network engineer while the radio is in operation. FTDMA channel configuration update is done, for example, by sending configuration update information from central office 101 to the remote radio through the appropriate base station 103.

The FTDMA slot configuration specifies the start and the length of FTDMA slot for each message to be sent in an FTDMA slot. Additionally, any message to be sent in an FTDMA slot carries information that can be used to identify the FTDMA slot for that message. Such information travels with the message from the application layer (301, FIG. 3) at the host (215, FIG. 2) to the link layer 304 in the transmit radio. In the illustrated 220 MHz IPTC system, a message with the source address is generated and sent from the host to the ELM. For the message to be transmitted in the FTDMA cycle, the ELM generates a slot key from the source address in the message, and then sends the slot key together with the message to the radio. The radio has a table lookup that maps the slot key to the FTDMA slot configuration for that particular message.

A radio transmits the message in the FTDMA slot that is specified in the FTDMA slot configuration. Specifically, to transmit a packet in an FTDMA slot, a radio, which includes a global positioning system (GPS) receiver, takes the slot timing from the 1 PPS timing output of the GPS receiver. A radio without a GPS receiver derives the FTDMA slot timing from base station signal, discussed further below.

DTDMA is a centralized access scheme where the frequency channel is time slotted and a base station 103 controls the allocation of time slots to users. Several TDMA slots are grouped into DTDMA cycles of variable length. In particular, each slot in the DTDMA cycle can be allocated for a transmission of an RF packet (also simply referred to in this disclosure as a packet) from a base station 103 or a remote radio. A slot for a remote radio transmission could be assigned to a particular remote radio or set as a contention slot. Contention slots are not assigned to specific remote radios but allow remote radios to access the channel through the slotted CSMA scheme discussed below. Slots in a DTDMA cycle can have different lengths.

DTDMA slot assignment, including slot size and the user that the slot is assigned to, is controlled by a base station 103. Specifically, a DTDMA slot assignment is performed by a scheduler at the base station 103 based on transmit queue information from the base station radio and the associated (connected) remote radios. The DTDMA slot assignment is broadcast by the base station radio in a DTDMA control packet, which is sent at the beginning of the DTDMA cycle.

In order for the scheduler to obtain knowledge on the remote transmit queues of the associated radios, each associated remote radio sends an update of its transmit queue information to the base station 103 when necessary. The remote radio can transmit its queue information in the assigned DTDMA slot or in a contention slot. At the end of each DTDMA cycle, the scheduler uses currently available queue information of every user (i.e. base station radio or remote radio) to determine the allocation of slots in the next DTDMA cycle.

CSMA is a contention-based access scheme where a physical channel is shared by users (i.e. base station and remote radios) with a mechanism to prevent collisions among multiple users trying to access the channel at the same time. The CSMA scheme requires that the users listen to the channel before starting to transmit to avoid possible collisions with other ongoing transmissions. Generally, when a user has a packet to transmit, the user waits for a random period of time during which the channel is sensed. If the channel is found idle, the user transmits the packet immediately. If the channel is found busy, the user reschedules the packet transmission to some other time in the future (chosen with some randomization) at which time the same operation is repeated.

A variation of the basic CSMA scheme is slotted-CSMA. Slotted-CSMA is similar to the basic CSMA scheme except that any packet transmission in the slotted-CSMA scheme must start at the beginning of a time slot. The slot size can be shorter than the time required to transmit a packet. When a user has packet to transmit, the user picks a random integer number and waits for that number of slots to occur before scheduling a transmission. The user then senses the channel, and if the channel is found idle, transmits its packet at the beginning of the current slot. If the channel is found busy, the user picks another random integer number and reschedules the packet transmission, as in the basic CSMA scheme. The maximum back-off time (i.e. the range of random integer numbers) is configurable. The back-off times for different data priorities can also be set to different numbers to improve the latency performance.

The IPTC channels comprise a group of RF frequencies in the 220 MHz band, with the channel plan specified by the FCC in 47 CFR §90.715. The FCC channel plan describes 5 kHz channels; however, where a licensee is authorized on adjacent channels, the 5 kHz channels can be aggregated over the contiguous spectrum. An IPTC channel is a 25 kHz channel that comprises five (5) adjacent 5 kHz channels in the FCC channel plan.

At least four 25 kHz channel pairs in the 220 MHz band are currently available in 220 MHz IPTC spectrum. The wireless IPTC system is designed as a half-duplex system where each 25 kHz frequency channel is used to provide communication path in both directions between two connected radios, but only in one direction at a time. In other words, each frequency channel supports both transmissions from a base radio and transmissions from remote radios, but not simultaneously. If more than one radio transmits in the channel at the same time, then a signal collision occurs which could result in the loss of all transmissions.

In the wireless IPTC system, the available 25 kHz frequency channels are divided into two groups: local channels and common channels. A common channel is shared by all base stations radios and remote radios. A local channel is used to support the traffic from all users within a base station 103 coverage area and is centrally controlled by that base station 103 using a master-slave architecture. Each base station 103 controls only one local channel.

Each remote radio can listen to multiple base stations 103, but a remote radio can select only one base station 103 to be its master; other base stations 103 are considered as neighbor base stations of the remote radio. Different local channels can be assigned to adjacent base stations 103 to prevent adjacent base stations 103 from interfering with each other, and the same local channel can be reused by multiple base stations 103 that are far apart from each other to increase spectral efficiency.

A set of 25 kHz channels in the base frequency are set as primary local channels. Since base stations 103 can transmit with higher power in the base radio frequency, using channels in the base radio frequency for local channels provides larger coverage than by using channels in a mobile radio frequency. Based on the currently available 220 MHz IPTC spectrum, at least three 25 kHz channels in a base radio frequency can be set as primary local channels. In high density areas where three primary local channels are not sufficient to support the traffic, other local channels can be used. One 25 kHz channel is preferably reserved for a common channel. The common channel should be in a base radio frequency that allows for both base stations 103 and remote radios to transmit in the channel. Table 2 shows an example of how the available channels in 220 MHz ITC spectrum correspond to ITC channels.

Figure 4:
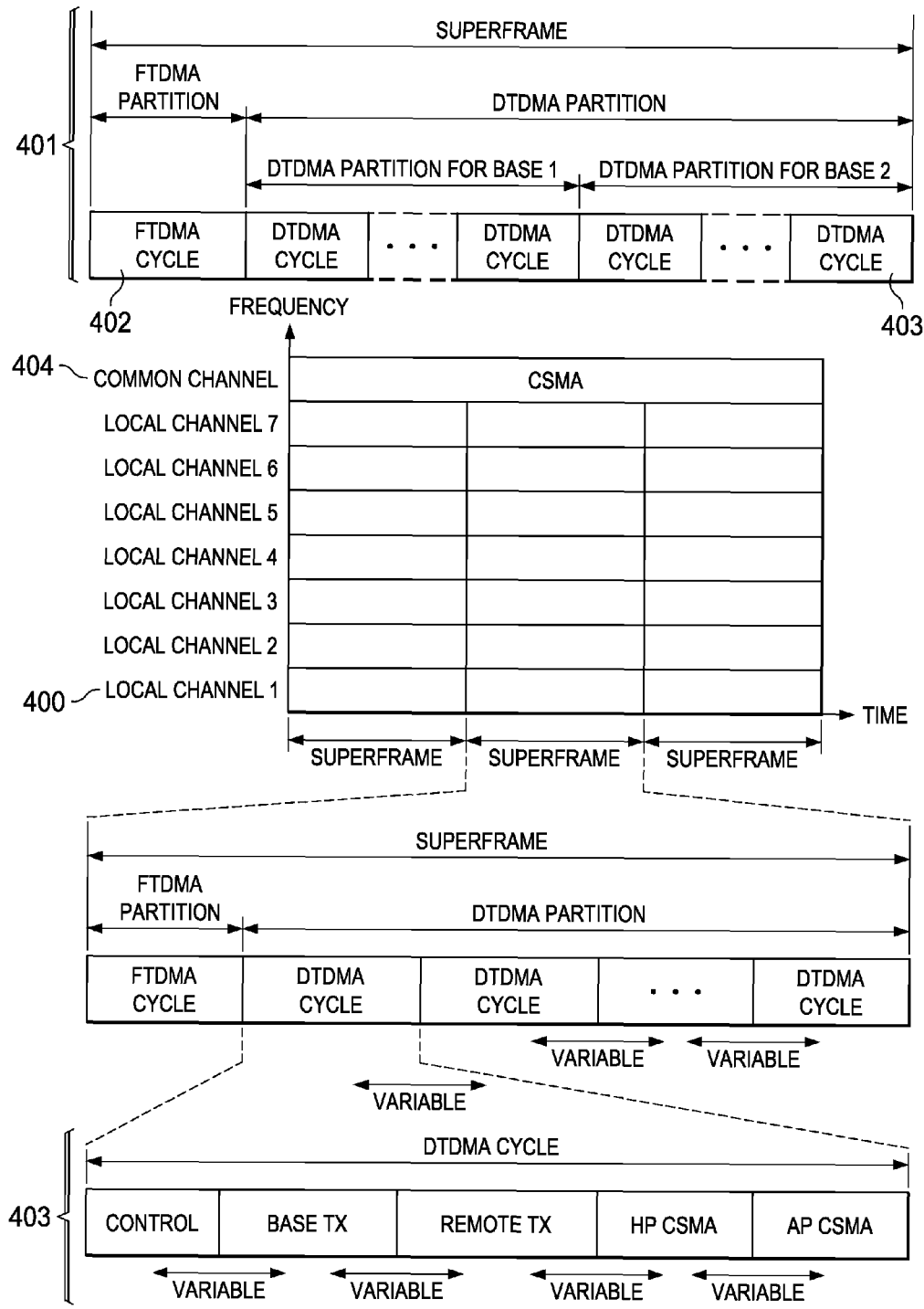
FIG. 4 is a diagram of a preferred wireless channel structure in accordance with the preferred embodiment of the ITCNET protocol.

FIG. 4 shows the preferred IPTC channel organization. In this example, seven (7) local channels 400 are shown (i.e. Ch. 1-Ch. 7). Each local channel 400 is divided in time into periodically repeating superframe 401 of fixed duration. The superframe duration is the same for any local channel 400, and it is set to the wayside broadcast interval, as discussed further below. Superframes 401, which are synchronized across all local channels 400, each consist of one FTDMA cycle 402 and one or more DTDMA cycles 403. Preferably, each superframe 401 starts with an FTDMA cycle 402, followed by DTDMA cycles 403.

The common channel 404 is shared by every user using the CSMA scheme discussed above. A packet transmitted in the common CSMA channel is typically a short packet that carries very high priority data. Common channel 404 can also be used to transmit base beacon signals, which carry information necessary for remote radios to identify and select a base station radio, as well as to setup their receive frequencies.

As shown in FIG. 4, the FTDMA partition consists of one FTDMA cycle 402, which is used to support periodic traffic such as periodic WIU (wayside interface unit) status messages. When transmitting in the FTDMA partition, a remote radio can use slot timing from a GPS pulse such that it is independent of the base radio transmission. Every FTDMA cycle 402 in a channel has the same length, which depends on the amount of periodic traffic in at channel, although FTDMA cycles 402 on different local channels can be of different lengths.

The DTDMA partition consists of one or more DTDMA cycles 403, with each DTDMA cycle 403 is controlled by one base station 103. A DTDMA cycle 403 is used to support traffic from base stations 103 and remote radios. All traffic in a DTDMA cycle 403 is organized by the base station 103 that controls that DTDMA cycle. The length of a DTDMA cycle 403 depends on the amount of traffic, which can vary from one DTDMA cycle to the next.

The start of DTDMA partition and the duration of DTDMA partition are configurable parameters that can be set in the base station radio. The base station radio uses the GPS timing as the reference time to start and end the DTDMA partition in each superframe 401.

The DTDMA partition in a frequency channel 400 can be controlled by one base station 103 or shared by multiple base stations 103. In case when the local channel is controlled by one base station 103, that base station 103 has the control of the entire DTDMA partition. In this case, the duration of DTDMA partition at the base station 103 is set as:

Duration of DTDMA partition=Duration of Superframe−Duration of FTDMA cycle

Figure 5:
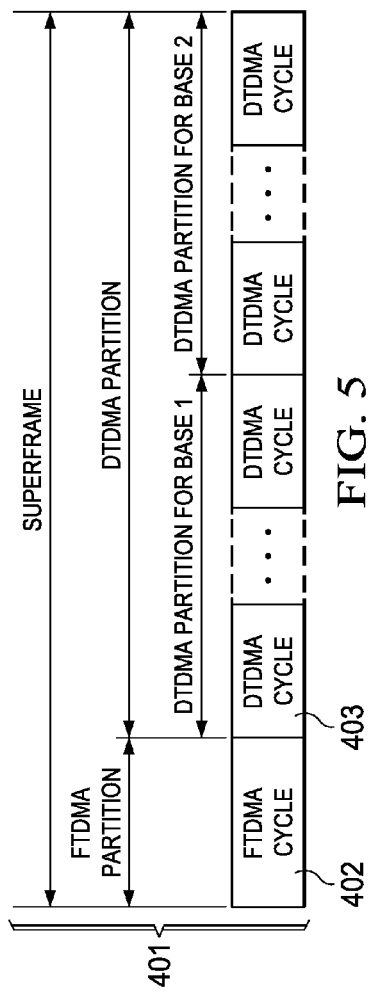
FIG. 5 is a diagram illustrating an example when multiple base stations share the Fixed Time Division Multiple Access (FTDMA) partition portion of the superframe shown in FIG. 4.

In case when a local channel 400 is shared by adjacent base stations 103, those base stations coordinate their transmissions in the DTDMA partition. The entire duration of DTDMA partition is divided among the shared base stations 103. For example, with N adjacent base stations 103 sharing the local channel 400, the DTDMA partition is divided into N parts, one for each of the N base stations. FIG. 5 illustrates an example of two base stations 103, designated Base 1 and Base 2, share the DTDMA partition.

FTDMA cycle 402 of FIG. 4 of is used to support periodic traffic that is repeated every superframe 401. Generally, a FTDMA cycle 402 comprises multiple FTDMA slots, which can have different slot sizes within that FTDMA cycle 402. One FTDMA slot supports one RF packet, and the size of each FTDMA slot can be set by a network engineer according to the packet length that will be transmitted in that slot. FTDMA cycle 402 repeats every superframe 401, although the size of each slot remains the same in every superframe 401.

Figure 6:
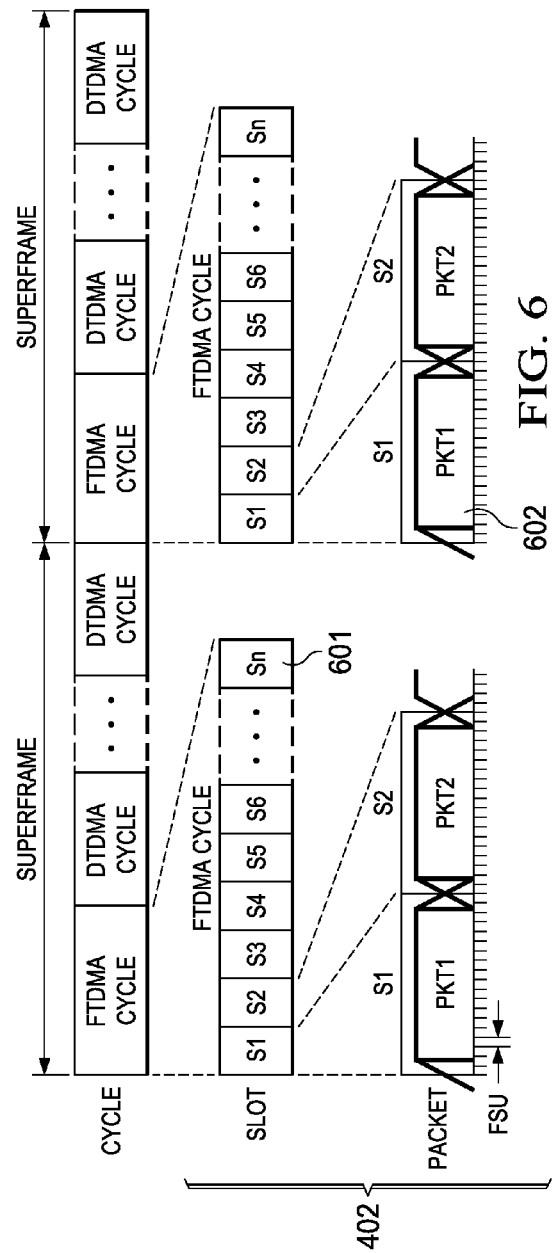
FIG. 6 is a diagram of the structure of exemplary FTDMA cycles shown in FIG. 4.

FIG. 6 illustrates the structure of one FTDMA cycle 402 in one frequency channel. In the example of FIG. 6, the FTDMA cycle has n slots (S1, S2, . . . , Sn) 601, each having different slot size. Each slot carries one RF packet 602, i.e., slot S1 carries packet PKT1, slot S2 carries packet PKT2, and so on. The size of each FTDMA slot 601 and the number of FTDMA slots are the same in every superframe 401.

As previously discussed, the number of FTDMA slots 601 and the length of FTDMA cycle 402 in a local channel 400 depends on the amount of FTDMA traffic in that channel. As different local channels 400 could have different amount of FTDMA traffic, the local channels 400 can consequently have different numbers of FTDMA slots 601 and different FTDMA cycle lengths. Notwithstanding, the FTDMA cycles 402 in all local channels 400 start at the same time, namely, the beginning of the superframe 401.

The size of an FTDMA slot 601 is specified in time units, which is independent of the transmit bit rate. The time resolution of an FTDMA slot size is called an FTDMA slot unit (FSU). The default FSU is 1 millisecond (ms), which allows a two-byte transmission at the bit rate of 16 kbps. The size of an FTDMA slot 601 can be determined in advance by the network engineer. The slot size is preferably set based on the packet size plus the guard time required between packets.

To transmit a message in an FTDMA slot 601, the transmitting radio must receive an indication that the message is for an FTDMA cycle 402 and an indication as to which FTDMA slot 601 to transmit the message. Such data handling information is included in the header of the message, which is generated in the application layer (e.g. application layer 301 of FIG. 3) of the host processor (215, FIG. 2) on the transmitter side. The message and message header are passed from the application layer down to the transport layer (e.g. transport layer 302 of FIG. 3). The transport layer obtains the data handling information from the message header, and passes that information to the link layer in the radio (e.g. link layer 304 of FIG. 3).

Periodic traffic transmitted in an FTDMA cycle 402 includes base timing signals and periodic WIU status messages. Generally, a base timing signal is broadcast from the base station radio at the beginning of the FTDMA cycle 402 to provide an alternative source of FTDMA slot timing to the remote radios, although GPS is as the primary source for the FTDMA slot timing.

A periodic WIU status message is broadcast from wayside 104 radios every wayside broadcast interval, which is the same as the length of the superframe 401. The length of WIU status message itself depends on the number of devices connected to the given wayside 104. In other words, the message length is fixed for each wayside 104 radio, but it can differ from one wayside radio to another. One wayside radio could have multiple WIU status messages, and requires multiple FTDMA slots 601 to broadcast those messages.

Figure 7:
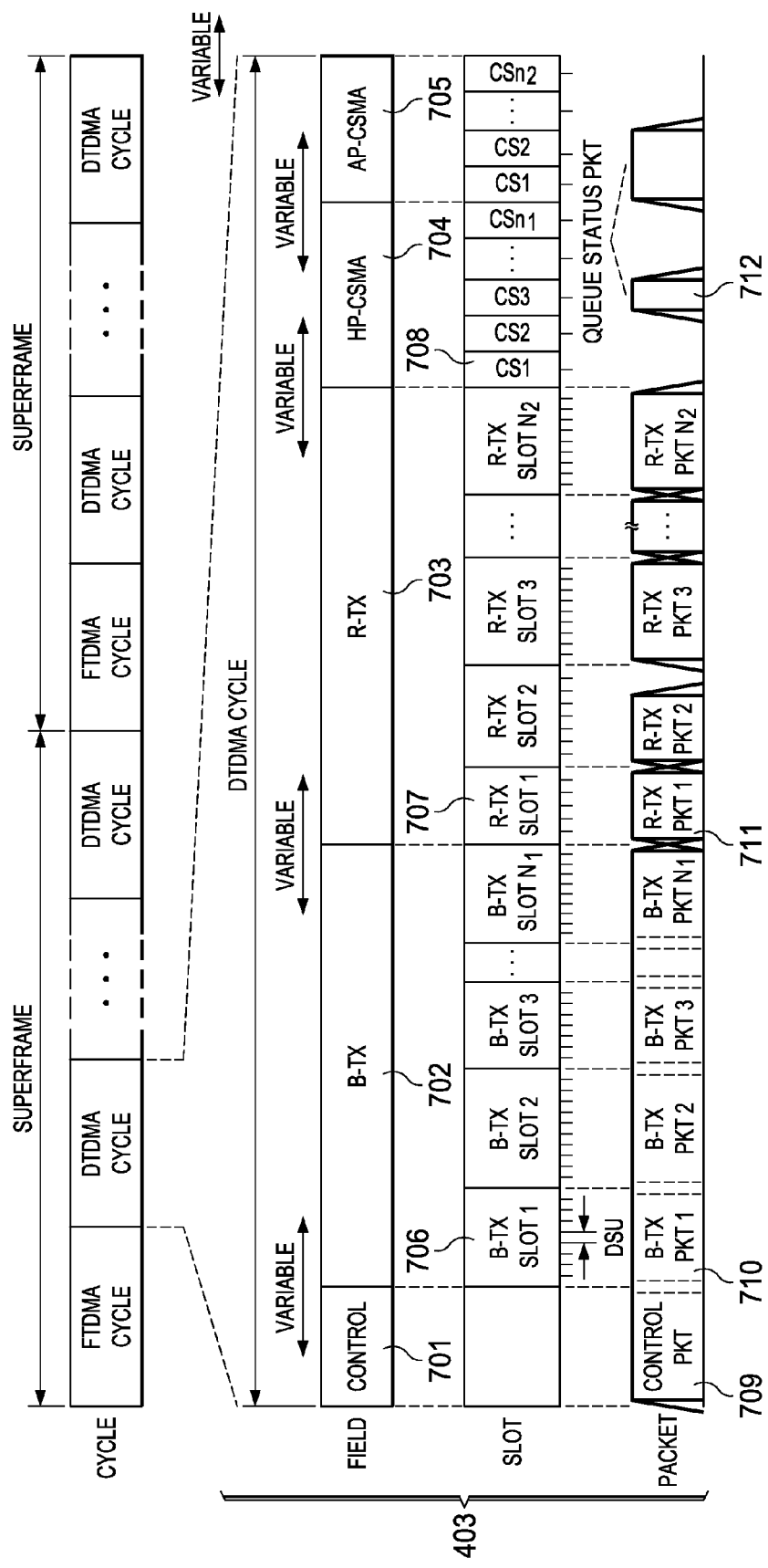
FIG. 7 is a diagram of the structure of exemplary Dynamic Time Division Multiple Access (DTDMA) cycles shown in FIG. 4.

As shown in FIG. 7, each DTDMA cycle 403 is controlled by a base station 103. Generally, DTDMA cycles 403 are used to support traffic from a base station 103 and remote radios that are connected to that base station. Generally, at the beginning of each DTDMA cycle 403, the base station 103 broadcasts a DTDMA control packet that organizes the transmissions in the DTDMA cycle 403. Following the DTDMA control packet is the data traffic between the base station 103 and the remote radios. The duration of a DTDMA cycle 403 can be varied, depending on traffic in the DTDMA cycle. A DTDMA cycle is typically about 1 second long.

More specifically, each DTDMA cycle consists of five (5) different fields, including control field 701 that specifies the DTDMA cycle structure, base transmit (B-TX) field 702 carrying outbound data traffic from the base station 103 to the remote radios, remote transmit (R-TX) field 703 carrying inbound data traffic and peer-to-peer data traffic from the remote radios, high-priority CSMA (HP-CSMA) field 704 which is reserved for remote radios with high-priority data to access to the local channel 400, and all-priority CSMA (AP-CSMA) field 705 available for any remote radios to access to the channel.

Each field 701-704 in a DTDMA cycle 403 is of variable length, and except the control field, comprises DTDMA slots of one type. There are three DTDMA slot types, namely base transmit (B-TX) slots 706, remote transmit (R-TX) slots 707, and CSMA slots 708. Each of the B-TX slots 706 and R-TX slots 707 supports one RF packet. The B-TX slots 706 are for outbound B-TX packets 710 from the base station 103, while the R-TX slots 707 are for inbound or peer-to-peer R-TX packets 711 from the remote radios. CSMA slots 708 are for the remote radios to request access to the channel by sending a queue status packet 712 via a slotted CSMA scheme. The transmission of one queue status packet requires one or two CSMA slots 708, depending on the transmit bit rate.

The size of each DTDMA slot 706-708 is in time units, independent of the transmit bit rate. The resolution of the slot size is called DTDMA slot unit (DSU), which in the illustrated embodiment is by default is 4 ms, allowing the transmission of 8 bytes at a bit rate of 16 kbps or 16 bytes at a bit rate of 32 kbps. Table 3 summarizes the slot types in a DTDMA cycle and Table 4 summarizes the DTDMA field types.

One B-TX slot 706 supports base station 103 transmission of one outbound packet and can vary in size, depending on the packet size. Specifically, since the base station 103 knows the size of the outbound packet to be transmitted, the slot size can be set to the packet size plus the guard time required between outbound packets.

One R-TX slot 707 supports the transmission of one packet by a remote radio. This packet can be an inbound packet that the remote radio sends to a base station 103, a peer-to-peer packet that one remote radio sends to another remote radio, or an acknowledgement packet. The size of an R-TX slot 707 can be varied, as is specified in the control field 701 by the base station 103 (discussed further below). For a given R-TX slot size, the remote radio knows the maximum packet size that can be transmitted in the slot, such that transmitted packet can be of any size less than the maximum allowable size for the slot.

CSMA slots 708 are for CSMA transmission of queue status packets from a remote radio to a base station 103 to request access to the local channel 400 and have a fixed size of 2 DSU or 8 ms. The transmission of queue status packet requires one (1) CSMA slot if it is sent at a bit rate of 32 kbps, and requires two (2) CSMA slots if it is sent at a bit rate of 16 kbps.

DTDMA control packets 709, transmitted from the base station 103 within control field 701, convey information that the associated remote radios require to decode the DTDMA cycle structure. DTDMA control packets 709 also include acknowledgement information whereby the base station 103 acknowledges the reception of inbound transmissions in the previous DTDMA cycle 403. Information in a control packet 709 includes packet type, transmitter ID, frame number, packet length, number of slots in each field, acknowledgement to inbound transmissions, and assignment of slots for remote transmission. The length of control field 701 depends on the size of control packet 709, which in turn depends on the assignments in the DTDMA cycle. As the base station 103 knows the size of the control packet 701 to be transmitted in the DTDMA cycle 403, the base station 103 sets the length of the DTDMA control field 701 to the length of the DTDMA control packet 709 plus the required guard time.

B-TX fields 702, used to carry data traffic from the base station 103, comprise B-TX slots 706, each supporting a base station 103 transmission of an RF packet. Packets 710 transmitted in a B-TX slot 706 can be outbound data packets sent to a specific remote radio or broadcast data packet sent to any remote radio within the coverage area of the base station 103.

The first two fields in the DTDMA cycle 403, namely the control and B-TX fields, contain transmission information from the base station 103 only. The base station 103 can perform continuous transmission when the base station radio transmit key is on the entire time allocated for both the control and B-TX fields.

R-TX field 703 and R-TX slots 707 carry data traffic from the remote radios that are connected to the base station 103, with one R-TX packet 711 transmitted from one remote radio transmitted in each R-TX slot 707. A scheduler at the base station 103 determines the size and the assignment of each R-TX slot. The slot assignment is sent in the control field 701 for the DTDMA cycle.

When a remote radio is assigned an R-TX slot 707, that remote radio sends an RF (R-TX) packet 711 in the assigned slot. An R-TX packet 711 transmitted in the assigned R-TX slot 707 could be an inbound packet sent to the base station 103, a peer-to-peer data packet sent to another remote radio, or a broadcast data packet. For example, an inbound R-TX packet 711 could carry inbound data that the remote radio is sending to central office 101, an acknowledgement that the remote radio acknowledges the reception of a corresponding base station 103 data packet, or both. If a remote radio is assigned an R-TX slot 707 but does not have any data packet to transmit, that remote radio sends a queue status packet in the assigned R-TX slot 707.

The lengths of B-TX field 702 and R-TX field 703 can vary from zero to the maximum field length, depending on traffic experienced in the network. For example, B-TX field 702 could be empty (of length zero) when the base station 103 does not have any information to transmit in the DTDMA cycle 403. The R-TX field could be empty when the base record shows that no remote radio has data to transmit in the DTDMA cycle 403. B-TX field 703 is at maximum field length when the base station 103 has a substantial amount of high priority outbound traffic to transmit. The maximum field length is a configurable parameter, with a default of 125 DSU (500 ms).

HP-CSMA field 704 and AP-CSMA field 705, which are used by the remote radios to access to the channel and request slots from the base station 103, comprise multiple CSMA slots 708, with each CMSA slot 708 having a fixed size of 2 DSU (8 ms).

When a remote radio must transmit data a the local channel 400, but has not been assigned R-TX slots from the base station 103, that remote radio can send a queue status packet to the base station 103 in CSMA slots 708. The queue status packet provides information about the remote radio transmit queue, including the amount and priority of data that the remote radio needs to transmit. HP-CSMA field 704 is reserved for remote radios with high priority data requesting R-TX slots. AP-CSMA field 705 is for any remote radio to request for R-TX slots.

All IPTC messages are of high priority, such that a remote radio with IPTC messages to transmit can request access to the local channel 400 using either the HP-CSMA or AP-CSMA fields. Non-IPTC messages (e.g. business messages and some system management messages) are of lower priority; therefore, any remote radio requiring local channel access for the transmission of these messages can send can only send a queue status packet in AP-CSMA field 705 to request R-TX slots.

The length of HP-CSMA field 704 and AP-CSMA field 705 in the given DTDMA cycle 403 will vary according to the traffic in the network. When no traffic is in the network, the DTDMA cycle 403 could comprise only control, HP-CSMA, and AP-CSMA fields. In this case, the length of the HP-CSMA and AP-CSMA fields is limited by the maximum field length. When the local channel 400 is overloaded with traffic, part of the DTDMA partition is reserved as CSMA slots for channel access, while the rest is used to support the transmission of data traffic. The minimum number of CSMA slots reserved is configurable, with a default of two (2) CSMA slots per second.

Generally, a data message is generated in the application layer at the host (host 215, FIG. 2) on the transmitter side. This message together with a message header is passed down the protocol stack to the physical layer in the transmit radio. Since the IPTC system requires that the transmitting radio does not look inside any data message or message header that is passed to it, any information that the radio requires to handle that data message (also referred to as data handling information) must be passed along with the message to the radio.

Figure 8:
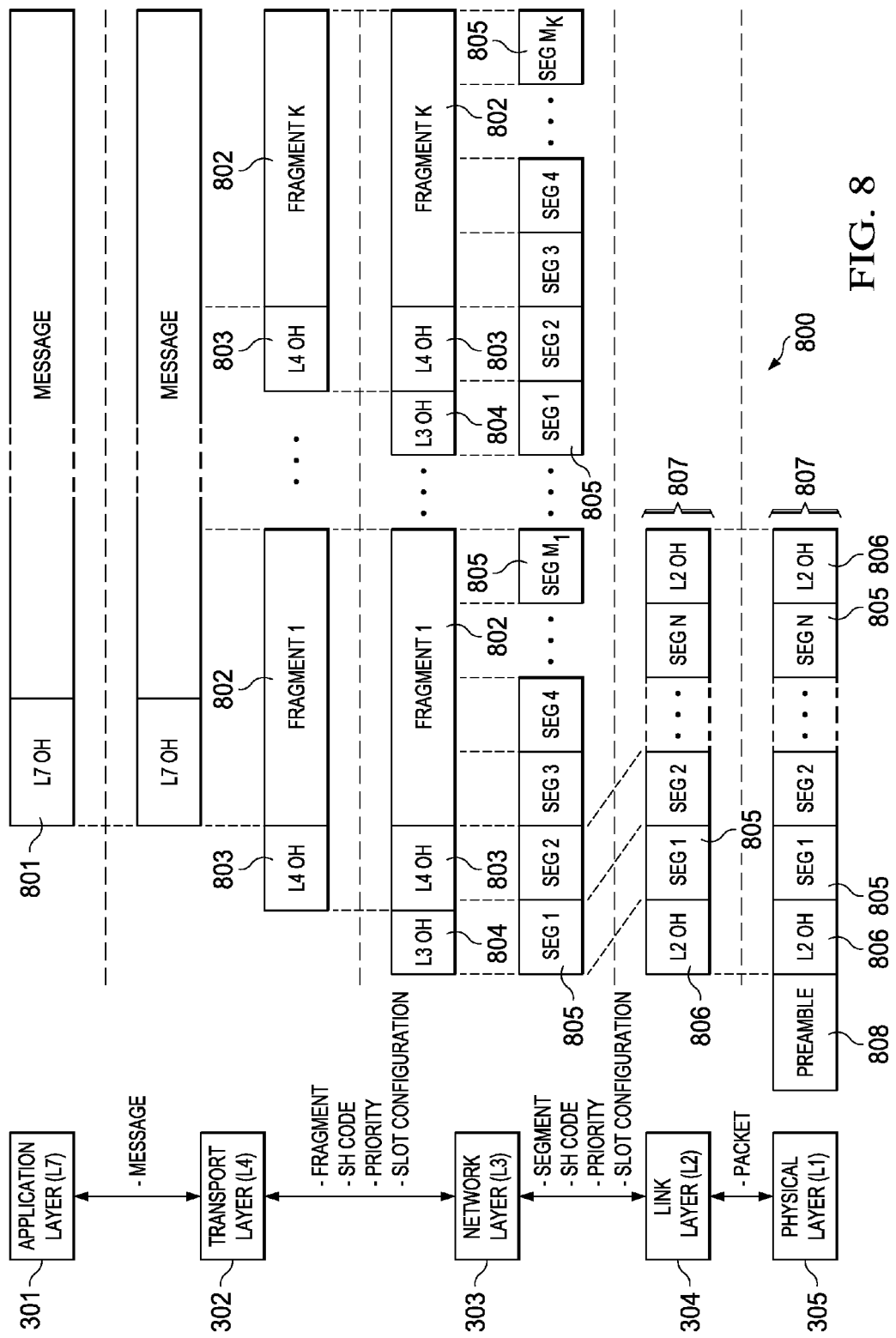
FIG. 8 is a flow diagram illustrating the data flow through the processing layers according to the preferred embodiment of the ITCNET protocol.

A preferred data flow 800 according to the preferred embodiment of the ITCNET protocol generally shown in FIG. 3 is provided in FIG. 8. On the transmitter side (e.g. a base station 103, locomotive 102, or central office 101), a message is generated at the application layer (L7) 301, and the application layer (L7) overhead is prepended to the message. The message overhead includes source and destination addresses and QoS (Quality of Service) parameters. The QoS parameters provide information on the class of service, message priority, network preference to send the message, and a special handling (SH) code.

At the transport layer (L4) 302, the message with L7 overhead 801 is divided into multiple fragments 802, and the transport layer (L4) overhead 803 is prepended to each fragment. The maximum size for a fragment 802 depends on the transport layer protocols. Each fragment 802 with L4 overhead 803 is passed down to the network layer in the transmit radio. (Before the fragment is passed to the network layer in the radio, the L4-L7 overhead could be stripped off, depending on the SH code.) The transport layer passes the data handling information, including priority, SH code, and slot configuration, along with the fragment to the network layer.

At the network layer (L3) 303, each fragment 802 is handled based on the SH code. This includes prepending the network layer (L3) overhead 804 to the fragment and dividing the fragment into multiple 12-byte segments 805. The SH code indicates which L3 overhead is to be added and whether or not to segment the fragment. The segments (or fragment) from network layer 303 are passed down to link layer 304. The network layer 303 also passes the data handling information along with the segments to the link layer 304.

At the link layer (L2) 304, segments 805 are grouped together to form an RF packet that will be transmitted over the air. The number of segments being assembled in a packet depends on the channel time (e.g. DTDMA slot size) available for packet transmission. One packet can carry at most ten (10) segments 805 and if the fragment is not segmented, then the entire fragment is sent in one packet. The Link layer (L2) 304 tracks each segment 805 sent or received.

L2 overhead 806 is added to the packet before the packet is passed down to physical layer 305. In particular, the data handling information from the network layer (L3) indicates which L2 overhead 806 is to be added and whether the packet requires FEC encoding. The packet 807 can then be transmitted in the FTDMA, DTDMA, or CSMA superframe partitions. The data handling information also indicates on which RF channel 400 to transmit. When FTDMA is selected, then the slot configuration parameter specifies which FTDMA slot to transmit the packet.

At physical layer (L1) 305, a preamble 808 is prepended to the packet before the packet is transmitted over the air. Preamble 808 includes a bit sync pattern and a frame sync pattern, which are used receiving radio to demodulate and find the starting point of the data in the received packet.

On the receiver side, the data flow proceeds as follows, starting with physical layer (L1) 305 receiving the sequence of bytes in the packet 807. Physical (L1) layer 305 detects the packet preamble 808 and passes all bytes from the first byte after the preamble until the last byte in the packet to link layer (L2) 304.

At link layer (L2) 304, packet 807 is decoded and validated. In particular, link layer 304 processes the data handling information in packet header 808 to determine the packet format and determine whether the packet is FEC encoded. If the validation passes, the data part, which is the sequence of segments 805 or fragment, if the data is not segmented, is passed up to network layer (L3) 303, along with the data handling information. Otherwise, if validation fails, the packet is dropped.

At network layer (L3) 303, the data segments from link layer 304 are assembled into a fragment and routed. If the packet 807 is for this node, network layer 303 passes the fragment together with the data handling information up to transport layer (L4) 302.

At transport layer 302 of the destination node, the fragment is handled based on the instructions in the data handling information, which includes adding the L4-L7 overhead to the fragment, if necessary. Fragments are assembled into a message, and then passed up the protocol stack to the application layer (L7) 301.

Once a message is successfully received at the destination node, an end-to-end acknowledgement (ETE) can be generated and sent to the source node. The ETE message is processed at the receiving radio as a regular message.

As stated earlier, the data handling information is sent from the application layer 301 to provide essential information that lower layers (i.e. transport layer 302, network layer 303, link layer 304, and physical layer 305) require to handle the data message. In the illustrated embodiment at application layer 301, the data handling information is included in the QoS field of the message header. Depending on the special handling code, transport layer 302 on the transmitter side can pass both the message and message header to the layers below it (i.e. network layer 303, link layer 304, and physical layer 305), or strip off the message header and pass only the message to the layers below it. In either case, transport layer 302 passes the data handling information, separately from the data message, to network layer 303 and link layer 304 in the radio. The network and link layers do not process the message header, but use the instruction from data handling information to handle the data message.

The data handling information in the QoS field includes message priority, the special handling code, and an FTDMA slot configuration. Every message is assigned a priority when it is generated at the host (215 of FIG. 2) on the transmitter side. For example, the priority can be an integer number 0, 1, 2, . . . , with 0 being the highest, or it can be ranging from A to Z with A being the highest. The priority is listed in the QoS field in the message header, and passes along with the message from application layer 301 down to link layer 304.

At the link layer 304, the transmitting radio uses the priority value for queuing a message fragment or message segments in the transmit queue. Depending on the packet type, the priority value can be transmitted over the air as part of the packet, for example for use by the corresponding base station 103 to organize data in the corresponding DTDMA partition.

The special handling (SH) code, which is used on both the transmitter and receiver side, provides instructions on handling the data message at the lower layers. More particularly, the SH code provides transmit instructions on the transmitter side and receive instructions on the receiver side and is mapped into a set of instructions through a lookup table at the ELM and the radio. Some of the instructions such as removing the IPTC transport header are performed by the ELM. Other instructions are performed by the link and network layers at the radio, as discussed further below.

On the transmitter side, the SH code is generated with the message at the application layer 301 of the host (215 of FIG. 2). The SH code is passed from the host to the ELM and then to the radio, where the SH code is mapped into a set of transmit instructions. The radio transmits the SH code over the air as part of the link (L2) or network layer (L3) overhead (805, 806). On the receiver side, the SH code is passed up the protocol stack from the link layer 304 to the application layer 301. The received SH code is mapped into a set of receive instructions for the radio and the ELM.

At the transmitting radio, the SH code instructs network layer 303 as to whether to add the network layer (L3) overhead 804 and whether to segment the message or send a message fragment. The receiving radio then determines from the SH code whether the network layer (L3) overhead 804 is included in the received packet 807 and whether the message is segmented.

Link layer 304 receives data segments 805 (or a fragment) and the SH code from the network layer 303. At the transmitting radio, the SH code instructs link layer 304 whether to: (1) FEC encode; (2) send the data as a broadcast; (3) include transmit a radio ID (TX ID) or receive a radio ID (RX ID) in the packet; and (4) send the data with FTDMA. The SH code also determines on which local channel 400 the packet is to be sent. Table 5 lists the SH code instructions for link layer 304 and network layer 303 in the radio. Table 6 provides an exemplary mapping table of the SH code to the instructions for the radio, and Table 7 lists the ITC messages for each SH code.

Any message that is sent in an FTDMA cycle is assigned a FTDMA slot configuration. The slot configuration provides the transmit radio information on when to transmit the message in the FTDMA cycle (402 of FIG. 4). As discussed above, for every message to be sent in an FTDMA cycle 402, the ELM sends a slot key together with the message to the radio. The radio maps the slot key to the FTDMA slot configuration via a lookup table.

The FTDMA slot configuration specifies the start and the length of the FTDMA slot (601 of FIG. 6) in the FTDMA cycle 402. These two parameters can be specified in term of FSU, referenced to the start of FTDMA cycle 402. For example, if the first FTDMA slot 601 in the FTDMA cycle 402 is of length $L_1$ FSU and the second FTDMA slot 601 is of length $L_2$ FSU, the third FTDMA slot 601 is of length $L_3$ FSU, and so on, then the FTDMA slot configuration for these FTDMA slots is as shown in the example of Table 8. The FTDMA slot configuration also specifies the channel number in which the message will be transmitted. For a radio with multiple FTDMA messages, the channel number to transmit these messages can be different from one message to another, but the slot times cannot overlap.

The FTDMA slot length for each message is set to be enough for the RF packet (602 of FIG. 6) carrying the message plus the guard time required between two consecutive RF packets 602. The slot length therefore depends on the length of the message, the length of overhead that will be transmitted over the air, the transmit bit rate, and the required guard time. With such information available, the FTDMA slot length for a message can be calculated as:

Length of FTDMA slot(FSU)=ceiling((Length of packet(ms)+Length of guard time(ms))/FSU)

where: the function ceiling(•) returns the smallest integer value greater than or equal to its argument value;

Length of packet(bytes)=Length of message(bytes)+ Length of overhead(bytes); and Length of packet(ms)=ceiling(Length of packet (bytes)×8/bit rate.(kbps)).

The information on the message size and the start of FTDMA slot 601 is sent over the air as part of the packet header, discussed further below. From this information, the receiving radio can identify the FTDMA slot 601 in which the packet is received. The FTDMA slot identification is additionally used for message repeating, message filtering, and troubleshooting, for example.

In message repeating, a message that is received in one FTDMA slot 601 is repeated in another FTDMA slot 601 in the same FTDMA cycle 402 by a repeater (e.g. a wayside 104 radio or a base station 103 radio). The repeater maintains a table that identifies the receive and transmit FTDMA slots 601 of the message to be repeated. The information on the message size and the start of FTDMA slot in the packer header identifies the receive FTDMA slot.

In message filtering, a broadcast message in the FTDMA cycle 402 can be filtered out by the receiving radio. That is, the receiving radio does not pass all messages in FTDMA cycle 402 to the ELM. For each receive channel, the receiving radio can filter all messages in the FTDMA cycle 403 or only those messages in particular FTDMA slots 601

In troubleshooting, for every message that a radio receives in the FTDMA cycle 402, the radio can provide information on the FTDMA slot 601, channel 400, and time that the message is received. This information is useful for system management and troubleshooting functionalities.

At link layer 304 in the transmit radio, the data to be transmitted are put into a radio transmit queue. The radio transmit queue is one of three different queue types, depending on the data being transmitted: an FTDMA data queue (FDQ), a DTDMA data queue (DDQ), or a CSMA data queue (CDQ).

The FTDMA data queue is for the data that will be transmitted via FTDMA. Preferably, the transmitting radio has one FDQ per assigned FTDMA slot 601, and each queue is of depth one. In operation, the transmitting radio receives the data message to be sent in the assigned FTDMA slot 601 and the corresponding slot key is sent from the ELM. The slot key is then mapped into the slot configuration. At link layer 304, the message is placed into the FDQ for that particular FTDMA slot 601. (If there is a message in the FDQ, the existing data in the FDQ is replaced by the incoming one.) At FTDMA slot time, link layer 304 checks if data is available in the FDQ for that FTDMA slot 601. If so, the data are sent in the FTDMA slot 601 and then removed from the FDQ. Otherwise, no data are sent in that slot.

DTDMA data queue is for the data that will be transmitted in the local channel 400 but not via FTDMA. For application data, the DDQ is for any data where the SH code indicates that the data is transmitted via DTDMA and the channel value includes local transmission. Preferably, each radio has one DDQ, and the data are placed in that DDQ according to the data priority.

The size of the DDQ is configurable. In general, the DDQ should not be too long, which gives the network router an opportunity to reroute messages to alternate wideband paths if they become available. The DDQ, however, should be long enough to keep the DTDMA slots (706 of FIG. 7) reserved and to achieve efficient DTDMA scheduling.

The queuing process in the DDQ is preemptive. A higher priority message will interrupt a lower priority message that is currently being transmitted, such that the higher priority message will be delivered first. After transmission of the higher priority message, the lower priority message that has been interrupted continues from the point it was interrupted.

For example, if the link layer 304 has an N-segment message in the DDQ, the message segments begin to be transmitted and the link layer 304 keeps track of each segment sent to the intended destination. If a higher priority message arrives in the DDQ before all N segments of the lower priority message are transmitted, then link layer 304 moves the higher priority message to the front of the DDQ and transmits the higher priority message in the next assigned DTDMA slot. After all higher priority messages in the DDQ are transmitted, link layer 304 continues transmitting the rest of the lower priority message segments.

Each radio provides information on the message priority in the DDQ to the ELM such that the ELM can decide whether it should pass a message to the radio.

The common channel data queue (CDQ) is for the data that will be transmitted in the common channel (404 of FIG. 4). For application data, the CDQ is for any data for which the SH code indicates that the channel value is for common transmission. Each radio preferably has one CDQ, and the data is placed in the CDQ according to the data priority. Similar to the DDQ, the queuing process in the CDQ is preemptive.

Figure 9:
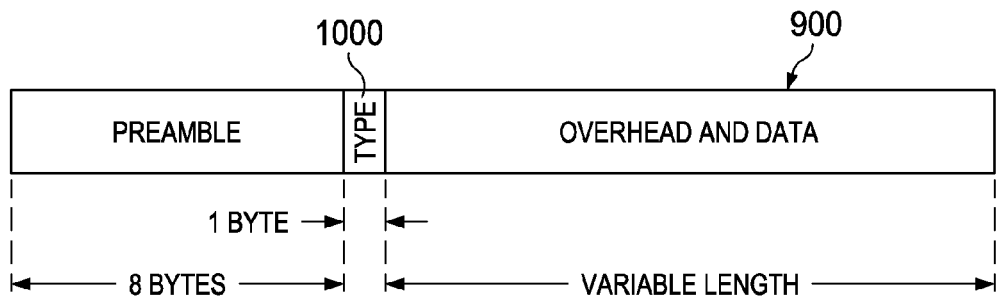
FIG. 9 is a diagram of the general structure of a RF packet according to the ITCNET protocol.

Generally, as indicated above, a packet (RF packet) is a block of data that a radio transmits over the air and includes a packet header and packet data. The general form of a data packet 900 is shown in FIG. 9, which includes a preamble, followed by a type byte, which is in turn followed by additional link layer overhead and the data. The preamble is used by a receiving radio to synchronize and detect information bits in the packet. The type byte indicates the type of the packet. The link layer overhead is used by the receiving radio to decode and extract the data from the packet and includes the packet type byte, addressing IDs, CRCC, and FEC. The total overhead includes preamble and link layer overhead.

Based on the data carried in the packet, packets can be categorized into two major groups: (1) data packets that carry application layer data generated by the host (215 of FIG. 2); and (2) control packets that carry only lower layer data generated by the radio itself.

Specifically, control packets carry control data generated by the radio to support lower layer functionalities such as TDMA scheduling, acknowledgement, base selection, and radio connection. A control packet does not carry any application layer data. The different types of control packets include DTDMA Control, Queue Status, Base beacon, Acknowledgment, Position report, and Base timing signal.

The control packets utilized in the preferred embodiment of ITCNET are summarized in Table 9 TDMA Control (CNTL) packet 709 of FIG. 7 controls DTDMA cycles 403 of FIG. 4. CNTL packets 701 of FIG. 7, which are sent by the base station 103 at the beginning of a DTDMA cycle 403, define the structure of that DTDMA cycle 403.

Queue Status (QSTAT) packet 712 of FIG. 7, which carries information on the status of the remote radio transmit queue, indicates the priority of the queued and amount of data with highest priority in the remote transmit queue.

A Base Beacon packet carries information of the base station 103 and is periodically broadcast by the remote radios to select a base 103 and set up local channels 400 (FIG. 4). An Acknowledgment (ACK) packet is sent by a remote or base station 103 radio to acknowledge the reception of an RF packet. An Acquire (ACQ) packet is sent from a remote radio to initiate the link connection and to keep the link connected. A Position Report (POS) packet carrying position information is sent periodically from mobile remotes radios to the base station 103 for proximity detection. A Base Timing Packet is broadcast periodically from the base station 103 at the beginning of FTDMA cycle to provide an alternative source of FTDMA slot timing to the remote radios.

Figure 10:
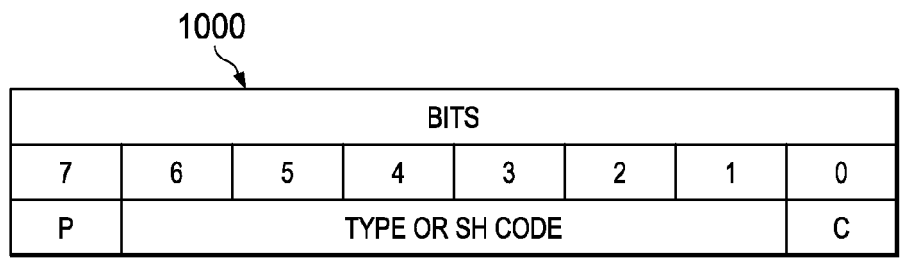
FIG. 10 is a diagram of the structure of the type byte found in the data packet shown in FIG. 9.

For a data packet as shown in FIG. 9, the first byte after the preamble is the type byte shown in FIG. 10. Based on the instructions from the SH code, a data packet can be in one of the formats shown in Table 10. In particular, these data packet types include: (1) short broadcast, which is an un-coded broadcast packet without either a transmit or receive radio ID; (2) long broadcast, which is a coded broadcast packet with a transmit radio ID in the header; and (3) unicast, which is a coded packet with both transmit and receive radio IDs in the header.

As shown in FIG. 10, a type byte 1000 is divided into two main fields, with the one-bit category (C) specifying the packet category (i.e. control packet or data packet) and the second six-bit field specifying the packet type in that category. As summarized in Table 11, when the category field is set to 0, the second field identifies the type of control packet. When the category field is set to 1, the second field is used to identify the type of data packet. For a data packet, the second field is typically the SH code. (If the SH code is not transmitted as part of the type byte, the SH code must be transmitted in the overhead part of the data.)

Type byte 1000 also includes a one-bit parity bit (P). The parity bit allows a receiving radio to detect any error in the type byte before receiving the complete packet. When the radio detects an error in the type byte, the radio will discard the whole packet it is receiving and starts listening for the next one.

Table 12 provides an example of parameters in an alternative type byte format.

As briefly indicated above, a short broadcast packet is not FEC encoded and does not include either a receive radio ID or a transmit radio ID. A data message will be sent in the short broadcast packet if the SH code indicates that:

TX-ID value=No

RX-ID value=No

FEC value=No

Any radio that receives a short broadcast packet will pass the packet data and the SH code to the associated transport layer. The short broadcast packet is used, for example, to support WIU status messages, which are sent from the WIU to the wayside 104 radio and periodically broadcast from the wayside 104 radio in an FTDMA slot.

Figure 11:
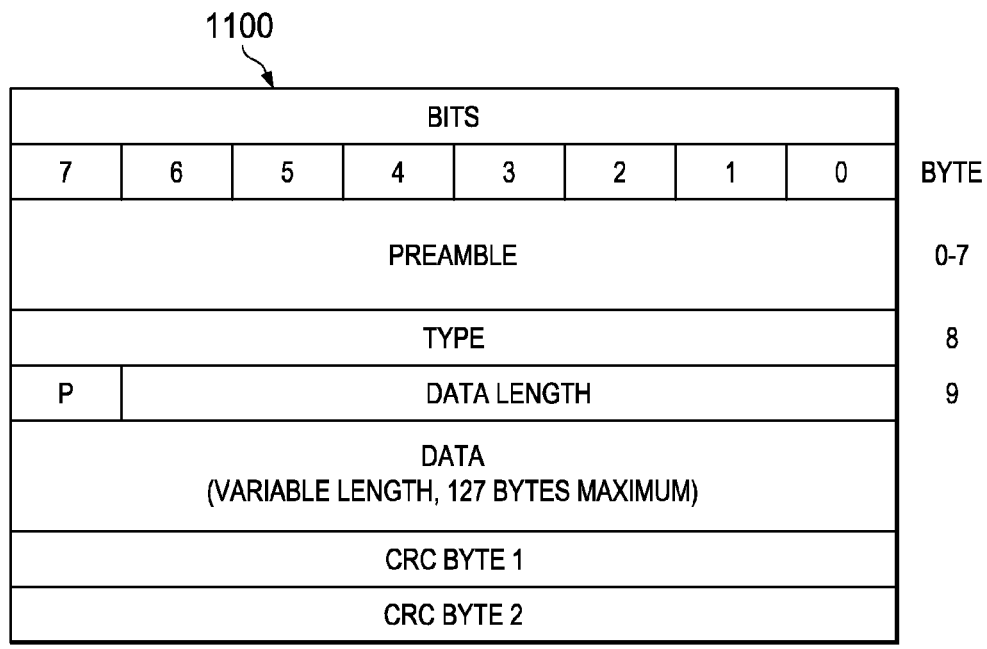
FIG. 11 is a diagram of a short broadcast data packet.

The format of a short broadcast packet 1100 is shown in FIG. 11, in which the data length field is one byte long. The fields for the short broadcast packet are summarized in Table 13. Since the WIU status message is typically shorter than 127 bytes, only 7 bits in the length field are used for the length information and one bit is reserved for a parity bit. With the parity bit, the receive radio can detect an error in the length information and decide to discard the packet before receiving the complete packet. This reduces the chance of missing the packet in the next FTDMA slot.

A long broadcast packet is FEC encoded and has the transmit radio ID but not the receive radio ID. A data message will be sent in the long broadcast packet if the SH code indicates that:

TX-ID value=Yes

RX-ID value=No

FEC value=Yes

Figure 12:
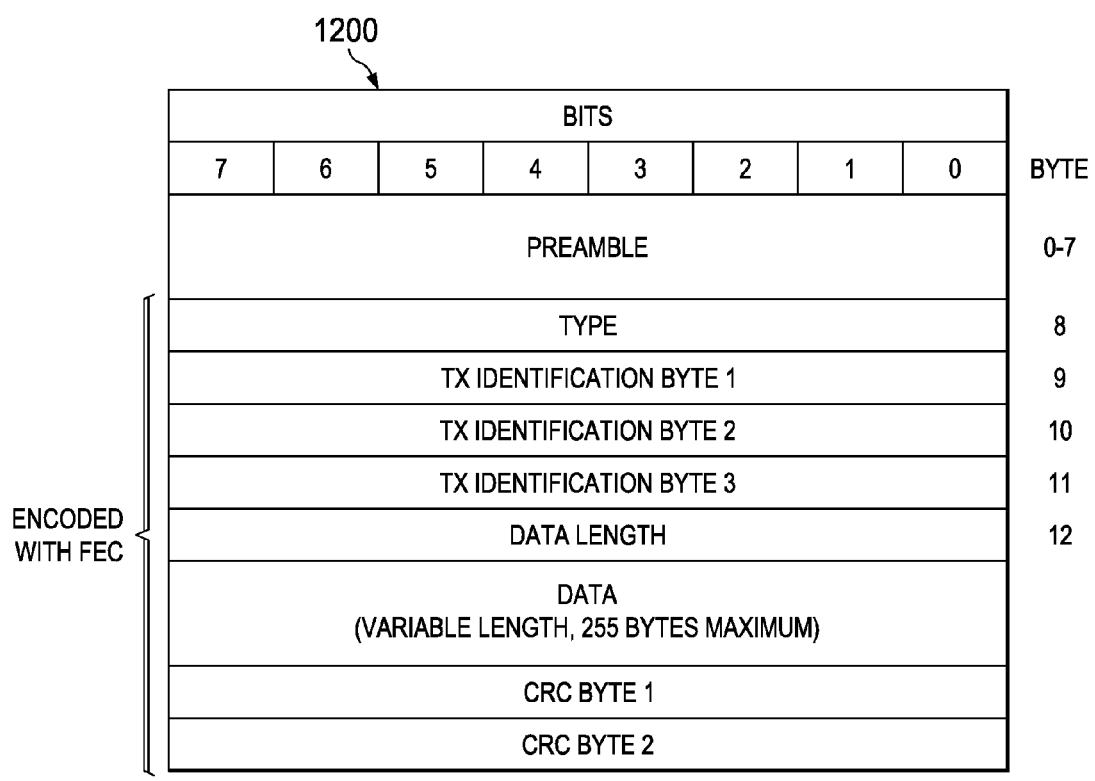
FIG. 12 is a diagram of a long broadcast data packet.

Any radio that receives a long broadcast packet will pass the packet data and the SH code to the associated transport layer. ITC messages that are sent in the long broadcast packet include WIU status request, WIU status response, WIU beacon on, and proximity messages. The format for a long broadcast packet 1200 is shown in FIG. 12, with the corresponding fields summarized in Table 14.

The data length in the long broadcast packet is a variable parameter and the information from type byte to the end of the packet is FEC encoded. The sequence of information bytes is divided into blocks, each with 12 bytes. If the last block is shorter than 12 bytes, zero padding is added to the last block for the FEC en/decoding purpose, but not transmitted over the air.

A discussed above, a unicast packet is FEC encoded and has both the transmit radio ID and the receive radio ID. A data message will be sent in the unicast packet if the SH code indicates that:

TX-ID value=Yes

RX-ID value=Yes

FEC value=Yes

The unicast packet format is used to support inbound, outbound, and peer-to-peer data traffic. A unicast packet can also be used to support broadcast data, in which case the receiver radio ID is set to the broadcast ID.

Figure 13:
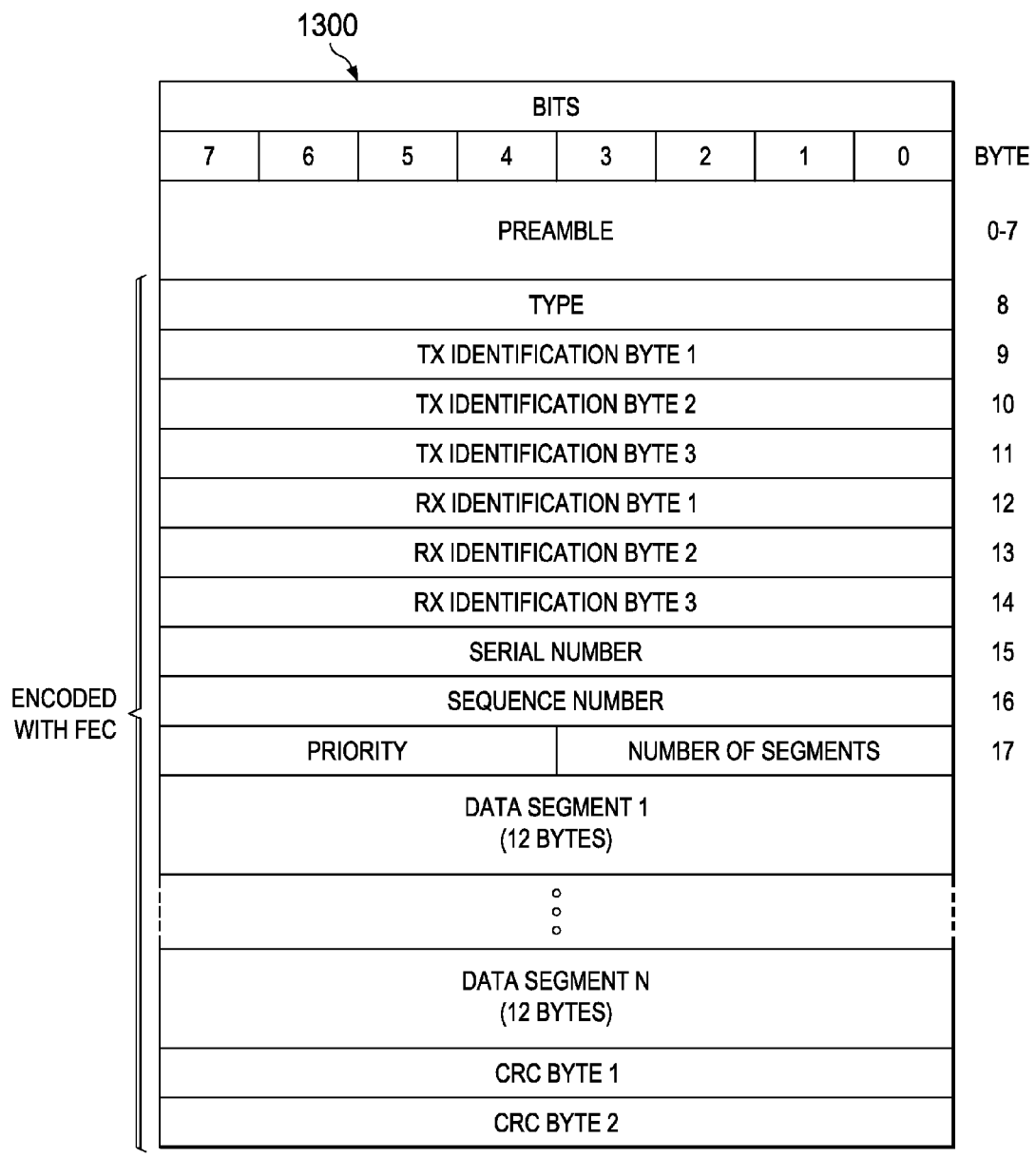
FIG. 13 is a diagram of a unicast data packet.

A unicast data packet 1300 is shown in FIG. 13 and the corresponding fields are described in Table 15. A Unicast data packet 1300 comprises packet overhead and data. The packet overhead has a fixed size of 20 bytes, comprising an eight-byte packet preamble and a twelve-byte link layer overhead. The data part consists of multiple data segments, each having a size of 12 bytes. At most 15 segments can be sent in one unicast data packet 1300. The information in the data segments could be inbound, outbound, peer-to-peer, or broadcast data traffic.

The data from type byte to the CRC byte is encoded with FEC and the size of the packet depends on the number of data segments in the packet. When the unicast packet is transmitted in a DTDMA partition, the packet size and the transmit bit rate determine the slot size that is required to support the packet.

As shown in Table 16, the unicast packet with x number of data segments is of length $8+16(x+1)$ bytes. Let the guard time required between DTDMA data packets be 2 ms. Then, the DTDMA slot size that is required to support x number of data segments is x+2 DSU in case of 32 kbps and 2x+4 in case of 16 kbps. Table 16 lists the packet size and the DTDMA slot size for the unicast packet at various numbers of data segments.

Figure 14:
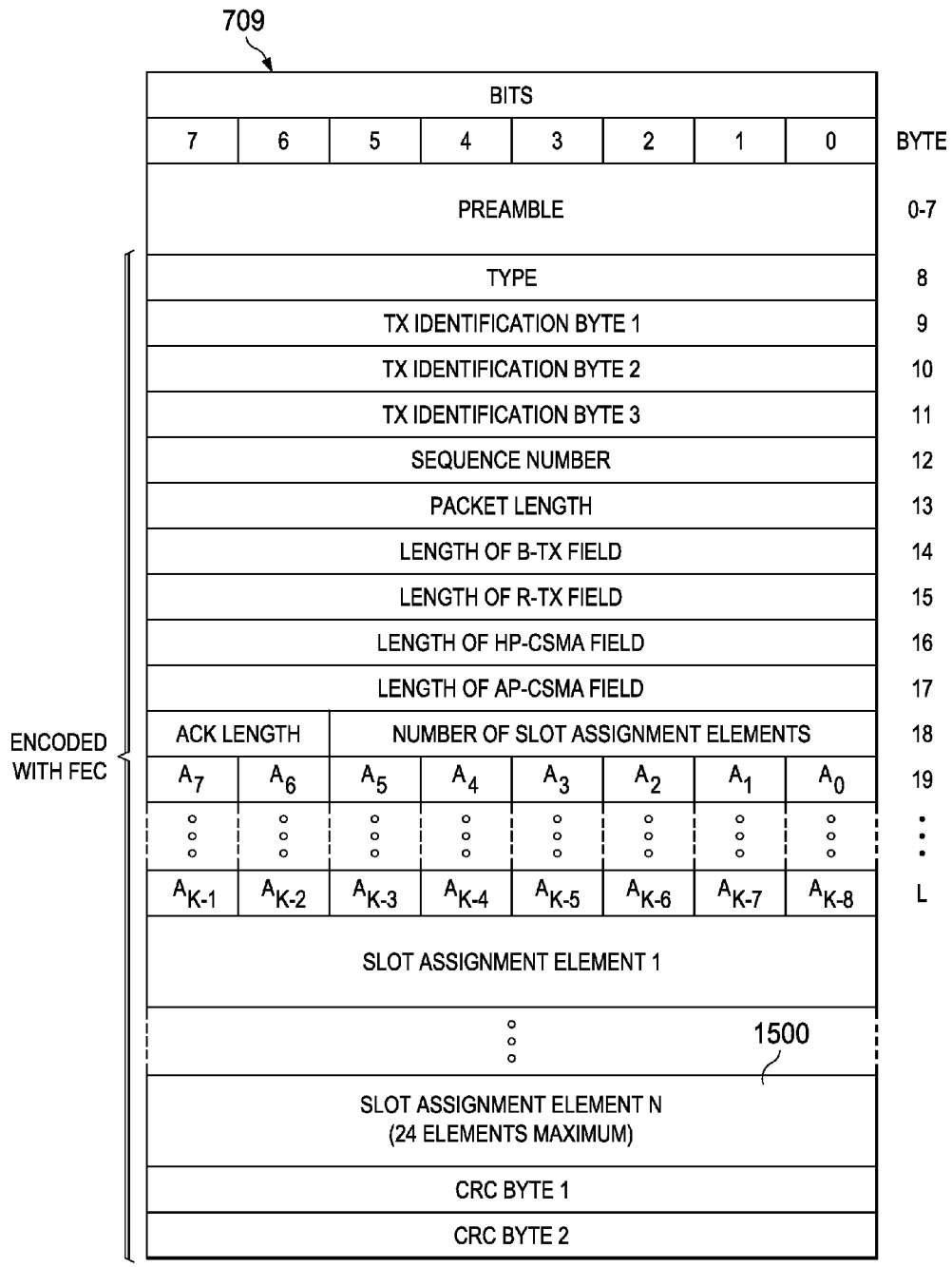
FIG. 14 is a more detailed diagram of the DTDMA control (CNTRL} packet shown in FIG. 7.
Figure 15:
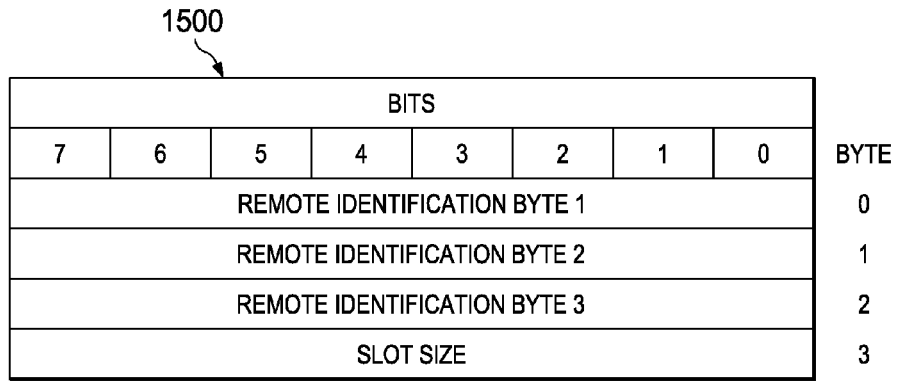
FIG. 15 is a diagram illustrating the preferred format for the slot assignment elements shown in FIG. 14.

FIG. 14 illustrates a DTDMA control (CNTL) packet 709 if FIG. 7 in further detail. The fields of the CNTL packet are summarized in Table 17. Each DTDMA control (CNTL) packet 709 carries information on the DTDMA control packet length, the length of DTDMA B-TX field 702, the length of the DTDMA R-TX field 703, the length of HP-CSMA field 704, the length of AP-CSMA field 705, an acknowledgement to inbound transmissions, and an assignment of R-TX slots 707 in the R-TX field 703. The assignment of R-TX slots is provided in the slot assignment elements, 1500 as shown in FIG. 15. The acknowledgement to inbound transmissions is a sequence of ACK bits, $A_0$ to $A_{K-1}$. The bit $A_k$ acknowledges the reception of an inbound packet in the R-TX slot k in the previous DTDMA cycle. Each CNTL packet 709 is FEC encoded from the type byte to the end of the packet.

Figure 16:
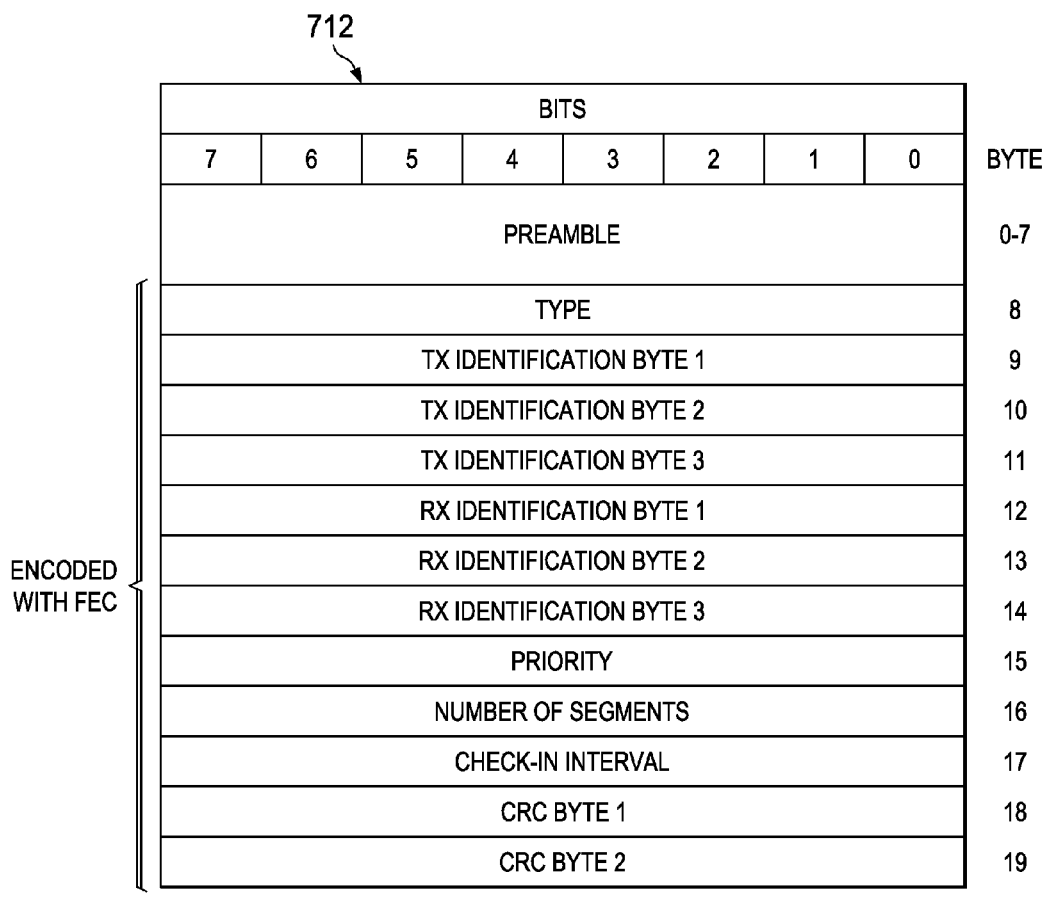
FIG. 16 is a diagram illustrating the preferred format of the DTDMA queue status (QSTAT) packet shown in FIG. 7.

Each queue status (QSTAT) packet 712 of FIG. 7 carries information on the priority and corresponding number of data segments in the remote transmit queue. If the remote radio has data with various priorities in the queue, the queue status packet carries information on the highest priority data in the remote queue. The QSTAT packet 712 preferred format is shown in FIG. 16 and the fields are summarized in Table 18.

The base beacon signal, which carries information about the currently associated base station 103 and the local channels 400 (FIG. 4) of the neighbor base stations 103. The base beacon signal is broadcast in the common channel (404 of FIG. 4). A base station 103 radio can be configured to broadcast the base beacon signal in both common channel and local channel to provide diversity such that the remote radios can still receive the base beacon signal when one of channel is interfered or of bad quality (although this technique uses twice channel resources).

Figure 17:
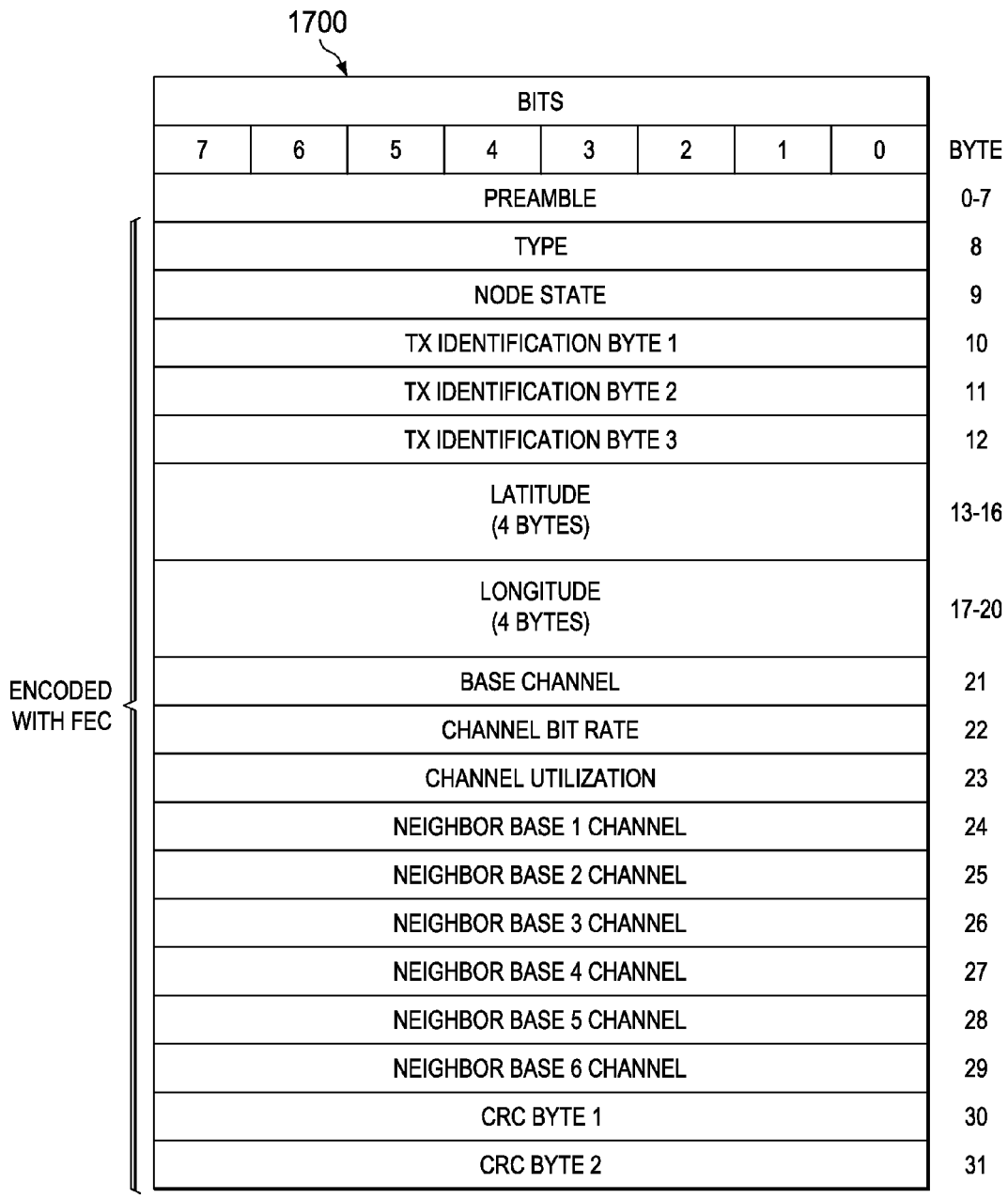
FIG. 17 is a diagram illustrating the preferred format of the base beacon signal.

The preferred base beacon packet format is shown in FIG. 17 and the base beacon packet fields are summarized in Table 19. As shown in FIG. 17, the base beacon signal includes:
ID—base radio ID.
Node state—link state of the base.
Location—location of the base in latitude and longitude.
Channel number—channel number of the base local channel.
Channel bit rate—transmit bit rate of the base station radio in DTDMA cycles. The bit rate can be either 16 kbps or 32 kbps, as pre-configured by network engineer or adaptable based on traffic demand.
Channel utilization—ratio of the channel use to the channel available.
This could be obtained from the ratio of the time that base assigns DTDMA slots for data transmission to the total available time for DTDMA cycles.
Channel numbers of neighbor bases—the set of these channel numbers can be pre-defined by the network engineer.

Figure 18:
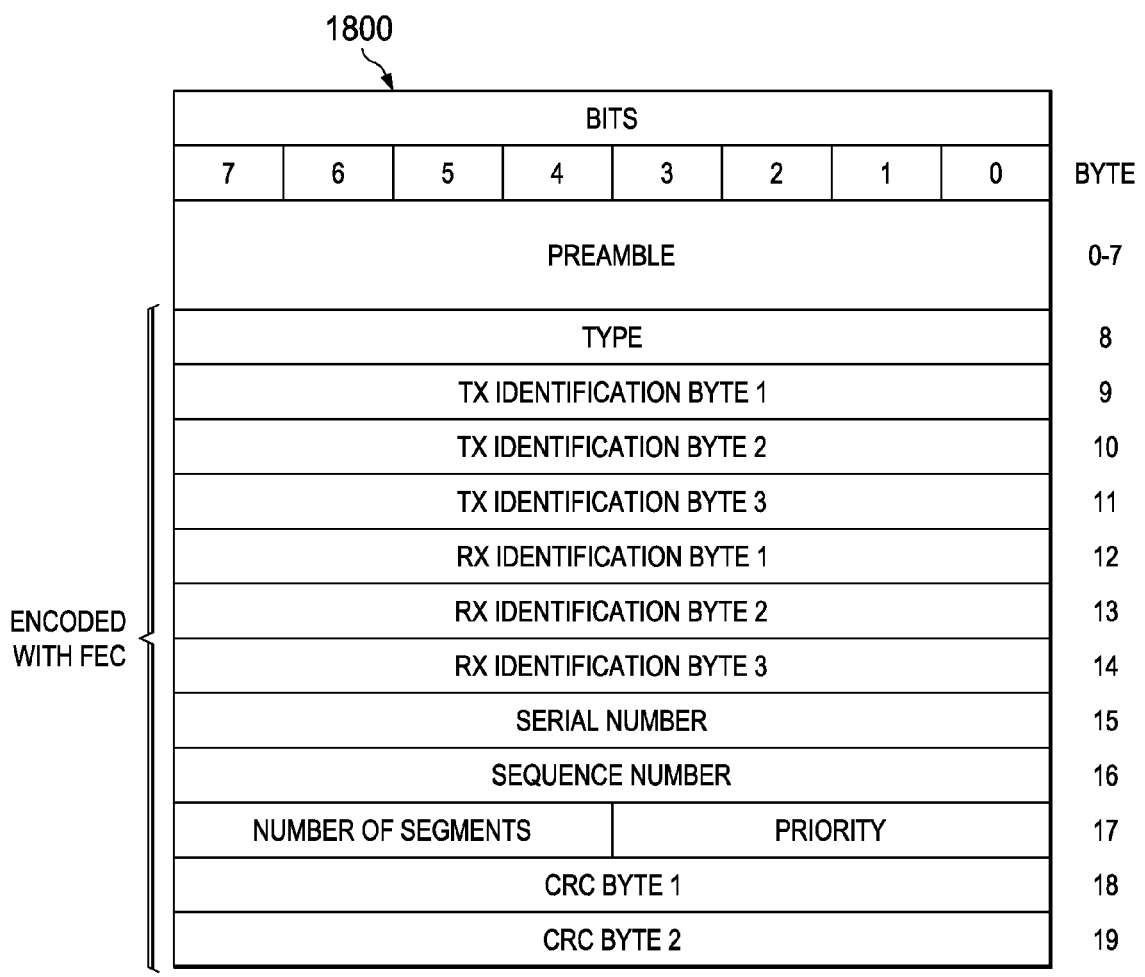
FIG. 18 is a diagram of a preferred format for an ACK packet.

The ACK packet sent in an R-TX field 703 (FIG. 7) to acknowledge the reception of an outbound packet from a base station 103 or a peer-to-peer packet from another remote radio. The ACK packet may include, for example, the information of the remote radio transmit queue. FIG. 18 shows the preferred format 1800 for the ACK packet, Table 20 summarizes the ACK packet fields, and Table 21 provides the length of R-TX slot 707 required to transmit an ACK packet at bit rates of 16 and 32 kbps with 2 ms guard time.

Figure 19:
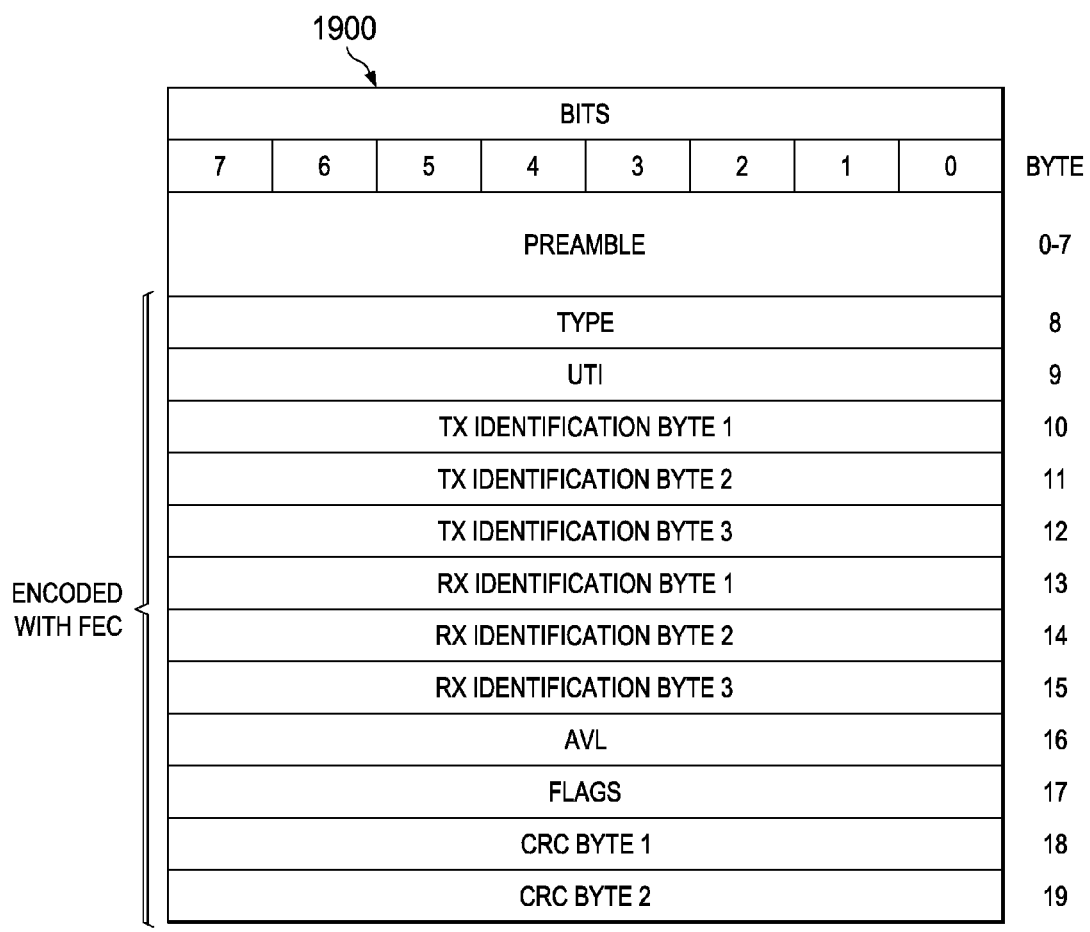
FIG. 19 is a diagram of a preferred format for an ACQ packet.

The packet is sent from a remote radio to the currently associated base station 103 when the remote radio initiates its connection with the base station radio. After receiving the ACQ packet from the remote radio, the base station radio will also respond with the ACQ packet. The ACQ packet is also sent from remote radio to its connected base station radio as a check-in to keep the connection with the base station 103. The preferred ACQ packet format 1990 is shown in FIG. 19 and the fields are summarized in Table 22.

Figure 20:
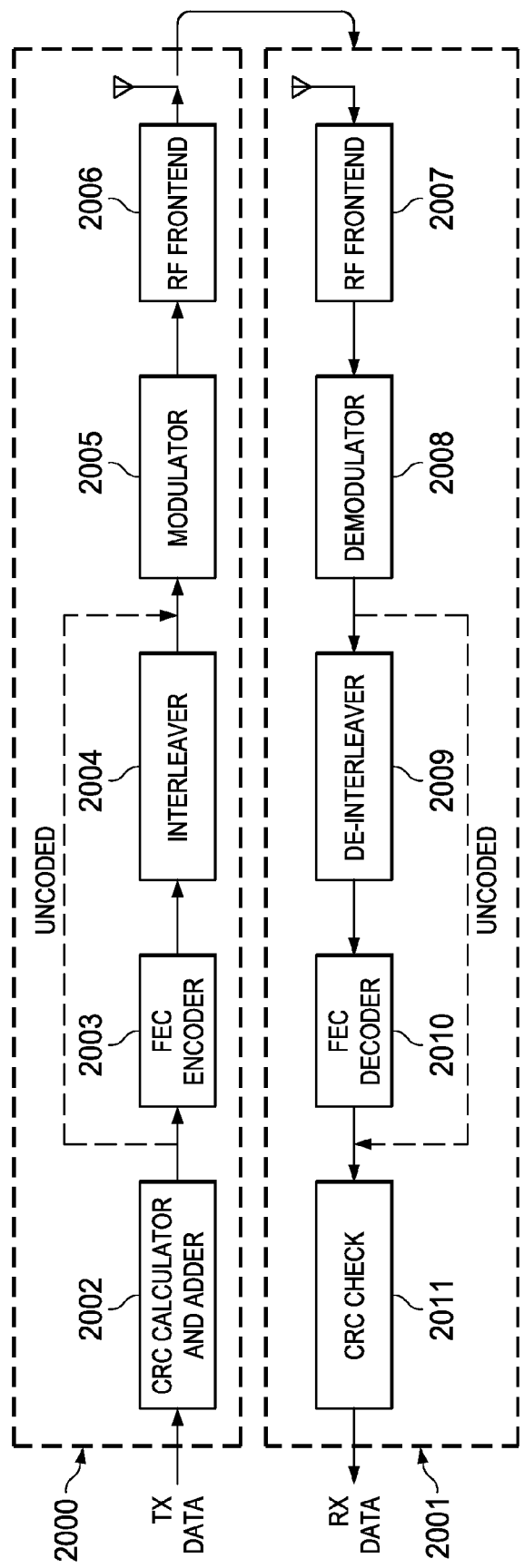
FIG. 20 is a diagram illustrating the overall process of transmitting and receiving packets.

Packet processing according to the principles of the present invention is shown in FIG. 20. Generally, the transmitting radio 2000 performs operations such as adding the CRC to the data, FEC encoding, interleaving, modulating, and finally transmitting the packet. The receiving radio 2001 generally performs a reverse process, which includes receiving the packet, demodulating, de-interleaving, FEC decoding, and checking the CRC.

In IPTC, as discussed above, a data packet may or may not be FEC encoded, depending on the data type. For the application data, the SH code indicates whether the data will be FEC encoded. The types of data that are not FEC encoded (also referred to as the un-coded types) are pre-specified (e.g. by parameter configuration) in the radios.

At the transmitting radio 2000, the CRC is first calculated (Block 2002) and added to the un-coded data. Next, the transmitting radio 2000 checks whether the data type is one of the un-coded types. If so, the data is directly modulated to the RF signal without encoding (Block 2005). Otherwise, the data is FEC encoded (Block 2003) and interleaved (Block 2004) before being modulated into the RF signal. The modulated RF signal is transmitted by the RF front end (Block 2006) and the transmit antenna.

At the receiving radio 2001, the RF signal received at the receive antenna and RF front end (Block 2007) is demodulated to information data (Block 2008). The receiver checks from the type byte whether the data is un-coded. If so, the data is processed without going through de-interleaving and FEC decoding. Otherwise, the data from the demodulator is de-interleaved (Block 2008) and then FEC decoded (Block 2009). After the demodulating and decoding process, a CRC check is applied to the data (Block 2011). If the CRC check is passed, the data are passed to the next process. Otherwise, the data are discarded.

Figure 21:
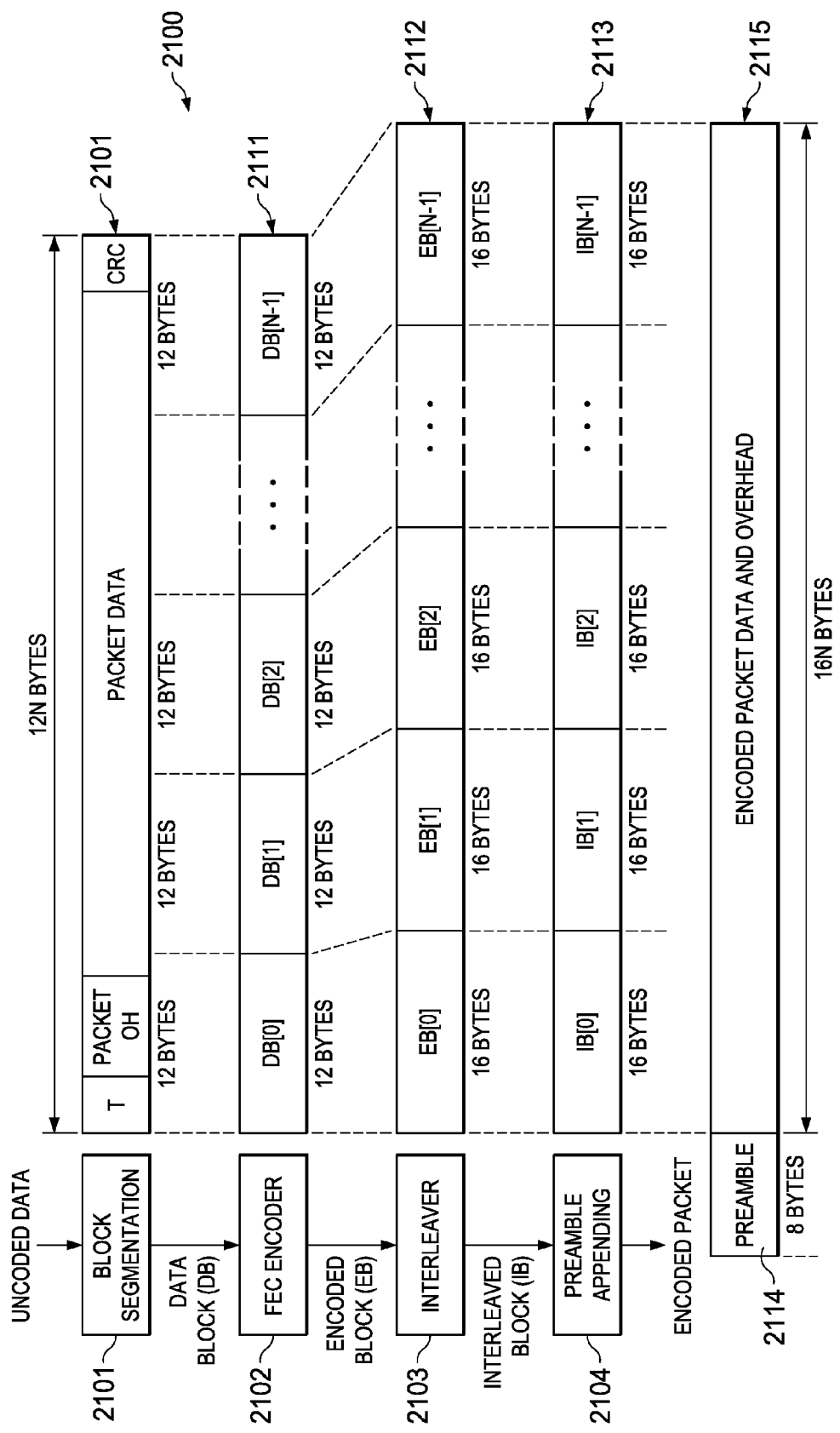
FIG. 21 is a more detailed diagram illustrating the processing of packets at a transmitting radio.

FIG. 21 illustrates a preferred packet processing procedure 2100, with FEC encoding, at the transmitter side, which begins with a sequence of un-coded data bytes 2110 to be sent is generated. A check is then made to determine if the data require FEC encoding. For the application layer data, the SH code indicates whether the FEC encoding is required. For the link layer data, the type of un-coded is specified in the radio.

If encoding is required, the data to be encoded are segmented into 12-byte data blocks DB[i] 2111 (Block 2101). Zero padding can be added at the end of the data sequence to make the last data block exactly 12 bytes in length. Each 12-byte data block 2111 is then FEC encoded, resulting in the 16-byte encoded block EB [i] 2112 (Block 2102). Zero padding in the last block is removed after the FEC encoding.

The encoded sequence is interleaved (Block 2103). The interleaving operation is applied to the second until the last encoded block, but not to the first encoded block. At the output of the interleaver, the interleaved sequence is concatenated with the first encoded block, forming the data sequence IB[i] 2113 that will be transmitted in the packet. A preamble 2114 is prepended to the data sequence, forming an RF packet 2115 that will be transmitted over the air (Block 2104).

If FEC encoding is not required, then block segmentation (Block 2101), FEC encoding (Block 2102) and interleaving (Block 2103) are not performed, and instead the preamble is directly appended to the data sequence (Block 2104)

Figure 22:
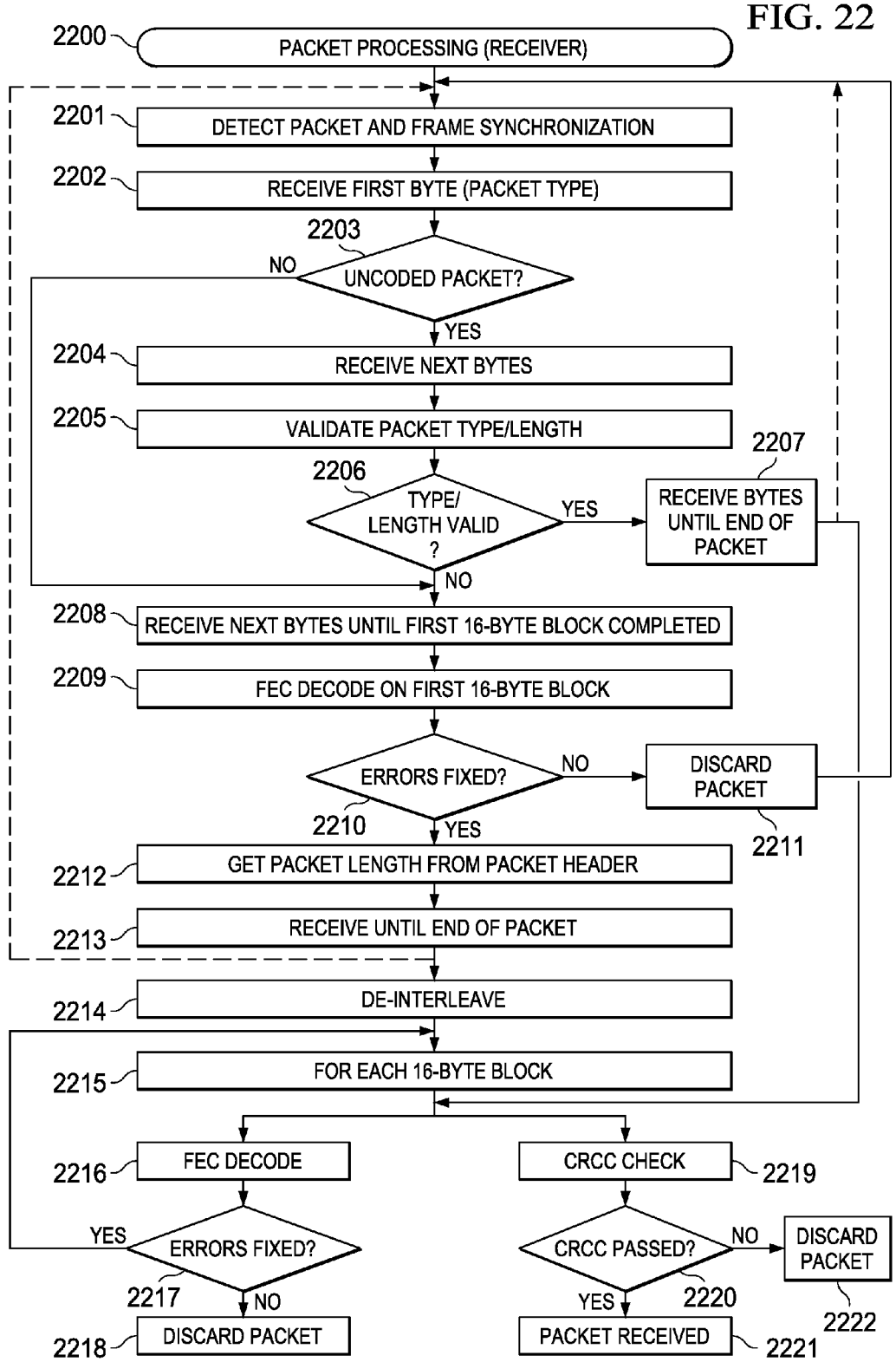
FIG. 22 is a flow diagram illustrating the processing of packets at a receiving radio.

FIG. 22 is a more detailed flow diagram illustrating a packet processing procedure 2200 at a receiving radio according to the principles of the present invention. The packet is detected from the preamble (Block 2201) and the first byte, which is the type byte, is received (Block 2202).

A check of the type byte determines whether the packet is un-coded (Block 2203). If the packet is un-coded, the bytes following the first byte are received (Block 2204). Information in the first few bytes is used to identify the end of the packet and determines if any checksum is available in the packet header. The received header bytes are then validated (Block 2205). If the header bytes are validated (Block 2206), bytes continue to be received until the end of the packet is reached (Block 2207)

If the packet is FEC coded (Block 2203) or header validation of an un-coded packet fails (Block 2206), bytes continue to be received until a first FEC 16-byte block is completed (Block 2208). The first FEC block is then decoded (Block 2209). In the FEC decoding process, if any errors cannot be fixed (Block 2210), the packet is discarded (2211). Otherwise, the information on the packet structure (such as packet type and length) is obtained from the decoded block (Block 2212).

Bytes continue to be received until the end of the packet (Block 2213). The received byte sequence after the first 16 bytes is segmented into 16-byte blocks, which are de-interleaved (Block 2214). Zero padding is added during the de-interleaving process if needed.

The de-interleaved 16-byte blocks are FEC decoded (Blocks 2215 and 2216). Zero padding is removed from the last decoded block. In the FEC decoding process, if any errors cannot be fixed (Block 2217), the packet is discarded (Block 2218). Otherwise, the decoded sequence is formed.

A CRC check is applied to the decoded sequence (Block 2219). If the validation fails (Block 2220), the packet is discarded (Block 2222). Otherwise, the packet is received and passed to the next process (Block 2221).

In the preferred embodiment, a Reed-Solomon code RS(16,12) on an 8-bit symbol is used for the FEC. The RS encoder (Block 2003, FIG. 20) takes a data block (DB) of 12 bytes and outputs an encoded block (EB) of 16 bytes containing 12 bytes of original data and 4 parity check bytes.

Data to be encoded starts with the least significant bit of the first byte (e.g. the type byte) of the packet and proceeds through each byte from the least to the most significant bit. A sequence of 12-byte data forms one data block. Subsequent blocks begin with the data bit in the sequence following the last bit in the previous data block.

Let d[i], i=0, 1, 2, ..., denote the ith data byte in the packet, with d[0] being the first byte (i.e. type byte) in the packet. The data blocks to be FEC encoded are as follows:

$DB[0]=(d[0],d[1],d[2],d[3],\ldots,d[11])$ $DB[1]=(d[12],d[13],d[14],d[15],\ldots,d[23])$ $DB[2]=(d[24],d[25],d[26],d[27],\ldots,d[35])$

. . . .

Each data byte d[i], which consists of 8 bits, is regarded as a symbol in the Galois field $GF(2^8)$. The $GF(2^8)$ is constructed from a primitive polynomial:

$P(x)=x^8+x^4+x^3+x^2+1$

Each 12-byte data block is then encoded into 16-byte codeword based on the RS encoding rule. Let $p_j[0]$, $p_j[1]$, $p_j[2]$, and $p_j[3]$ be the four RS parity bytes resulting from encoding the data block j (DB[j]). Then the encoded blocks at the output of FEC encoder are as follows:

$EB[0]=(d[0],d[1],d[2],d[3],\ldots,d[11],p_0[0],p_0[1],p_0[2],p_0[3])$ $EB[1]=(d[12],d[13],d[14],d[15],\ldots,d[23],p_1[0],p_1[1],p_1[2],p_1[3])$ $EB[2]=(d[24],d[25],d[26],d[27],\ldots,d[35],p_2[0],p_2[1],p_2[2],p_2[3])$ At the output of FEC encoder, the encoded blocks are concatenated to form a sequence of encoded data:

(EB[0],EB[1],EB[2],... EB[N−1])

where N is the number of data blocks in a packet.

At the receiver, the received encoded blocks are formed from the received data sequence and then FEC decoded based on the RS decoding rule.

The interleaving operation of Block 2005 of FIG. 20 is based on block interleaving, where the block interleaver takes blocks of encoded data and performs permutations over each block. This is accomplished, for example, by writing the blocks to be interleaved into rows of a matrix (with the first block in the first row, the second block in the second row, and so on), and then reading the data out of the matrix by columns.

Figure 23:
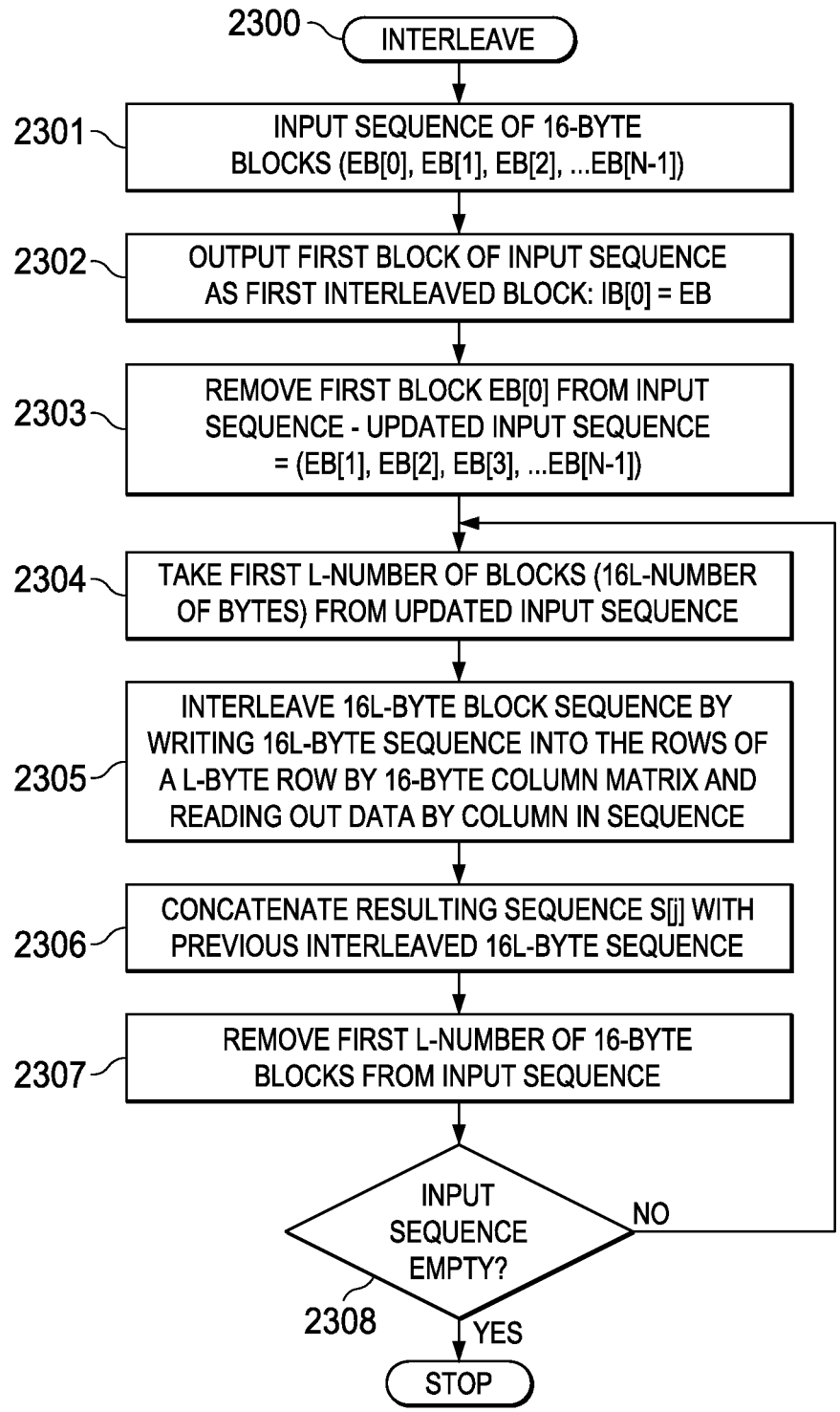
FIG. 23 is flow diagram of a preferred interleaving procedure suitable for application in the transmit-side interleaving operation of FIG. 20.

The interleaving operation is applied to every encoded block except the first block. The interleaver is constrained to interleave at most Lmax blocks each time. The default value of Lmax is 6. Let the input of the interleaver be the sequence of N encoded 16-byte blocks, (EB[0], EB[1], EB[2], ..., EB[N−1]), and the output of the interleaver be the sequence of N 16-byte blocks, (IB[0], IB[1], IB[2], ..., IB[N−1]). A preferred interleaving process 2300 is shown in FIG. 23.

For FEC encoded data, the data sequence (EB[0], EB[1], EB[2], ..., EB[N−1]) is interleaved prior to modulation (Block 2005 of FIG. 20). Interleaving enhances the random error correcting capabilities of the RS code to provide robustness against burst errors. The interleaver rearranges the encoded data bytes over multiple encoded blocks. This effectively makes long burst errors in one codeword appear as shorter errors in multiple codewords, hence increasing the chance of correcting the errors.

The sequence of encoded 16-byte blocks EB(i) is received (Block 2301). The first 16-byte block is not interleaved and therefore, at Block 2302 of FIG. 23, the output block from the interleaver IB(0) is the same as the first input block EB(0):

IB[0]=EB[0]

The first block is removed, at Block 2303 of FIG. 23, from the input sequence, such that the updated input sequence becomes (EB[1], EB[2], EB[3] ..., EB[N−1]).

The block interleaver next takes the first L blocks (16L bytes) in the updated input sequence (Block 2304). If more than Lmax blocks are in the updated input sequence, L is set to Lmax. Otherwise, L is set to the number of blocks in the sequence.

The interleaving operation is performed, at Block 2305 of FIG. 23, on the 16L-byte sequence by writing the sequence of data bytes into rows of an L-byte row by 16-byte column matrix, and then reading the data out of the matrix by columns. For example, let the sequences U[i] and S[j], where i,j=0, 1, ..., 16L−1, represent the input and output bytes of the block interleaver, respectively. The input-output relationship of this interleaver is given by:

$S[j]=U[\mathrm{floor}(i/L)+16\times\mathrm{mod}(i,L)]$, where the function floor(•) returns the largest integer value less than equal to its argument value and the function mod(i, L) returns the remainder after division of i by L.

The sequence S[j] from the block interleaver is then concatenated with the previous output of the interleaver, with the first byte of the sequence S[j] following the last bytes of the previous output of the interleaver (Block 2306). The first L blocks are removed from the input sequence (Block 2307) and the operations at Blocks 2304-2307 of FIG. 23 are repeated until the input sequence is empty (Block 2308).

As an example, let a sequence of four 16-byte blocks, (EB[0], EB[1], EB[2], EB[3]), be an input to the interleaver. Each of the blocks carries data and FEC parity bytes, described above. At Blocks 2301 and 2302 of FIG. 23, the interleaver outputs:

$$IB[0]=EB[0]=(d[0],d[1],d[2],d[3],\ldots,d[11],p_0[0],p_0[1],p_0[2],p_0[3])$$

At Block 2303, the block EB[0] is removed from the input sequence, resulting in the updated input sequence (EB[1], EB[2], EB[3]). At Block 2304, L is set to 3 and the block interleaver performs the interleaving operation on the input sequence:

$$U[i] = (EB[1], EB[2], EB[3]) =$$
$$(d[12], d[13], d[14], d[15], \ldots, d[23], p_1[0], p_1[1], p_1[2], p_1[3],$$
$$d[24],d[25],d[26],d[27], \ldots ,d[35],p_2[0],p_2[1],p_2[2],p_2[3],$$
$$d[36],d[37],d[38],d[39], \ldots ,d[47],p_3[0],p_3[1],p_3[2],p_3[3]),$$

yielding the output sequence:

$$S[j] =$$
$$(d[12], d[24], d[36], d[13], d[25], d[37], \ldots, p_1[3], p_2[3], p_3[3]) =$$
$$(IB[1], IB[2], IB[3])$$

In Block 2306, the sequence S[j]=(IB[1], IB[2], IB[3]) is concatenated to the previous output of the interleaver, which is IB[0], resulting in the output sequence (IB[0], IB[1], IB[2], IB[3]). In Block 2307, the 3 blocks are removed from the input sequence. This empties the input sequence and ends the interleaving process (Block 2308 of FIG. 23).

Figure 24:
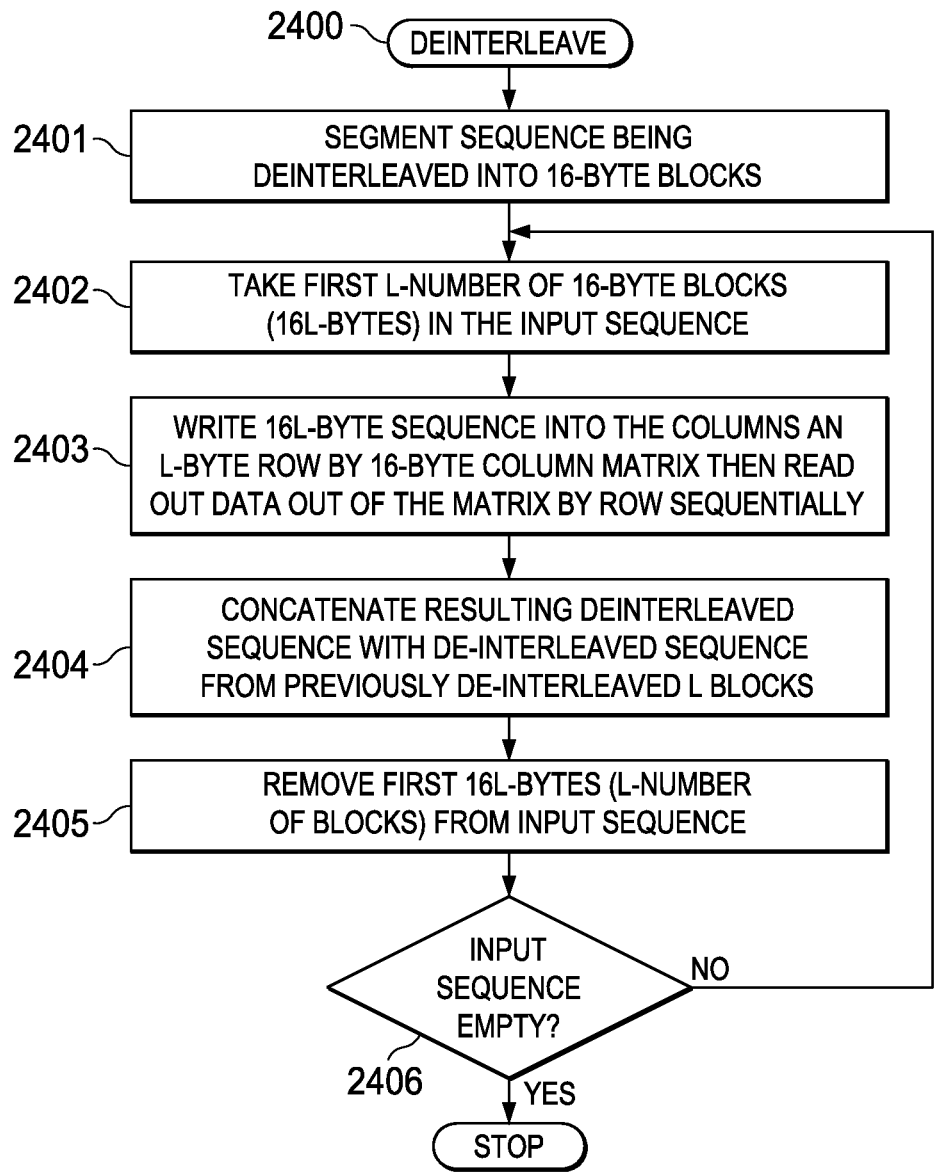
FIG. 24 is a flow diagram of a preferred de-interleaving procedure suitable for application in the receive-side de-interleaving operation of FIG. 20.

A preferred de-interleaving procedure 2400, which is used at the receiving radios to de-interleave the received data sequence (Block 2009, FIG. 20), is shown in FIG. 24.

At Block 2401 of FIG. 24, the input sequence to be de-interleaved is segmented into 16-byte blocks. The de-interleaver takes the first L 16-byte blocks (16L bytes) in the input sequence (Block 2402). If the length of the input sequence is more than 16Lmax bytes, L is set to Lmax. Otherwise, L is set to the number of blocks in the sequence.

At Block 2403, the de-interleaving is performed on the 16L byte sequence by writing the sequence of data bytes into columns of an L-byte row by 16-byte column matrix (from the first column, to the second column, and so on, until the $16^{th}$ column). Then data are then read out of the matrix by rows (from the first row, to the second row, and so on until the $L^{th}$ row).

The output of the de-interleaver is concatenated with the previous output of the de-interleaver (Block 2404) and then the first 16L bytes are removed from the input sequence. The operations at Blocks 2402-2405 are repeated until the input sequence is empty (Block 2406).

Figure 25:
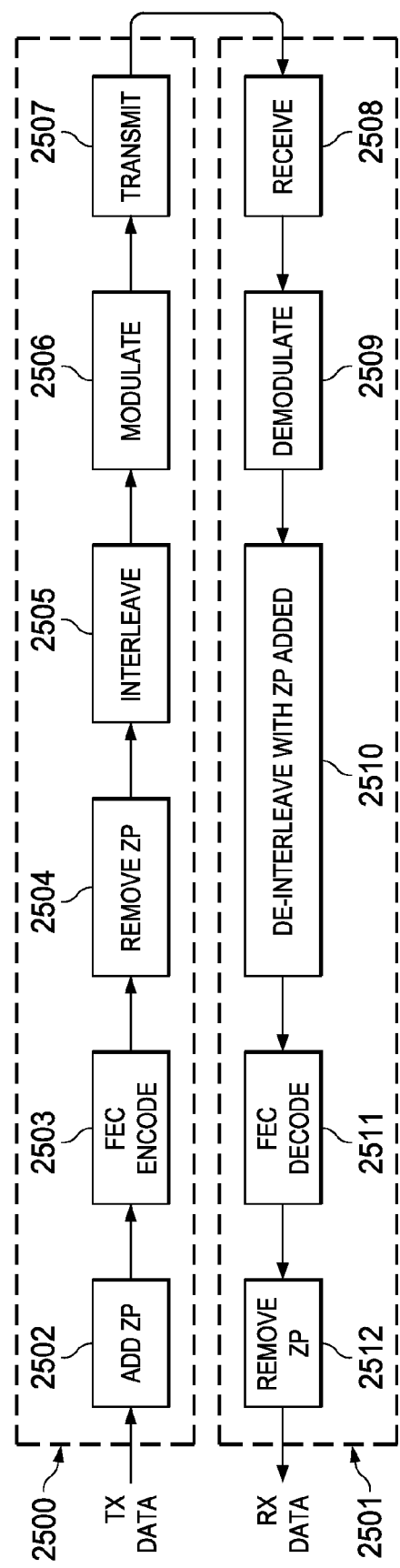
FIG. 25 is a diagram illustrating the processing of data packets with zero padding.

Zero padding (ZP) is part of the FEC encoding and interleaving procedures. In particular, when the length of data sequence to be FEC encoded is not integer multiple of 12 bytes, the ZP procedure is applied to the data before and after the given encoding or decoding process. The ZP is not transmitted over the air. Instead, on the transmitter side, the ZP is added before the data is FEC encoded and removed after the FEC encoding. On the receiver side, the ZP is added before the data is FEC decoded and removed after the FEC decoding. The transmit/receive process that includes the ZP procedure is shown in FIG. 25.

On the transmitter side (generally at 2500), the ZP is added at the end of the un-coded data sequence to make the last data block exactly 12 bytes in length (Block 2502). Each data block is FEC encoded, as described above (Block 2503). The ZP is removed from the last encoded block (Block 2504). The encoded data sequence with ZP removed is interleaved, modulated, and transmitted, as described above (Blocks 2505, 2506, 2507).

On the receiver side (generally at 2501), the packet is received and demodulated (Blocks 2508, 2509). After the first FEC block is decoded, information in the first decoded block indicates the length of the data to be decoded. The length of ZP is determined from the length of the data. Let the ZP length be K.

At Block 2510, the data are de-interleaved and decoded without ZP procedure until the last L (L<=Lmax) blocks in the received data sequence. To de-interleave the last L blocks, the K-byte ZP is placed in the last row and the last K columns of the de-interleaver matrix, described above. The data are de-interleaved. The last de-interleaved block will contain K-byte ZP at the end of the block. In the last de-interleaved block, the K-byte ZP moves to the data part and the FEC parity bytes move to the end of the block.

At Block 2511 the de-interleaved blocks are FEC decoded, after which the K-byte ZP is removed from the last FEC decoded block (Block 2512).

As discussed above, a base station 103 can transmit data in the DTDMA partition of the local channel, the FTDMA partition of the local channel, or in the common channel.

Data transmitted in the DTDMA partition (FIG. 4) on a local channel (400, FIG. 4) includes application data traffic such as outbound and broadcast data traffic and control data traffic such as acquire (ACQ) and acknowledgement (ACK). Data transmitted in the FTDMA partition (FIG. 4) of a local channel 400 includes the base timing signal to provide the slot timing for FTDMA transmission. The transmit bit rate in the given local channel 400 is the base bit rate which can be configured to either 32 kbps or 16 kbps.

Data transmitted in the common channel (404, FIG. 4) includes the base beacon signal. The transmit bit rate in the common channel 404 is fixed at 16 kbps.

As discussed above, outbound data are application data that are sent to a specific remote radio. Outbound data are sent in a unicast data packet with the RX-ID as the remote radio ID and in a B-TX slot in the DTDMA partition of the local channel 400, as shown in FIG. 4. An outbound data packet is transmitted at the base bit rate, which is a configurable parameter that can be either 16 kbps or 32 kbps. The acknowledgment from the intended remote radio is required to indicate the successful transmission of the outbound data packet.

In contrast, Broadcast data are application data that are sent to any remote radio as either a unicast or a broadcast data packet. These packets are sent in the B-TX field in the DTDMA partition of the local channel 400 (see FIG. 4). When transmitted in unicast packet, the RX-ID will be the broadcast ID.

As also previously indicated, the base beacon signal is periodically broadcasted from a given base station 103 once every base beacon interval. The default base beacon interval is 30 seconds. The base beacon signals carry the base station information such as base station ID, link state, location, channel numbers of the base station and its neighbors, channel utilization, and channel bit rate. Remote radios use the information in the base beacon signal as well as the received signal strength to select a base station 103. The base beacon signal can be sent in the common channel 404 only or in both the common and local channels shown in FIG. 4. In either case, the base beacon signal is sent in a B-TX slot in the DTDMA partition at the bit rate of 16 kbps. Base stations 103 coordinate the time to transmit base beacon signals.

A base station 103 radio acknowledges the reception of inbound traffic from previous DTDMA cycle in the DTDMA control packet. In the preferred embodiment, the acknowledgement field is shown in FIG. 14 where a bit in the field is used to acknowledge the reception of packet from one remote radio. The acknowledgement bit is set to 1 for ACK and 0 for NACK.

The base timing signal is an optional control packet that is periodically broadcast as a FTDMA data packet at the beginning of superframe (401, of FIG. 4) and allows the remote radios to derive the slot timing in the superframe. Although, the remote radios use a GPS signal as the primary source of slot timing when available, the base timing signal provides a secondary source of slot timing in case when the GPS signal is not available. The base timing signal is sent at the base station bit rate.

A remote radio transmits information to base during the DTDMA partition in the local channel (400, FIG. 4). Data to be transmitted includes application data such as inbound data traffic and control data traffic such as queue status and acknowledgement.

The transmit bit rate for the communication with a base station can be either 16 kbps or 32 kbps, depending on the remote radio type and the base bit rate. Table 23 summarizes the transmissions from a given base station 103, including channel and transmission cycle type and bit rate. A wayside radio always transmits at 16 kbps. A locomotive radio transmits at the base station bit rate, as according to the information in the received base beacon signal. A remote radio sends information on the transmit bit rate to the base station radio when the remote radio initiates its connection with the base station 103. Table 24 summarizes the transmissions from a given remote radio, including channel and transmission cycle type and bit rate.

The data transmissions from a remote radio to base include inbound data, broadcast data, and queue status, acknowledgement, and acquire. Inbound data are data that are sent to the office network at central office 101. Inbound data are sent in unicast data packets with the RX-ID of the associated base radio ID. Inbound data packets are sent in the R-TX slots in the DTDMA partition of the local channel 400. The acknowledgment from the associated base station radio indicates the successful transmission of the inbound data packet. In particular, the base station radio acknowledges the reception of inbound packet in the acknowledgement field of the DTDMA control frame (see FIG. 4).

The queue status contains information on the highest priority and the corresponding number of segments of data in the remote radio transmit queue and is included in the QSTAT packet and the ACK packet. The QSTAT packet can be sent in the R-TX slot or CSMA slot, as discussed above.

A remote radio acknowledges the reception of outbound traffic by transmitting an ACK packet in an R-TX slot. The associated base station 103 schedules an R-TX slot for the remote radio to transmit an ACK after the B-TX slot that the base sends an outbound data packet to the remote radio.

A remote radio sends an acquire packet (ACQ) to the associated base station 103 when the remote radio initiates its connection with the base. A remote radio also periodically sends the acquire packet to check-in to the associated base station 103 to maintain the connection. The acquire packet can be sent in the CSMA slot or the R-TX slot, as discussed above.

Each remote radio uses information from base beacon signals for base station selection. In the illustrated embodiment, the base beacon signal from every base station 103 is broadcast in the common channel at the rate of 16 kbps. Each remote radio sets one receive channel to the common channel at the 16 kbps bit rate. This allows the remote radio to hear the base beacon signal from any base within the transmission range. As discussed above, the base beacon signal includes base ID, location, channel numbers of the base and its neighbors, channel bit rate, and channel utilization.

Once a remote radio receives the base beacon signal, that remote radio not only gets data information from the base beacon signal, but also measures the receive signal strength of the RF communication link. The remote radio also keeps track of the number of received packets from each base station 103 within the transmission range. When communicating with a base station 103, a remote radio records the ratio of packet transmitted to the ACK packets received (referred to as T/A ratio). Each remote radio maintains all this information in a table, referred to as the base information table, which is then used to select a base station 103 and to configure the local channel parameters (i.e., channel frequency and bit rate).

An example of a base information table at a remote radio is shown in Table 25. In this example, the remote radio receives base beacon signals from three base stations, base 1, base 2, and base 3. Each base beacon signal indicates the channel numbers of the base station 103 and six neighbor base stations 103. The remote radio is connected with base 1, and it keeps the record of the T/A ratio for the communication with base 1. The remote radio sets one receive channel to the common channel (C0), one receive channel to the connected base channel (C1), and other six receive channels to the neighbor base station channels (C2 to C7) as specified in the base station 101 beacon signal.

The criteria in selecting a base station 103 include the configurable parameters:

(1) If the T/A ratio is below a threshold, keep current master if it is a base station 103 or a repeater, unless there is another base station 103 or repeater that is 20% closer;

(2) Skip nodes farther than 100 miles away;

(3) Skip nodes with receive signal strength less than −100 dB;

(4) Only consider radios with RX packet counts higher than a threshold;

(5) Choose base station 103 with highest receive signal strength except if within 3 miles;

(6) If current base station 103 is offline, don't select it again unless it is the only base station available;

(7) If distance to the base station 103 is known, choose the base station 103 with shortest distance;

(8) If distances are known, change to new base station 103 if it is 20% closer than the current base; and (9) In addition to the criteria above, a remote radio can also take channel utilization information into consideration as follows: Choose a base station 103 that meets criteria above and has channel utilization less than a threshold unless it is the only candidate available (another base station 103 is considered candidate if it meets the criteria above, has capacity less than a threshold, and has receive signal strength within 80% of the first candidate).

To prevent a remote radio from thrashing back and forth between one base station 103 and another, after a remote radio selects and connects to a new base station 103, that remote radio must stay on the new base station 103 for at least a certain period of time unless that base station 103 is offline.

Once a remote radio selects a base station 103 to associate with, that remote radio keeps one receive channel on the common frequency at 16 kbps, sets one receive channel to the connected base frequency at 16 and 32 kbps, and other receive channels to neighbor base station frequencies (as specified in the base beacon signal) at 16 kbps. On the transmitter side, the remote radio also switches its transmitter to the selected base station channel. A wayside radio sets the transmit bit rate to 16 kbps, while a locomotive radio sets the transmit bit rate to that of the selected base bit rate (which is also specified in the base beacon signal).

In direct peer-to-peer communications between remote radios, a first remote radio sends peer-to-peer information to a second remote radio by using its assigned R-TX slots in the R-TX field or using available CSMA in the common channel 404 (FIG. 4). The common channel 404 is preferably reserved only for very high priority messages.

In base repeated peer-to-peer communications, a remote radio sends a packet to another remote radio through a repeating base station 103. A remote radio sends peer-to-peer information using its assigned R-TX slots in the R-TX field. The associated base station 103 then repeats the information using B-TX slots in the B-TX field.

In IPTC, wayside 404 communications involve three message types, including WIU status, WIU status request, and WIU beacon on. The SH code in the message header provides instructions on how to handle these messages. At the link level, each of these IPTC wayside messages is broadcast and does not require acknowledgement.

Figure 26:
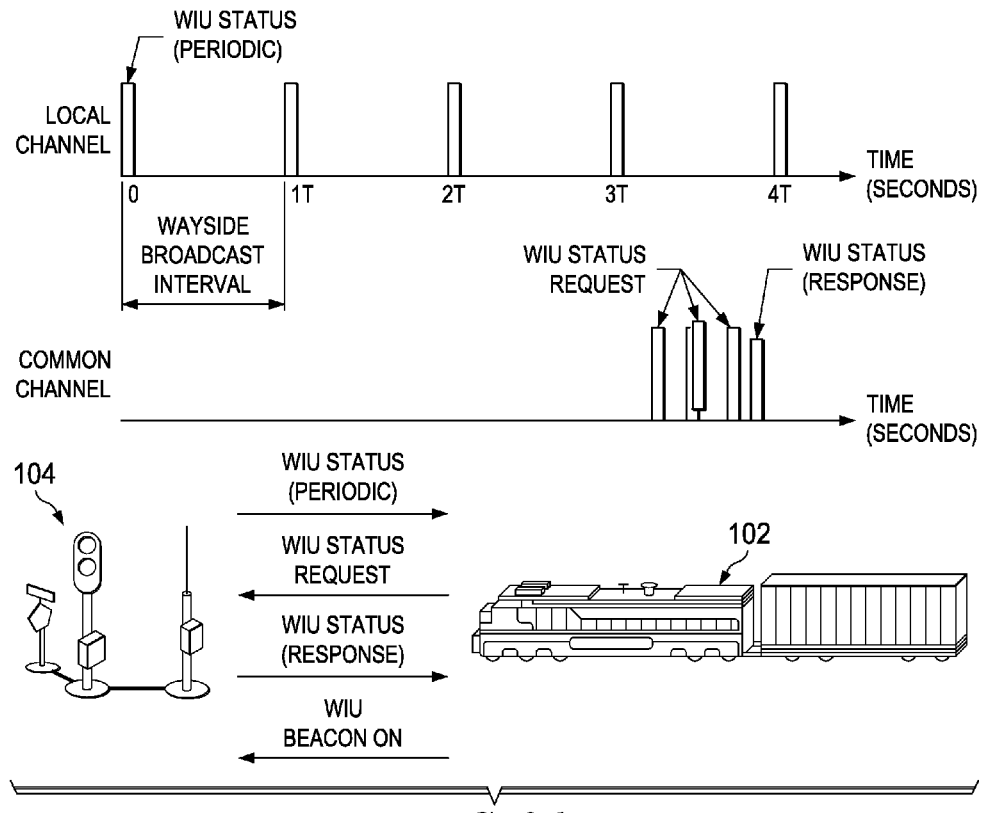
FIG. 26 is a diagram illustrating message transmissions during wayside communications.

FIG. 26 illustrates transmission of IPTC messages during wayside communications, and Table 26 provides a summary of the available messages. (Wayside communications also involves other non-IPTC messages such as network management messages. The non-PTC messages are preferably sent between base stations 103 and wayside 104 radios in the outbound or inbound data packets during the DTDMA cycles.)

A WIU status message contains information representing wayside signal indications and switch positions. This message is generated at the WIU and transported to the link layer in the wayside 104 radio. WIU status messages can be sent periodically or in response to a WIU status request.

Periodic WIU status messages are broadcast from a wayside 104 radio in the FTDMA slot every wayside broadcast interval, which is a configurable parameter with a default value of 3 seconds. (The superframe duration is also set to the wayside broadcast interval.)

At the WIU, the periodic WIU status message is generated every second. Associated with the message is data handling information, which includes: (1) priority indicating the highest priority; (2) the SH code indicating that the message is of short broadcast type that will be sent via FTDMA; and (3) the FTDMA slot configuration including the start and length of FTDMA slot.

The WIU status message and the data handling information are passed to the link layer in the wayside radio, where the WIU status message is placed in the FDQ, discussed above. The WIU status message is carried in one short broadcast data packet, which is sent in the FTDMA slot that is specified in the slot configuration. As the periodic WIU status messages are broadcast at a high rate and the transmission range is relatively short, they are sent un-coded to reduce overhead and increase the channel throughput.

The FTDMA slot configuration information defines the start and the length of FTDMA slot (601, FIG. 6). The length of FTDMA slot depends on the length of WIU status message, and can be determined as follows. As specified by the SH code, the periodic WIU status message will have the message overhead stripped off at the transport layer (e.g. 302, FIGS. 3 and 8) before it is passed to the link layer (e.g. 304, FIGS. 3 and 8) in the radio. Thus, there is no message overhead transmitted over-the-air. According to the structure of the short broadcast data packet, the packet carries a total overhead of 12 bytes. As the WIU status message is transmitted by wayside 104 radio, the transmit bit rate is always 16 kbps.

In this example, if the FSU is 1 ms and the required guard time is 2 ms (2 FSU), then, using the formulation discussed above, the FTDAM slot length for an x-byte WIU status message can be calculated as:

$$L(x) = \text{ceiling}(x/2) + 8\text{FSU}$$

where the function ceiling(•) returns the smallest integer value greater than or equal to its argument value.

A wayside 104 radio can transmit more than one WIU status messages in the FTDMA cycle. In this case, the wayside radio will be assigned multiple FTDMA slots, one for each WIU status message.

A WIU status response is generated from the WIU as a response to WIU status request message (discussed further below). The WIU transmits one WIU status response message for each of the WIU status request message the WIU receives.

The WIU status response is the essentially the same as the periodic WIU status message, although that the WIU status response message is sent only once via CSMA in the common channel (404, FIG. 4). Additionally, the data handling information associated with a WIU status response message differs from the periodic WIU status message. Specifically, the data handling information for the WIU status response message includes: (1) priority indicating the second highest priority; and (2) the SH code indicates that the message is of long broadcast type and will be sent in common channel.

The WIU status response message from the WIU is transported from the WIU to the link layer in the wayside 104 radio, where the message is placed in the CDQ. The message is then transmitted in a long broadcast packet via CSMA. After the message is transmitted, the message is removed from the radio transmit queue.

A WIU status request is generated at the locomotive 102 when the locomotive 102 does not receive WIU status message from its approaching wayside 104 within the last 9 seconds. The generated WIU status request and the data handling information are transported to in the locomotive radio. The data handling information for the WIU status request message includes: (1) priority indicating the second highest priority; and (2) an SH code indicating that the message is of the long broadcast type and will be sent in the common channel (404, FIG. 4).

Based on the data handling information, the WIU status request message will be placed in the CDQ of the locomotive radio. The locomotive radio transmits the WIU status request message in the long broadcast data packet, which is sent via CSMA in the common channel. After the message is transmitted, the message is removed from the radio transmit queue.

A WIU Beacon On message is generated from a locomotive 102 to turn on the periodic WIU status transmission at the WIU. The locomotive radio generates the WIU Beacon On message when the locomotive 102 is close to the 104 wayside but the locomotive does not hear any WIU status message for 20 seconds. The locomotive 102 also generates the WIU Beacon On message to reset the beacon on timer at the approaching wayside if the timer is about to expire.

The WIU Beacon On message is addressed to a specific WIU. The message and message header as well as data handling information are transported from the locomotive host (215, FIG. 2) to the link layer (304, FIGS. 3 and 8) in the locomotive radio. The data handling information for the WIU Beacon On message includes: (1) priority indicating third highest priority; and (2) an SH code indicating that the message is of the long broadcast type and will be sent in common channel WIU Beacon On messages are sent as broadcast packets from the locomotive radio, using either CSMA in the common channel or DTDMA in the local channel. After the message is transmitted, the message is removed from the locomotive transmit queue.

WIU message repeating allows a periodic WIU status message to be sent from one wayside radio and then repeated by another radio. The radio that repeats the WIU status message can be a base station 103 radio or a wayside 104 radio. Advantageously, WIU message repeating increases the transmission range of a transmitting wayside 104, although repeating a WIU status message uses twice as many channel resources as a single status message. Therefore, WIU message repeating is preferably only utilized with a wayside 104 in a 'poor' location. For example, there may be locations where the terrain makes it impossible for the signal from the wayside radio to reach all locomotive radios within the required distance from the wayside 104 location. In this situation, another wayside radio or a base station radio can be used as a repeater to retransmit the WIU status message from the wayside 104 in the poor location.

The WIU status message is repeated in an FTDMA slot. Preferably, the repeater (either wayside or base station radio) retransmits the WIU status message in the same FTDMA cycle it receives, but in a different FTDMA slot. To implement this feature, the repeater maintains a table that specifies the following information for each message to be repeated: (1) the FTDMA slot and channel that the message will be received; (2) the FTDMA slot and channel to transmit the message; and (3) the slot size. (The table is configurable by the network engineer, preferably during remote radio setup, and then updated by the remote radio during operation).

The FTDMA slot in which the message is being received is must be scheduled before the FTDMA slot that message is being re-transmitted. The channel that the message is received on can be different from the channel on which the message is retransmitted.

For a base station 103 repeater, the receive channel can be any channel within the set of base station receive channels (e.g. channels 400 of FIG. 4), while the transmit channel should be the base local channel 400. The FTDMA slots for base station repeating are preferable at the end of the FTDMA cycle. In case that the base station radio repeats messages from multiple waysides 104, the receive channels for those messages may be different. For a wayside 104 repeater, all messages that the wayside 104 repeats should all be on the same receive channel.

Figure 27:
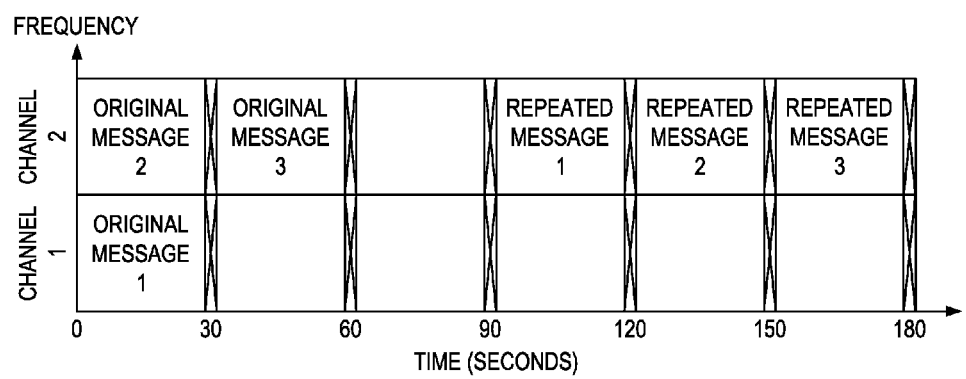
FIG. 27 is a diagram illustrating message timing during wayside status message repeating.

Table 27 shows an example of configuration table for WIU message repeating at a base station 103 radio. In this example, the base station radio repeats three WIU status messages, one message received in channel number 1 and two messages received in channel number 2. All three messages are re-transmitted in channel number 2. FIG. 27 shows the corresponding timing diagram of the messages received and repeated by the base station 103.

When the repeater receives a short broadcast data packet during an FTDMA cycle, the repeater determines whether the received packet carries the message to be repeated by checking the following criteria: (1) that the channel number that the message is received matches with that specified in the table; (2) that the FTDMA slot start in the packet header matches with that specified in the table; and (3) that the message size plus overhead is less than the slot size specified in the table. If all three criteria are met, the message is placed into the FDQ on the FTDMA slot specified in the table. The message is then transmitted in the FTDMA slot in the normal manner as the original WIU status message.

WIU message filtering allows a radio to filter broadcast messages received during an FTDMA cycle and thereby prevent those broadcast messages from being sent to the ELM. Advantageously, WIU message filtering reduces the traffic load going from the filtering radio to the ELM, as well as the amount of traffic that the radio must process.

In the IPTC system, the locomotive host (215, FIG. 2) must receive WIU status messages from its approaching wayside 104; however, since the locomotive radio does not know which WIU status messages that the locomotive host needs, the locomotive radio passes all the WIU status messages it receives to the ELM. The transmitter WIU host, on the other hand, does not require the WIU status messages and therefore the wayside radio can be configured to filter all WIU messages during the FTDMA cycle.

On the office side, central office 101 must receive the WIU status messages through at least one of the base stations 103. Redundancy of the WIU status messages is also desirable to increase the reliability of the system; therefore, central office 101 connects to multiple bases stations 104, each having a multi-channel radio 200 (FIG. 2) that listens to the same channels. Hence, without the filtering functionality, there would be many duplicate WIU status messages passed to central office 101. This adds up to a large amount of traffic load on the wired communication links between the base stations 103 and central office 101.

To reduce the amount of WIU status messages the base station radios pass to the ELM, the base station radios can be configured to pass only part of the messages during the FTDMA cycle to the ELM. In particular, to provide the WIU message filtering functionality, the link layer in each base station radio has a table that lists the channels and the durations within the FTDMA cycle from which the messages will be processed and passed to the ELM. This table is also configurable so that the network engineer can specify the filtering configuration for each radio.

The RF signal modulation schemes that are preferably used in the present IPTC system include differential quadrature phase shift keying (DQPSK) for linear modulation and continuous phase modulation (CPM) for constant envelope modulation. The given modulated waveform is transmitted in a 25 kHz wide channel, which is the aggregation of contiguous five 5-kHz channels in the 220 MHz band.

According to the applicable FCC regulations, signal waveforms transmitted in 220 MHz band must fit FCC Mask F, defined in 47 CFR 90.210 (f). Specifically, a 220 MHz transmission in a 25 kHz channel is required to fit FCC Mask 5×F.

Two default waveforms are 4FM and pi/4 DQPSK, discussed above. The 4FM waveform is a CPM waveform with 4-level frequency modulation and modulation index of 0.25. The 4FM waveform uses root raised cosine (RRC) pulse shaping filter with the roll-off factor of 0.35. It achieves the bit rate of 16 kbps in the 25 kHz channel under emission Mask 5×F. The Pi/4 DQPSK waveform is a DQPSK waveform with phase transitions rotated by 45°. The pi/4 DQPSK waveform uses RRC pulse shaping filter with the roll-off factor of 0.35. It achieves the channel bit rate of 32 kbps in the 25 kHz channel under emission Mask 5×F.

Radios 200 used in waysides 104 utilize the 4FM waveform for every transmission. Locomotive 102 radios 200 and base station 103 radios 200 can transmit using both pi/4 DQPSK and 4FM waveforms. Preferably, the locomotive and base station radios transmit with the pi/4DQPSK or 4FM waveform in the local channel 400 and with 4FM waveform in the common channel 404. Tables 28 and 29 summarize the preferred waveforms and channels.

The wayside configuration of radio 200 supports frequencies between 217.5 MHz and 222.0 MHz. In this case, radio 200 operates as a half duplex multi-channel radio that can receive up to two frequency channels simultaneously but cannot receive any channel while transmitting. The radio transmits using 4FM waveforms that can support the bit rate of up to 16 kbps in 25 kHz under FCC emission Mask F. A wayside radio can receive pi/4 DQPSK or 4FM waveforms.

For wayside radios 200, a first receive channel is set to common channel (400, FIG. 4) at the receive bit rate of 16 kbps. A second receive channel is set to a local channel (400, FIG. 4) of the connected base station 103. The receive bit rate in the local channel is set to the channel bit rate of the connected base station radio, which can be either 16 kbps or 32 kbps. (As discussed above, remote radios obtain the channel bit rate information from the base beacon signal.)

Figure 28:
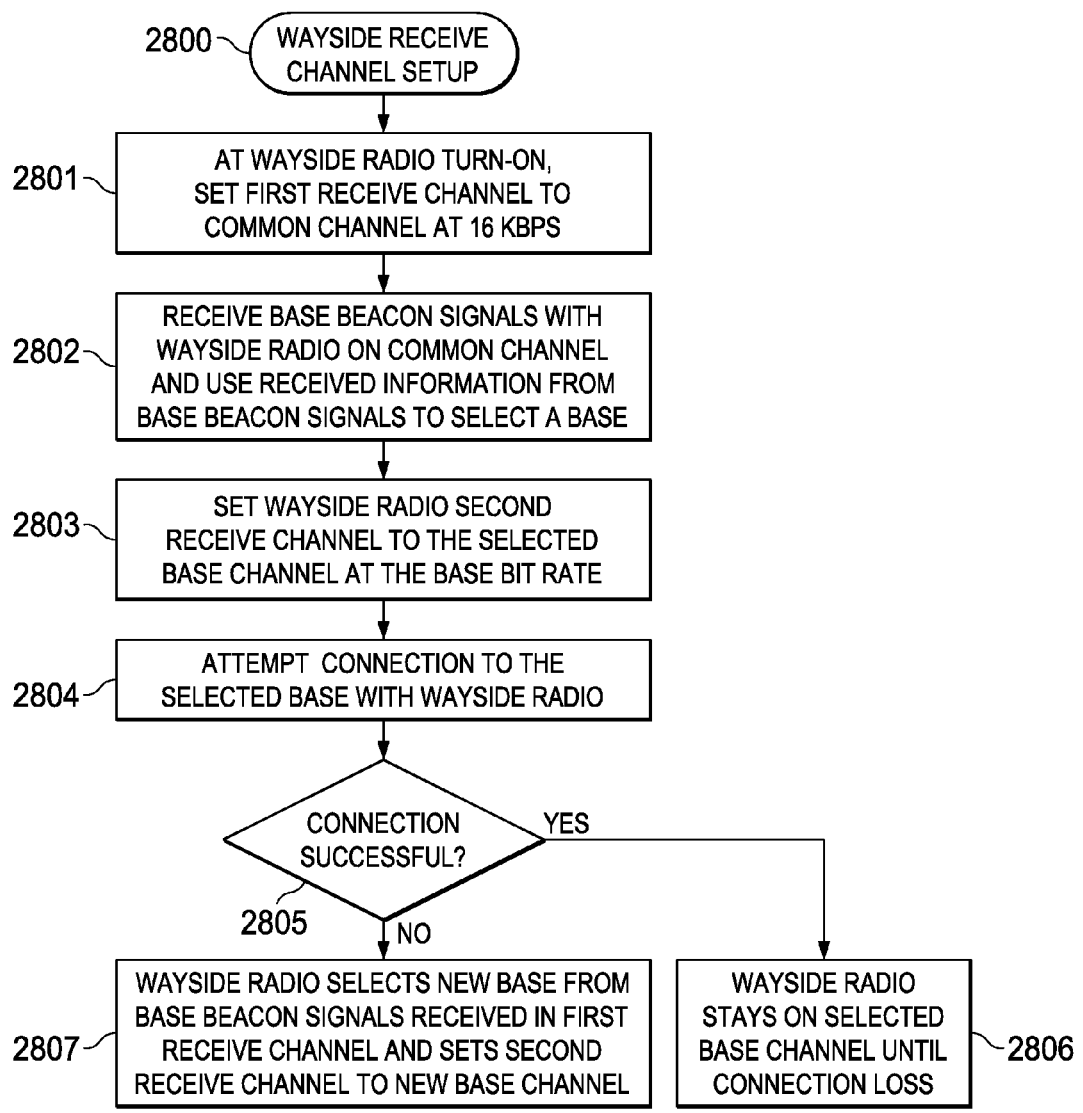
FIG. 28 is flow diagram of a preferred procedure for setting up receive channels in a wayside radio.

FIG. 28 is a preferred procedure 2800 for setting up the receive channels in a wayside radio. Starting at Block 2801, when the wayside radio is turned on, the first receive channel is set to common channel at rate 16 kbps. The wayside radio then receives base beacon signals in the common channel 404, and uses this information to select a base (Block 2802).

The wayside radio sets the second receive channel to the selected base channel at the base bit rate (Block 2803). At Block 2804, the wayside radio attempts to connect to the radio of selected base station 103. If the connection is successful (Block 2805), the radio wayside stays on the channel until the connection is lost (Block 2806). If the connection with a selected base station 103 fails or is lost, the wayside radio selects new base station 103 from base beacon signals received in the first channel 400, and sets the second receive channel to the new base station channel (Block 2807).

Table 30 summarizes the receive channel setup for a wayside radio. If the wayside radio requires support for WIU message repeating, a third receive channel is setup to receive these messages to be repeated at the bit rate of 16 kbps. Table 31 summarizes the receive channel setup for wayside radio with repeater capability.

On the transmit side, a wayside radio transmits at the rate of 16 kbps in every channel. Depending on data type, the transmit channel could be common channel 404, FTDMA channel 400, or a selected base station channel. The preferred transmit channel set up is summarized in Table 32.

For data, the SH code specifies which channel to transmit a data packet. Specifically, the SH code specifies if the channel is FTDMA, common, or local. For the data with the SH code indicating the local channel, data packets are transmitted in the selected base station 103 channel. The periodic WIU status message is sent in FTDMA channel, the WIU status response is sent in common channel 404, while a data message to base station 103 is sent in the local channel 400. For control packets, the data type indicates on which channel to transmit. Every control packet at a wayside radio is sent in the local channel (selected base channel) 400.

When transmitting in FTDMA channel, a wayside radio with GPS uses the 1 PPS timing from the GPS for timing synchronization. Optionally, the wayside radio can obtain the FTDMA slot timing from base timing signal, which is transmitted at the beginning of the superframe. Table 32 summarizes the transmit channel setup for wayside radios.

The locomotive configuration of SDR 200 supports frequencies between 217.5 MHz and 222.0 MHz, which operates in half duplex to receive up to eight frequency channels simultaneously but does not receive any channel while transmitting.

A locomotive 102 radio can transmit using both the pi/4 DQPSK and 4FM waveforms. The transmit bit rate is selectable between 16 kbps and 32 kbps in 25 kHz under FCC emission Mask F. The locomotive radios can receive both pi/4 DQPSK or 4FM waveforms. Locomotive radios support two-antenna receive diversity, in which signals are received from the two receive antennas to improve the performance of signal reception.

A locomotive radio sets one receive channel to the common channel (404, FIG. 4) at the receive bit rate of 16 kbps, one receive channel to the connected base station's local channel 404 at the receive bit rates of 16 kbps and the base station bit rate (if different from 16 kbps), and the rest of receive channels to neighbor base station local channels 400 at the bit rate of 16 kbps. A locomotive radio having a total of eight receive channels can therefore listen to seven local channels 400 simultaneously.

When a locomotive radio 200 is turned on or when that radio cannot hear or select any base station 103, one receive channel is set to common channel 404 and the rest are set to the default local channels 400. After the radio is able to hear and select a base station 103, the local channels 400 are set based on the information in the base beacon signal of the selected base station 103.

The common channel 404 and default local channels 400 are parameters that can be configured in the locomotive radio 200. For example, according to the IPTC receive channel numbers in Table 32, the common channel 404 can be set to channel number 1, and the default local channels 400 can be set to channel number 2 to 7. The default local channels preferably include all primary channels.

Figure 29:
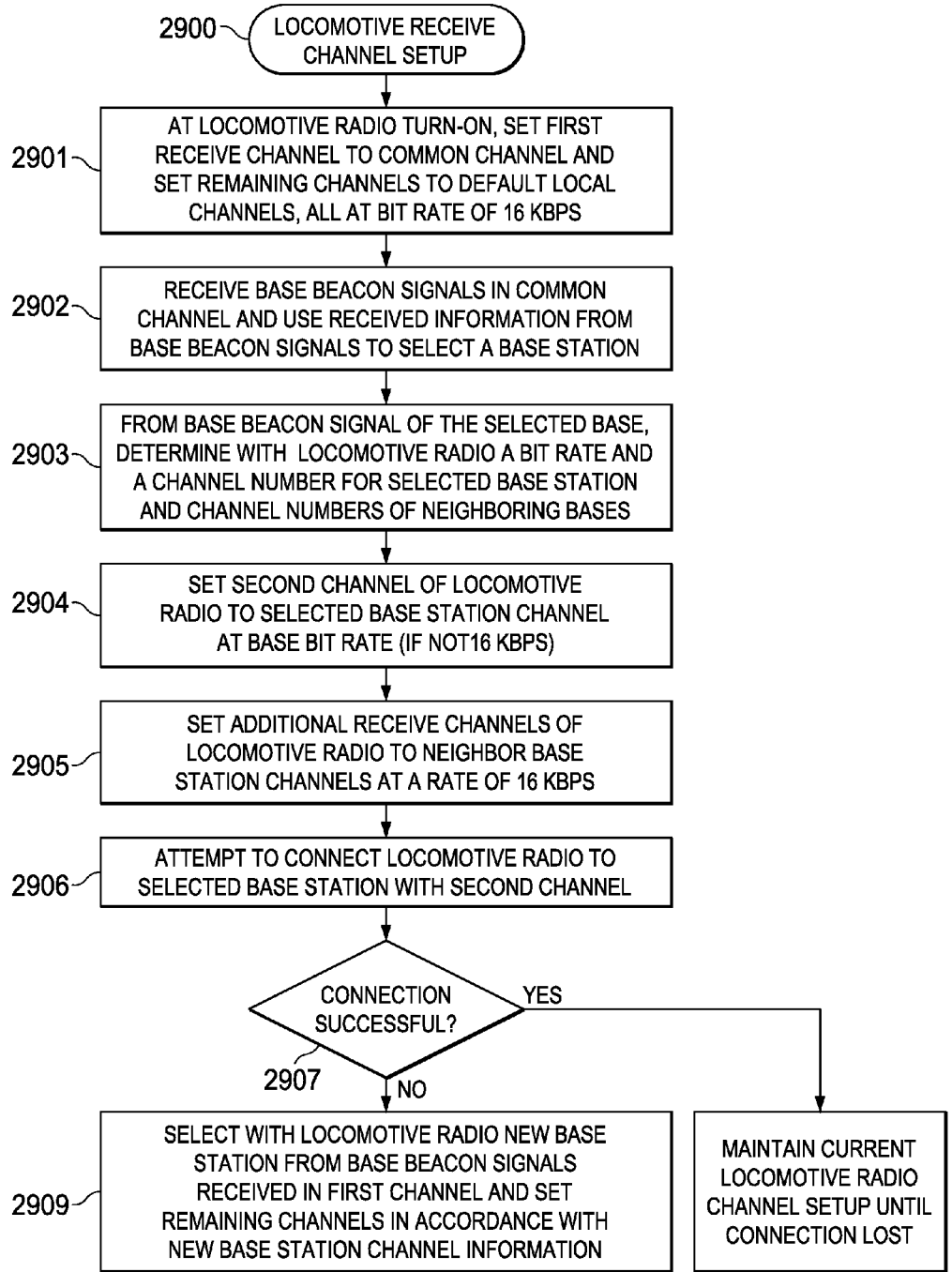
FIG. 29 is a flow diagram of a preferred procedure for setting up receive channels in a locomotive radio.

FIG. 29 illustrates a preferred procedure 2900 for setting up receive channels in a locomotive radio. At locomotive radio turn-on, a first receive channel is set to common channel (404, FIG. 4) at the bit rate of 16 kbps (Block 2901). The remaining receiving channels are set to the default local channels (400, FIG. 4) at the bit rate of 16 kbps. (Block 2901).

At Block 2902, the locomotive radio 200 receives base beacon signals in the common channel 404 and uses information from those base beacon signals to select a base station (103, FIG. 1). From the base beacon signal, the locomotive radio 200 gets information on the bit rate and channel number of the selected base and channel numbers of the selected base station's neighbors (Block 2903).

The locomotive radio sets the second receive channel to the selected base station channel at the bit rate of 16 kbps and the base bit rate (if the base bit rate is not 16 kbps) (Block 2904). The locomotive radio also sets receive channels 3-8 to the neighbor base station channels that are listed in the selected base's beacon signal with a receive bit rate of 16 kbps (Block 2905).

The locomotive radio tries to connect to the selected base station at Block 2906. If, at Block 2907, the connection is successful, the locomotive radio keeps this channel setup until the connection is loss (Block 2908). If the connection with a selected base station 103 is failed or lost, the locomotive radio selects the new base station 103 from base beacon signals received in the first channel, and sets the rest of the channels according to the new base station's channel information (Block 2909). If the locomotive radio losses the connection with the base station and cannot select any new base station, procedure 2900 returns to Block 2902.

Table 33 summarizes the receive channel setup for a locomotive radio.

On the transmit side, a locomotive radio can transmit either in the common channel 404 or in the selected base channel 400. For data messages, a locomotive radio transmits most messages in the local channel 400, and transmits the wayside status request in the common channel 404. The SH code that comes with the message specifies which channel that the messages will be transmitted. Locomotive radios transmit all control data in the selected base station channel 400.

For a locomotive radio, the transmit bit rate in the common channel 404 is always 16 kbps. The transmit bit rate in the local channel 400 is the selected base station bit rate, which is specified in the base beacon signal.

A locomotive radio does not require GPS for time synchronization. When transmitting in the local base channel, a locomotive radio relies on the DTDMA control packet from the base station 103 for slot timing and when transmitting in the common channel 404, the radio uses the CSMA scheme.

Table 34 summarizes the transmit channel setup for locomotive radios.

The base station radio configuration of SDR 200 supports frequencies between 217.5 MHz and 222.0 MHz and operates in a half duplex mode. In particular, a base station radio can receive up to eight frequency channels simultaneously, although it cannot receive any channel while transmitting.

Base station radios can transmit using both pi/4 DQPSK and 4FM waveforms, with a bit rate selectable between 16 kbps and 32 kbps in 25 kHz under FCC emission Mask F. Base station radios can receive using both pi/4 DQPSK or 4FM waveforms and can be configured to support the diversity, similar to the locomotive radio configuration.

For a base station radio, the receive channels are configured at setup. The configurable parameters include: (1) base channel number; (2) base bit rate; and (3) neighbor base channel numbers.

A base station radio sets one receive channel to the common channel (404, FIG. 4) at the receive bit rate of 16 kbps, one receive channel to the base local channel (400, FIG. 4) at the receive bit rates of 16 kbps and the base bit rate (if different from 16 kbps), and the rest of receive channels to neighbor bases local channels (400, FIG. 4) at the bit rate of 16 kbps. A base station radio can receive eight channels, which allows the base station to listen to six local channels simultaneously.

Table 35 summarizes the receive channel setup for base radio, for the case where the base station bit rate is configured to 32 kbps.

On the transmit side, a base station radio transmits either in the common channel 404 or in the base station channel (local channel) 400 of the associated base station 103. For data, the SH code indicates if the channel is common or local. For control data, the base station transmits the base beacon signal in common channel, and other data types in the local channel.

For a base station radio, the transmit bit rate in the common channel is always 16 kbps. The transmit bit rate in the local channel is the base bit rate which can be configured to either 16 kbps or 32 kbps.

Base station radios are time synchronized using GPS and coordinate their transmissions in the channels. Using the 1 PPS output of its GPS, the base radios can be synchronized to microsecond accuracy.

Table 36 summarizes the transmit channel setup for base radio.

Figure 30:
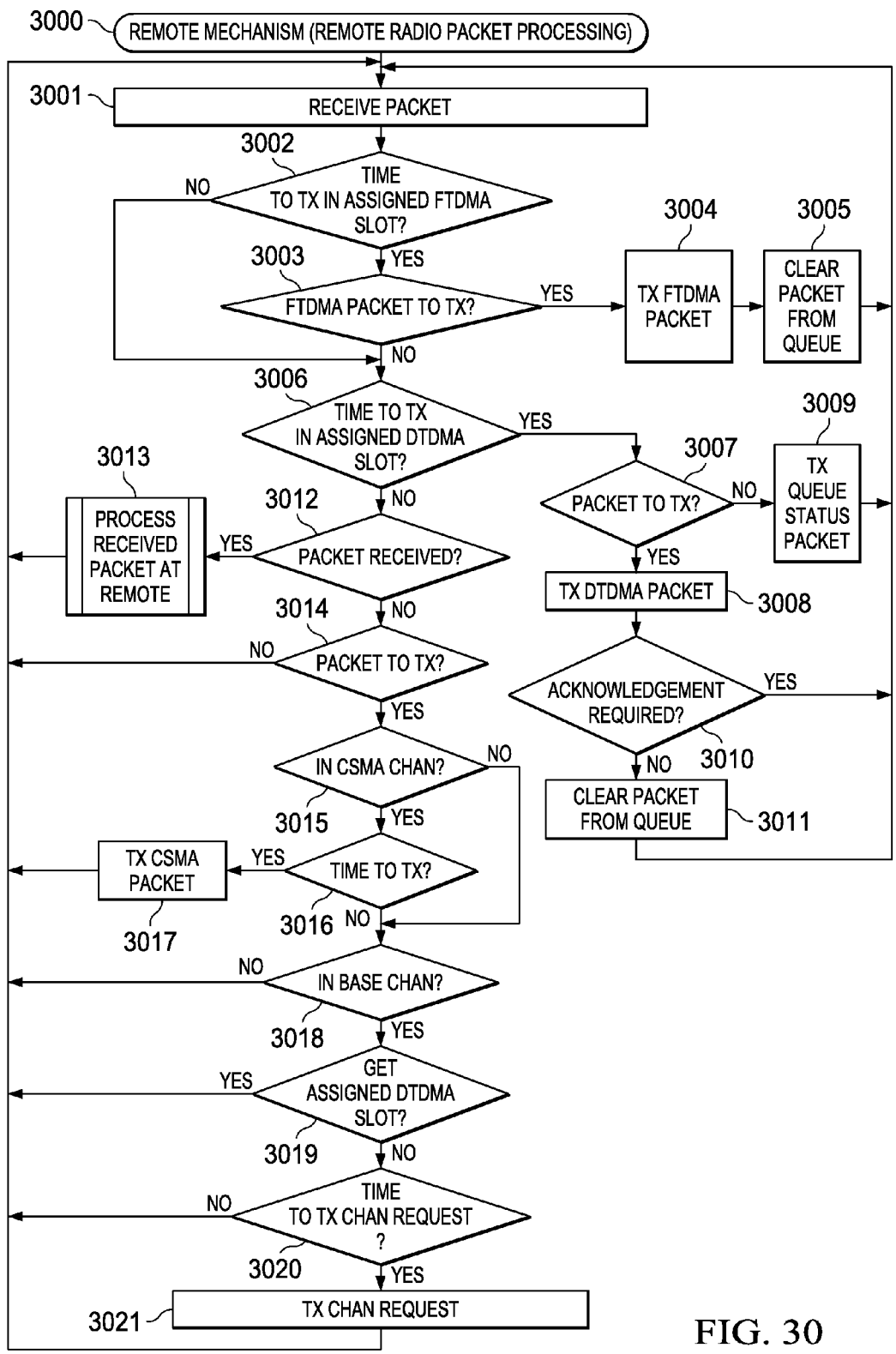
FIG. 30 is a flow diagram illustrating a preferred mechanism (procedure) for processing packet data at a remote radio.

FIG. 30 is a flow chart illustrating a preferred mechanism (procedure) 3003 for processing packet data at a remove radio. At Block 3001, a packet is received by the radio and at Block 3002 and determination is made as whether it is time to transmit the packet in the assigned FTDMA slot. If it is transmit time, then a determination is made as to whether the radio has a packet to transmit in the assigned FTDMA slot (Block 3003). If so, then the radio transmits the FTDMA packet in the assigned slot (Block 3004) and then clears the packet from the transmit queue (Block 3005). Procedure 3000 then returns to Block 3001 to wait for the next packet.

If it is not time to in FTDMA transmit (Block 3002) or the radio does not have a packet to transmit in the assigned FTDMA slot (Block 3003), then a determination is made as to whether it is time to transmit a packet in a DTDMA slot (Block 3006).

If it is time for transmitting in a DTDMA slot, and there is a DTDMA packet available to do so (Block 3007), then the packet is transmitted in the assigned DTDMA slot at Block 3008. After the transmission, a determination is made if an acknowledgment (ACK) is required (Block 3010). If an acknowledgement is not required, then the packet is cleared from the transmit queue at Block 3011, otherwise, procedure 3010 returns to Block 3001 to await the next packet and the acknowledgement.

If at Block 3007 there is no packet to transmit in the DTDMA slot, then at Block 3009 a transmit queue status packet is sent from the remote radio to the associated base station 103.

Returning to Block 3006, if it is not time to transmit in the assigned DTDMA slot, then at Block 3012 a check is made as to whether a packet has been received for local processing and if so, then at Block 3013, the received packet is processed at the remote. Block 3013 is described in detail in FIG. 31. Otherwise, procedure 3000 proceeds to Block 3014 for a determination of whether there is a packet to transmit outside of a FTDMA slot.

If the remote radio does not have a packet to transmit at Block 3014, then procedure 3000 returns to Block 3001. Otherwise, at Block 3015 a determination is made as to whether the packet will be transmitted in the CSMA channel. If so, and it is time to transmit (Block 3016), then the packet is transmitted as a CSMA packet (Block 3017). Procedure 3000 then returns to Block 3001 to await a packet.

If the packet to be transmitted will not be transmitted in the CMSA channel at Block 3015 or if it is not time to transmit the packet, then at Block 3018, a determination is made as to whether to transmit in the base station channel. If not, procedure 3000 returns to Block 3001, otherwise, a determination is made to get an assigned DTDMA slot (Block 3019). If so, procedure 3000 returns to Block 3001, otherwise at Block 3020 a determination is made as to where it is time to transmit a channel request. If so, that request is transmitted at Block 3021 and procedure 3000 returns to Block 3001, otherwise the procedure returns directly to Block 3001.

Figure 31:
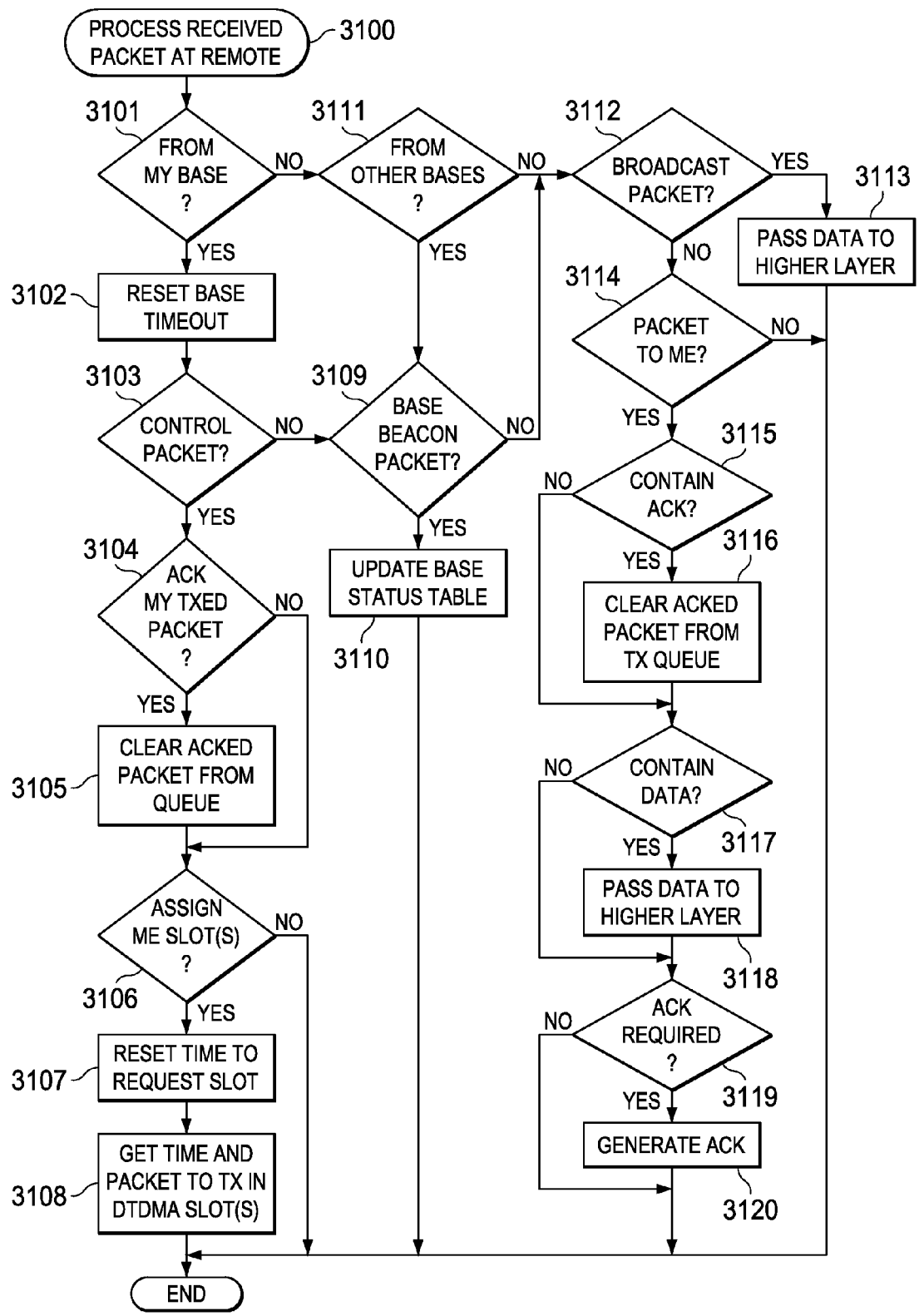
FIG. 31 is a flow diagram illustrating another remote radio packet processing mechanism (procedure)

FIG. 31 illustrates a mechanism (procedure) 3100 for processing a received packet at remote radio. At Block 3101, a determination is made as to whether a received packet is from the associated base station. If so, then at Block 3102 the base station timeout is reset.

At Block 3103, a determination is made as to whether the packet was a DTDMA control packet. If so, then a determination is made as to whether the packet contained an acknowledgement (ACK) of a packet previously transmitted by the remote radio (Block 3104). If so, the acknowledged packet is removed from the transmission queue (Block 3105).

After the acknowledged packet is removed from the transmission queue, or if the control packet did not contain an acknowledgement to a transmitted packet, then at Block 3106 a determination is made as whether one or more DTDMA slots were assigned to the remote radio. If not, then process 3100 ends for the current packet. Otherwise, the time to request a slot is reset (Block 3107) and a time and packet to transmit in the assigned DTDMA slots is obtained (Block 3108).

If the received packet was not a DTDMA control packet (Block 3103) then a check is made as to whether the packet is a base beacon packet (Block 3109). For a base beacon packet, the base status table is updated at Block 3110 and procedure 3100 ends for the current packet. The check for a base beacon packet is also made at Block 3109 if the current packet was received from a base station other than the currently associated base station (Blocks 3101, 3111).

If the current packet is not from another base station at Block 3101, or if the packet is not a base beacon packet at Block 3109, then at Block 3112, a determination is made as to whether the packet is a broadcast packet. If so, then the packet is passed to a high processing layer at Block 3113 and procedure 3100 ends. Otherwise, at Block 3114, a determination is made as to whether the packet is for the remote radio. If the packet is not for this radio, then procedure 3100 ends.

If the packet is for the remote radio at Block 3114, and if at Block 3115 the packet contains an acknowledgement (ACK), then at Block 3116 the corresponding acknowledged packet is cleared from the radio transmit queue. After the transmit queue is cleared or if the packet does not contain and ACK, then a determination is made at Block 3117 as to whether the packet contains data.

A packet that contains data is passed to a higher processing layer at Block 3118 and if the packet requires an ACK to the transmitting radio (Block 3119), that ACK is generated at Block 3120 and procedure 3100 ends. If the packet does not contain data at Block 3117 and no ACK is required at Block 3119, procedure 3100 similarly ends for the current packet.

Figure 32:
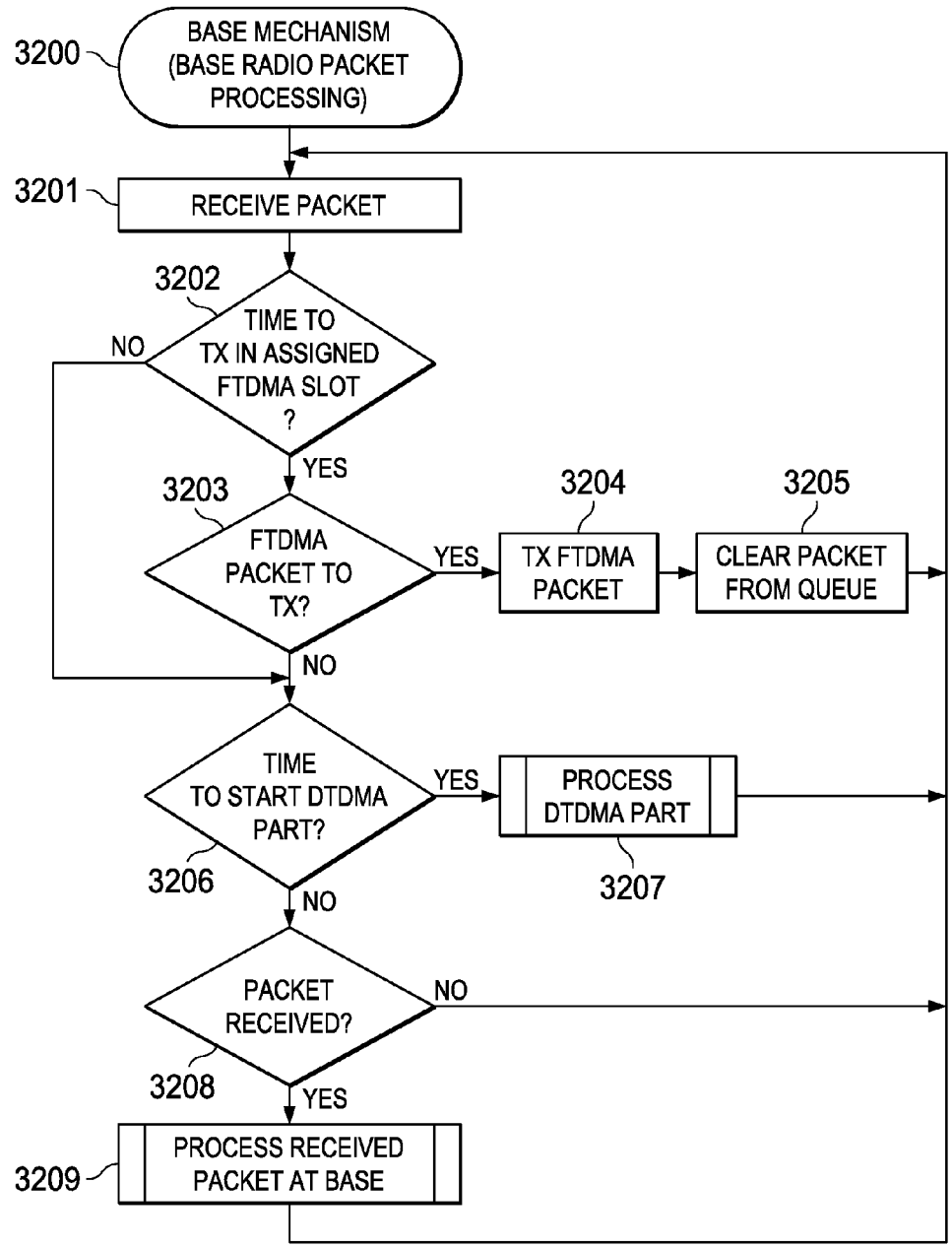
FIG. 32 is flow diagram of a preferred mechanism (procedure) for processing packet data at a base station.

FIG. 32 is a diagram of a base mechanism (procedure) 3200 for processing data packets at a base station 103. In procedure 3200, a packet is received at Block 3201. At Block 3202, a determination is made as to whether it is time to transmit in an assigned FTDMA slot. If so, and if a FTDMA packet is available to transmit (Block 3203), then the packet is transmitted (Block 3204) and the packet is cleared from the transmit queue (Block 3205). Procedure 3200 returns to Block 3201 to await the next packet.

Otherwise, if it is not time to transmit an FTDMA packet, or there is no FTDMA packet to transmit, then at Block 3206 a determination is made as to whether it is time to process the DTDMA partition of the superframe. If so, then at Block 3207 the DTDMA partition of the superframe is processed and procedure 3200 returns to Block 3201. Block 3207 is described in detail in FIG. 33.

If it is not time to process the DTDMA partition of the superframe, and a packet has been received (Block 3208), then at Block 3209 the packet is processed at the base station 103 and procedure 3200 returns to Block 3201. Otherwise, procedure 3200 returns directly to Block 3201. Block 3209 is described in detail in FIG. 34.

Figure 33:
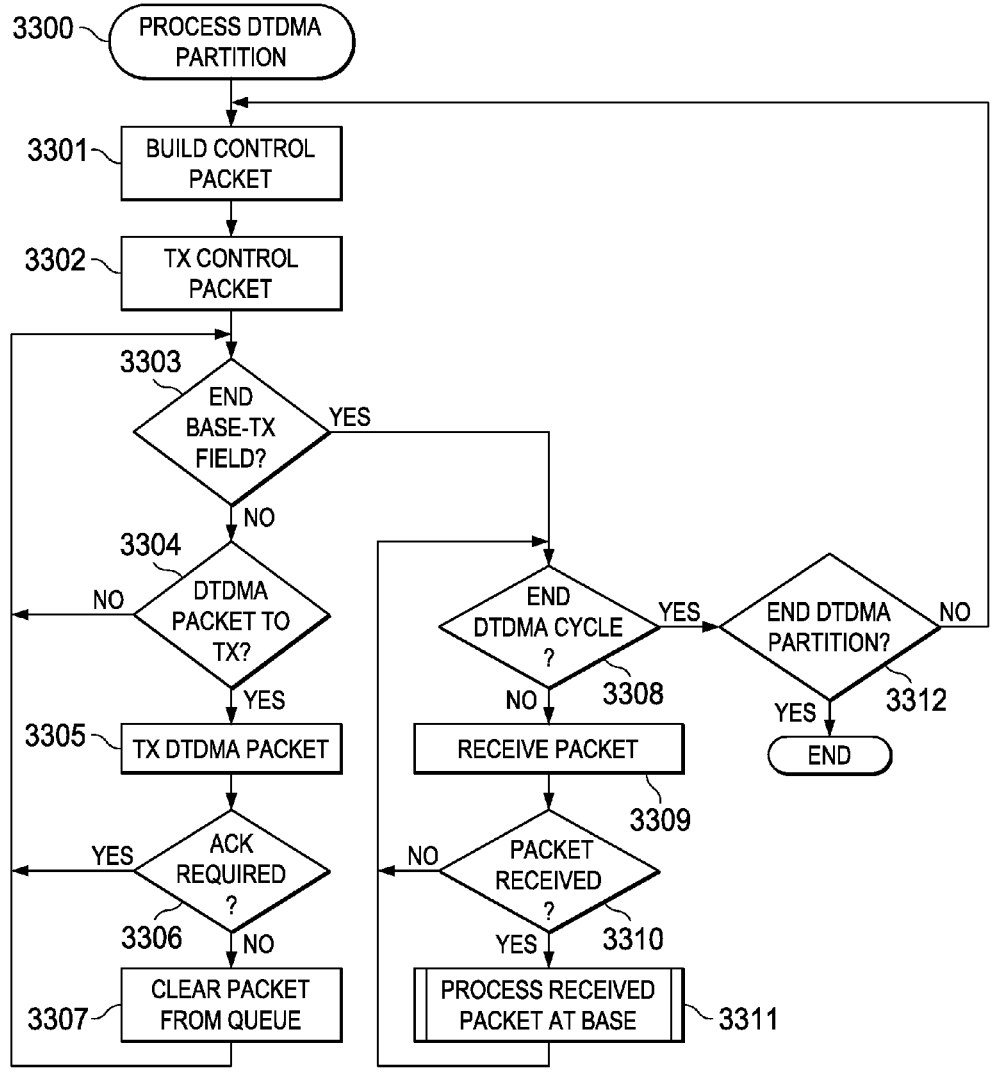
FIG. 33 is flow diagram of a preferred mechanism (procedure) for processing packet data at a base station.

FIG. 33 discloses a mechanism (procedure) 3300 for processing DTDMA partition at a base station 103. At Block 3301, a DTDMA control packet is built, which is then transmitted at Block 3302.

At Block 3303, a determination is made as to whether the base transmit field has been reached. If the end of the base transmit field has not been reached, and there is a DTDMA packet to transmit (Block 3304), then the DTDMA packet is transmitted (Block 3305). After the DTDMA packet is transmitted, a determination is made at to whether an acknowledgement is required. If the acknowledgement is not required, then at Block 3307 the packet is cleared from the transmit queue and procedure 3300 returns to Block 3303. Otherwise, if an acknowledgment is required, then procedure 3300 returns directly to Block 3303.

If the end of the base transmit field has been reached at Block 3303, then a determination is made at Block 3308 as to whether the end of the DTDMA cycle has been reached. If the end of the DTDMA cycle has not been reached, then at Block 3309 the base station is available to receive a packet. If a packet is received (Block 3310), then the received packet is processed at the base station at Block 3311. Otherwise, procedure 3300 returns to Block 3308. Block 3311 is described in detail in FIG. 34.

When the end of the DTDMA cycle is reached at Block 3238, and the end of the DTDMA partition is reached at Block 3312, then procedure 3300 ends for the current superframe. Otherwise, procedure 3300 returns to Block 3301.

Figure 34:
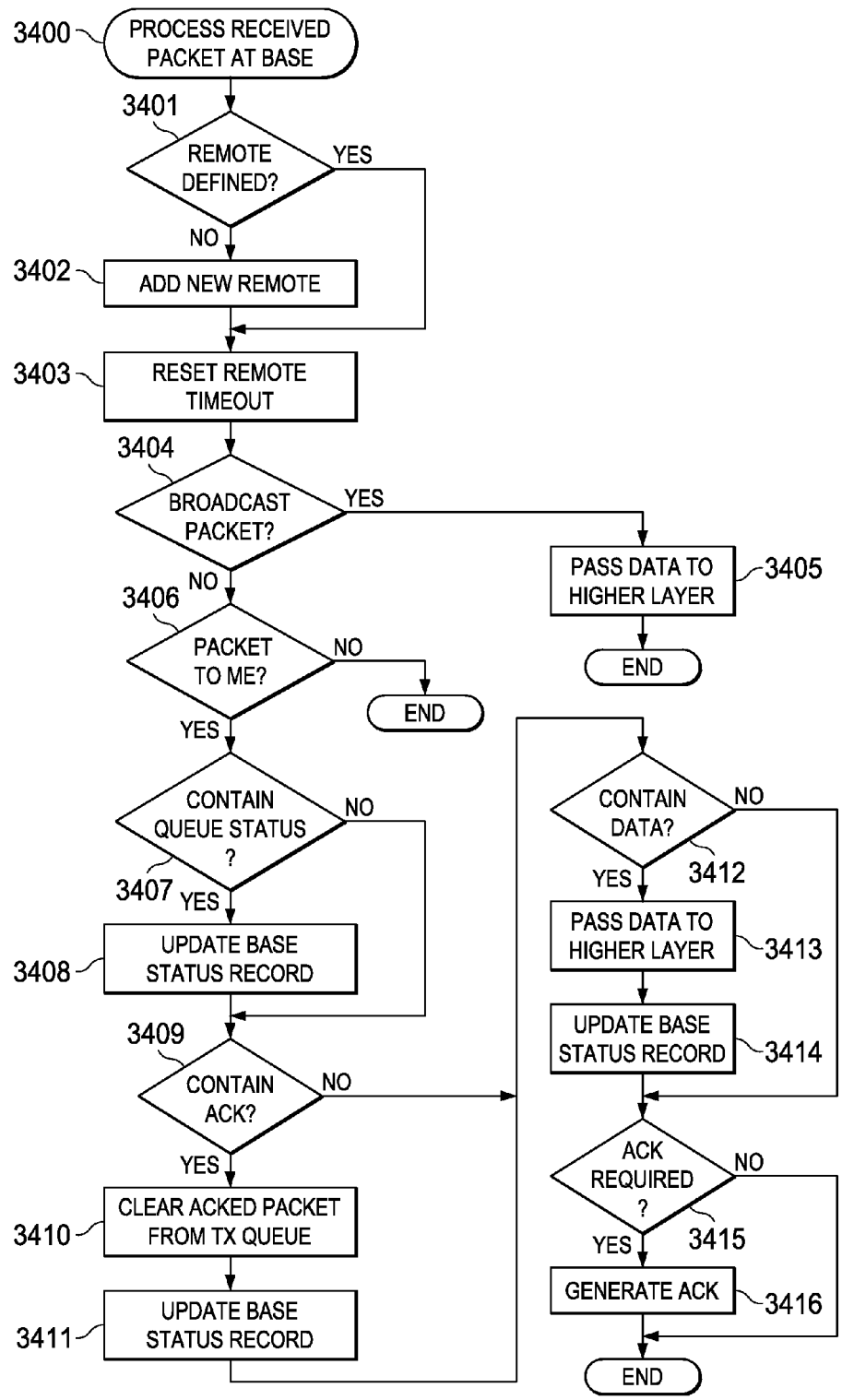
FIG. 34 is flow diagram of a preferred mechanism (procedure) for processing packet data at a base station.

FIG. 34 illustrates a mechanism (procedure) 3400 for processing a received packet at a base station 103. At Block 3401, a determination is made as to whether a remote radio transmitting the received packet has been defined at the base station. If so, then the remote timeout is reset at Block 3403, otherwise, the remote is added as a new remote communicating with the base station (Block 3402).

At Block 3404, a determination is made as to whether the received packet is a broadcast packet. If it is, then at Block 3405 the packet is passed to a higher layer for processing and procedure 3400 ends for the current packet.

If, at Block 3404, the received packet is not a broadcast packet, then a determination is made as to whether the received packet is for this base station 103 (Block 3406). If it is not for this base station 103, then procedure 3400 ends for the current packet.

Otherwise, if the packet is for this base station 103, then at Block 3407 a determination is made as whether the received packet includes queue status information for the transmitting remote radio. If the packet contains queue status information, then at Block 3408 the base station 103 updates its remote status records.

After the base station 103 updates its remote status records, or if the packet does not contain queue status information, then a determination is made as to whether the packet includes an acknowledgement (Block 3409). If the received packet contains an acknowledgement, then at Block 3410 the packet is cleared from the transmit queue (Block 3410) and the base status record is updated (Block 3411).

After the base status record has been updated, or if the received packet does not contain an acknowledgement, then at Block 3412 a determination is made as to whether the packet contains data. If the packet contains data, then those data are passed to a higher layer for processing (Block 3413) and the base status record is updated (Block 3414).

After the base status record has been updated, or if the received packet contains no data, then a determination is made as to whether an acknowledgement is required (Block 3415). If an acknowledgement is required, then the acknowledgement is generated at Block 3416, and procedure 3400 ends. Otherwise, procedure 3400 directly ends.

In ITCNET, DTDMA scheduling is a process for organizing traffic in the DTDMA cycles (403, FIG. 4). Preferably, DTDMA cycle organization and slot assignment is performed by a scheduler located in the base station stations 103. At the beginning of each DTDMA cycle, the scheduler determines the slot assignment for the base station 103 and connected remote radios, and then broadcasts the slot assignment in the DTDMA control field (703, FIG. 7).

Figure 35:
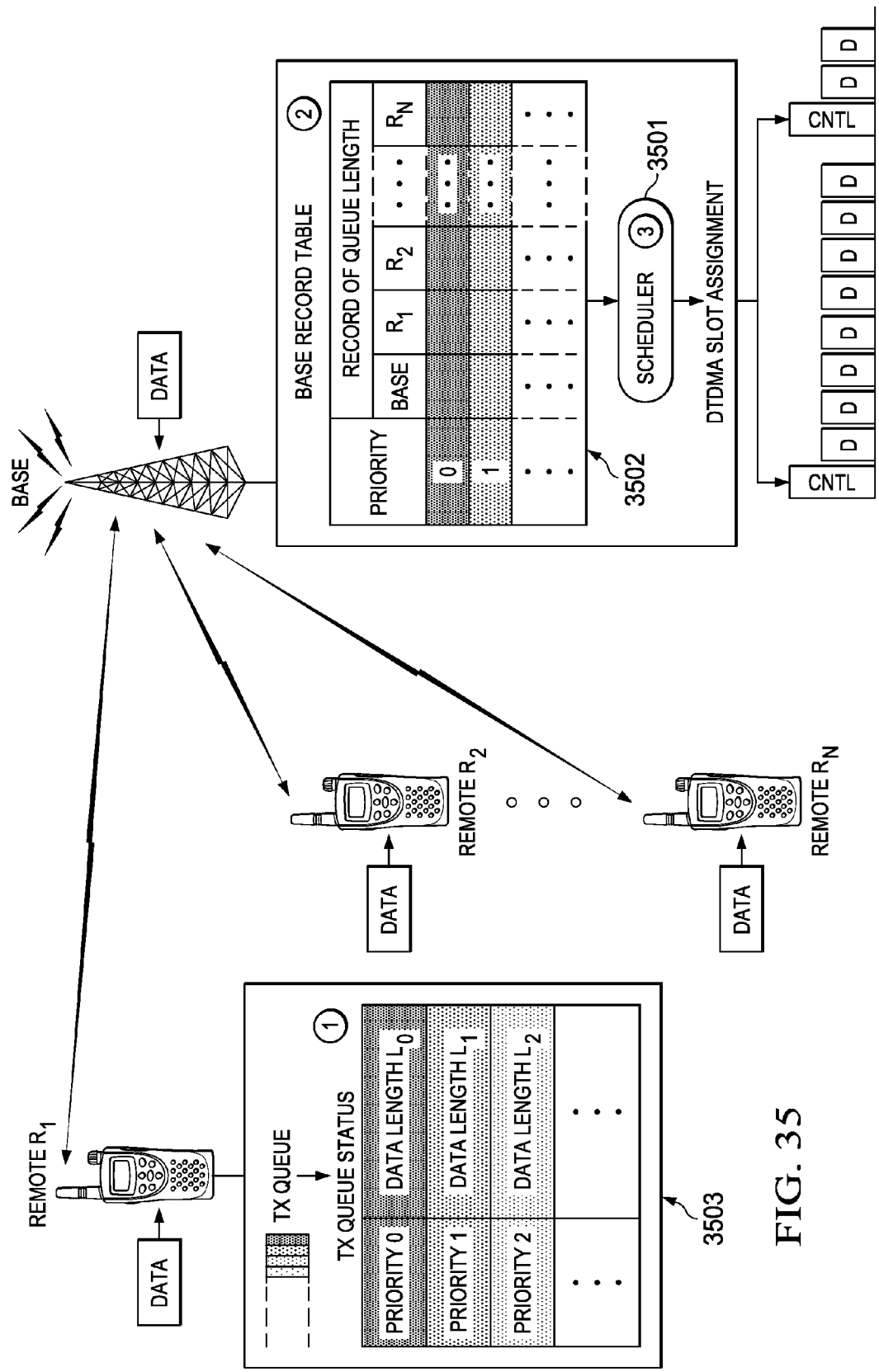
FIG. 35 is a diagram illustrating a preferred DTDMA scheduling procedure.

The preferred DTDMA scheduling generally involves three parts: (1) remote radio queue status update; (2) base record table management; and (3) DTDMA slot assignment. This process is shown in FIG. 35.

During remote radio queue status updating, scheduler 3501 receives information from each remote radio including the highest priority of the data in the given remote radio transmit queue (DDQ) and the number of data segments with the highest priority. The queue status information is included in the QSTAT packet (712, FIG. 7), which is sent from the remote radio to the base station 103 when either the remote radio initiates its connection with the base station 103, the remote radio does not have data to transmit, but gets assigned R-TX slot, or the remote radio has data to transmit but does not get assigned any R-TX slot for a certain period of time (e.g. because the waiting time is configurable based on data priority).

In the case where the remote radio is assigned an R-TX slot (703, FIG. 7), the QSTAT packet is sent in the R-TX slot. In case when the remote radio is not assigned R-TX slot, the QSTAT packet is sent in the HP-CSMA or AP-CSMA field (704, 705, FIG. 7). It takes one CSMA slot to send the QSTAT packet at rate of 32 kbps and takes two CSMA slots to send it at rate of 16 kbps. If the priority level is high enough, the remote radio can send the QSTAT packet in either HP-CSMA or AP-CSMA field. Otherwise, the remote radio can send the QSTAT packet only in the AP-CSMA field. The queue status information is also included in the ACK packet.

When the base station 103 receives queue status information from a remote radio, that the base station updates the information in the base record table 3502.

Base record table 3502, which is a record of the queue status information of the base station 103 and the associated remote radios, lists the number of segments that each node has at every priority level. The base record table is updated during the DTDMA cycle when the base station 103 successfully transmits or receives data packet from a remote radio.

In particular, when the base station 103 successfully receives a packet from a remote radio, the base station updates the queue status as follows. If the packet includes queue status information indicating that the remote radio queue is empty, the base station 103 updates the queue status of that remote radio to empty for every priority level and does not assign any more R-TX slots to that remote radio. If the packet includes queue status information indicating the highest priority of data in remote radio queue and the number of data segments at that priority, the base station 103 updates the queue status record at that priority accordingly. The base station 103 also sets the queue status of the remote radio at higher priority levels to empty (zero number of segments). If the packet is a data packet carrying data segments at a certain priority level, the base station 103 updates the record by reducing the number of segments in that priority level. If the reduced amount is less than $N_{min}$ segments, the base station updates the amount to $N_{min}$ segments. The parameter $N_{min}$ is configurable, with a default value of 6. The base station 103 also sets the queue status of the remote radio at higher priority levels to empty.

Table 37 shows an example of a base record table 3501. In this example, the priority levels range from 0 to L. The table has the record of K+1 nodes, with node 0 be the base station and nodes 1 to K are the remote radios associated with the base station. In the table, N(k,l) denotes the number of data segments that node k has at priority level l.

The queue status information from a remote radio k specifies the highest priority, $l_m$, and the number of segments in that priority, $N(k, l_m)$. If the remote radio transmit queue 3503 of FIG. 35 is empty, $l_m$ could be set to null or the lowest priority, and $N(k, l_m)$ is set to 0.

The queue status information of remote radio k in base record table 3502 is updated as follows. When the base receives the queue status information from remote radio k, $N(k, l_m)$ is set to the value in the remote radio queue status ($l_m$ is the highest priority) and N(k, l) is set to 0 for any $l > l_m$.

When the base station receives a packet with Ns data segments at priority $l_m$ from remote radio k, then:

$$N(k, l_m) = \begin{cases} N(k, l_m) - Ns, & \text{if } [N(k, l_m) - Ns] > N_{min} \\ N_{min}, & \text{otherwise;} \end{cases}$$

where $N_{min}$ is a configurable parameter, representing the minimum number of data segments to assign the R-TX slot. The default value for $N_{min}$ is 6. N(k, l) is set to 0 for any $l > l_m$ The queue status information of the base station (Node 0) in the base record table 3501 is updated based on the base station transmit queue 3503.

At the start of each DTDMA cycle (403, FIG. 4), scheduler 3501 determines the assignment of slots in the DTDMA cycle including the number and size of B-TX slots (706, FIG. 7) assigned to the base station 103, the number and size of R-TX slots (707, FIG. 7) assigned to each remote radio, as well as the number of HP-CSMA slots and AP-CSMA slots (708, FIG. 7). For the assignment of B-TX and R-TX slots, scheduler 3501 goes through each priority level in the base record table 3502 from highest to lowest. At each priority level, scheduler 3501 assigns the slots to each user based on information in the queue status record. In the same priority level, the slots are assigned to the users in a round-robin fashion.

The channel resources that can be assigned to a given user in one DTDMA cycle 403 are limited to a certain number, depending on the priority level.

Scheduler 3501 also assigns an R-TX slot to the remote radio after the BTX slot that the base station transmits an outbound packet to the remote radio. The R-TX slot is for the remote radio to acknowledge the reception of the base station outbound packet. The R-TX slot could be assigned to support the acknowledgement only or both data and acknowledgement.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

APPENDIX

TABLE 1

| Term | Definition |
|---|---|
| 4FM | 4-level frequency modulation—a type of constant envelop modulation |
| Base station (Base) | Fixed station that is connected to the central office through a hardwired backbone network |
| Broadcast | Transmission of data to all possible destinations. Any radio in the vicinity of the transmitter can receive broadcast data. |
| CDQ | Common channel data queue—transmit queue at the link layer in the radio that stores messages to be transmitted in the common channel |
| Channel | A specific radio frequency used for wireless communications |
| CSMA | Carrier Sense Multiple Access—A method of RF channel access where each radio randomly senses the state of the channel to be available before transmitting. |
| DDC | Digital down converter |
| DDQ | DTDMA data queue—transmit queue at the link layer in the radio that stores messages to be transmitted in the DTDMA partition |
| DQPSK | Differential quadrature phase-shift keying—a type of linear modulation |
| DSU | DTDMA slot unit—basic time element in DTDMA slot |
| DTDMA | Dynamic time division multiple access—A TDMA scheme with dynamic allocation of TDMA slots |
| ELM | External link manager—A software application that is the bridge between the ITC Messaging System and the ITC 220 MHz Network. |
| ERP | Effective radiated power—a standardized theoretical measurement of RF energy using the unit watts, and is determined by subtracting system losses and adding system gains. |
| FCC | Federal Communications Commission |
| FDQ | FTDMA data queue—transmit queue at the link layer in the radio that stores messages to be transmitted in the FTDMA slot |
| Field (TDMA field) | A group of TDMA slots that are of the same type in a TDMA cycle |
| FEC | Forward error correction—a system of error control for data transmission whereby the sender adds redundant information to its transmitted data |
| FSU | FTDMA slot unit—basic time element in FTDMA slot |
| FTDMA | Fixed time division multiple access—A TDMA scheme in which slot allocation to each particular user is fixed, i.e., stays the same in every TDMA cycle. |
| GPS | Global Positioning System—A space-based satellite system which provides position and time information at any location on a continuous basis. |
| HRX | Host/Radio eXchange -An application level protocol used for communications between a radio and an ELM. |
| Hz | Hertz—radio wave frequency of one cycle per second |
| Inbound | Direction of communication from a remote to an office |
| ITC | Interoperable train control |
| ITP | ITC transport protocol |
| ITCNET | Communication protocol, including the first 4 layers in the OSI model, designed to support wireless communications over 220 MHz channels in interoperable PTC system. |
| Message | Information data that is generated by a user in the application layer. |
| Message fragment | A fragmentation of a message that is transported from source to destination in the communication network |
| OSI model | Open System Interconnection Reference Model (also referred to as OSI seven layer model)—A standard layered description for communications and computer network protocol design published as part of the OSI initiative. |
| Outbound | Direction of communication from an office to a remote |
| Packet | A formatted unit of data carried in a communication network. The term packet can be used in both wired and wireless networks. For wireless network, the packet is also referred to as RF packet. |
| Peer to peer | Direct communications between two remotes |
| PTC 220, LLC | An organization which owns 220 MHz spectrum for use in the ITC Communications System. |
| QoS | Quality of Service |
| Radio ID | Radio identification - each ITC radio has a unique 3-byte radio ID |
| Remote | Fixed or mobile station that is not a base station (e.g. wayside, locomotive, or railroad vehicle). |
| RF | Radio frequency |
| RF Link | A communication path between two radios. |
| RF packet | A group of user data that is transmitted over an RF link in one transmission. An RF packet comprises control information (aka packet header) and user data (aka packet payload). |
| RRC | Root raised cosine—square root of the raised cosine function used as a transmit/receive filter |
| RX | Receive |
| SDR | Software defined radio |
| Segment | A group of 12 octets (8-bit bytes) of a message. This is the lowest level of fragmentation that a message or data packet is divided into for delivery over an RF Link. |
| Slot (TDMA slot) | A variable length allotment of time on an RF channel in TDMA cycle that is allocated or used by a single user. |
| Slotted CSMA | A CSMA scheme that divides channel into multiple time slots and allows the transmission to start only at the beginning of a slot. |
| Superframe | A period of three-second divided into a sequence of FTDMA and DTDMA cycles in which data transmissions may occur |
| TDMA | Time Division Multiple Access—A method of channel access that assigns time slots to each radio to transmit. Slots are assigned by default or are determined by each radio detecting which slots are not being used. |
| TX | Transmit |
| Unicast | Transmission of data to a single destination. Unicast data packet will contain a specific destination radio ID. |
| WIU | Wayside Interface Unit—Devices alongside the track that gather and pass along signal status, switch position, and track integrity information. |

TABLE 2

ITC channels and frequencies in the 220 MHz band

| 25 kHz Frequency Channel | ITC Channel | ITC Channel Type |
|---|---|---|
| 220.125-220.150 MHz | 1 | Common Channel |
| 220.400-220.425 MHz | 2 | Primary Local Channel |
| 220.425-220.450 MHz | 3 | Primary Local Channel |
| 220.750-220.775 MHz | 4 | Primary Local Channel |
| 221.125-221.150 MHz | 5 | Local Channel |
| 221.400-221.425 MHz | 6 | Local Channel |
| 221.425-221.450 MHz | 7 | Local Channel |
| 221.750-221.775 MHz | 8 | Local Channel |

TABLE 3

DTDMA slot type

| DTDMA Slot Type | Slot Size | Description |
|---|---|---|
| B-TX | Variable (integer multiple of DSU) | B-TX slot for base to transmit an outbound packet. |

TABLE 3-continued

DTDMA slot type

| DTDMA Slot Type | Slot Size | Description |
|---|---|---|
| R-TX | Variable (integer multiple of DSU) | R-TX slot for remote to transmit an RF packet which can be an inbound packet to the base or a peer-to-peer packet to another remote. |
| CSMA | Fixed (default = 2 DSU or 8 ms) | CSMA slot for transmission of queue status packet based on slotted CSMA protocol. The CSMA slot is of fixed length. The transmission of every CSMA packet starts at CSMA slot boundary. The queue status packet takes one CSMA slot to transmit at 32 kbps and takes two CSMA slots to transmit at 16 kbps. |

TABLE 4

DTDMA field type

| Field Type | Slot Type | Data | Description |
|---|---|---|---|
| Control | N/A | DTDMA control | Frame control field carries a frame control packet that specifies the DTDMA cycle structure. |
| B-TX | B-TX slot | Outbound, Broadcast | Base TX field carries data traffic from the base station. The data could be outbound data sent to a specific remote and broadcast to remotes. |
| R-TX | R-TX slot | Inbound, Peer-to-peer, Broadcast | Remote TX field carries data traffic from remotes. The data could be inbound data sent to the base, peer-to-peer data sent to another remote, broadcast data, or acknowledgement. |
| HP-CSMA | CSMA slot | Queue status | HP-CSMA field is reserved for remotes with high priority data to request access to the local channel by sending queue status packet |
| AP-CSMA | CSMA slot | Queue status | AP-CSMA field is for any remote to request access to the local channel by sending queue status packet |

TABLE 5

Description of items in an SH table

| Item | Values | Description |
|---|---|---|
| Channel | Local, Common, Local or Common | Specify the channel to transmit the message data |
| FTDMA | Yes, No | Specify whether the data is sent with FTDMA |
| Broadcast | Yes, No | Specify whether the data is broadcast |
| L3 Process | Yes, No | Specify whether to include the network layer (L3) overhead with the data message and to segment the message |
| Transmit radio ID | Yes, No | Specify whether to include the TX ID in the packet header |
| Receive radio ID | Yes, No | Specify whether to include the RX ID in the packet header |
| FEC | Yes, No | Specify whether to FEC en/decode |

TABLE 6

An example of SH table

| SH Code | Channel | FTDMA | Broadcast | L3 Process | TX ID | RX ID | FEC |
|---|---|---|---|---|---|---|---|
| 1 | Local | Yes | Yes | No | No | No | No |
| 2 | Common | No | Yes | No | Yes | No | Yes |
| 3 | Local or Common | No | Yes | No | Yes | No | Yes |
| 4 | Local | No | Yes | No | Yes | No | Yes |
| 5 | Common | No | Yes | No | Yes | No | Yes |
| 6 | Local | No | No | Yes | Yes | Yes | Yes |
| 7 | Common | No | No | Yes | Yes | Yes | Yes |

TABLE 7

List of ITC messages for each SH code

| SH Code | Message |
|---|---|
| 1 | Periodic WIU status |
| 2 | WIU status response |
| 3 | WIU beacon on |
| 4 | Proximity |
| 5 | WIU status request |
| 6 | Outbound/inbound messages |

TABLE 8

FTDMA slot configuration

| Slot Index | Slot Start (FSU) | Slot Length (FSU) |
|---|---|---|
| 1 | 0 | $L_1$ |
| 2 | $L_1$ | $L_2$ |
| 3 | $L_1 + L_2$ | $L_3$ |
| 4 | $L_1 + L_2 + L_3$ | $L_4$ |

TABLE 9

Types of control packets

| Control Packet Type | Description |
|---|---|
| DTDMA Control (CNTL) | CNTL packet controls the DTDMA cycle. The CNTL packet contains the structure of DTDMA cycle. It is sent by the base at the beginning of DTDMA cycle. |
| Queue Status (QSTAT) | QSTAT packet carries information on the status of remote transmit queue. The information includes the priority and amount of data with highest priority in the remote transmit queue. |
| Base beacon | Base beacon packet carries information of the base station. It is periodically broadcast by each base station, and used at the remote to select the base and set up local channels. |
| Acknowledgement (ACK) | ACK packet is sent from a remote to acknowledge the reception of the data packet from the base or another remote. |
| Acquire (ACQ) | ACQ packet is sent from remote or base to initiate the link connection and to keep the link connected. |
| Position report (POS) | POS packet is sent periodically from mobile remotes to base for proximity detection. |
| Base timing signal | Base timing packet is broadcast periodically form base at the beginning of FTDMA cycle to provide FTDMA slot timing. |

TABLE 10

Types of data packets

| Data Packet Type | Description |
| --- | --- |
| Short broadcast | Uncoded broadcast packet without transmit or receive radio ID |
| Long broadcast | Coded broadcast packet with transmit radio ID in the header |
| Unicast | Coded packet with transmit and receive radio IDs in the header |

TABLE 11

Category fields in the type byte

| Category Field | Category Name |
| --- | --- |
| 0 | Control |
| 1 | Data |

TABLE 12

An example of parameters in an alternative type byte

| Category | Type | SH Code | Packet Type |
| --- | --- | --- | --- |
| 0 | 0 | N/A | DTDMA Control (CNTL) |
| 0 | 1 | N/A | Queue Status (QSTAT) |
| 0 | 2 | N/A | Base beacon |
| 0 | 3 | N/A | Acknowledgement (ACK) |
| 0 | 4 | N/A | Acquire (ACQ) |
| 0 | 5 | N/A | Position report (POS) |
| 1 | 0 | 1 | Broadcast short |
| 1 | 1 | 2-5 | Broadcast long |
| 1 | 2 | 6-7 | Unicast |

TABLE 13

Description of short broadcast data packet fields

| Field | Length (bytes) | Description |
| --- | --- | --- |
| Preamble | 8 | Bit sync and frame sync pattern |
| Type | 1 | Packet type |
| Data length | 1 | Length in bytes of data in the packet (7 bits for length information and 1 parity bit) |
| Data | x | x-byte data (0-127 bytes) |
| CRCC | 2 | 16-bit CRCC |
| Total | 8 + 4 + x | |

TABLE 14

Description of long broadcast data packet fields

| Field | Length (bytes) | Description |
| --- | --- | --- |
| Preamble | 8 | Bit sync and frame sync pattern |
| Type | 1 | Packet type |
| TX ID | 3 | Transmit radio ID |
| Data length | 1 | Length in bytes of data in the packet |
| Data | x | x-byte data (x is a variable parameter) |
| CRCC | 2 | 16-bit CRCC |
| Total | 8 + 7 + x | |

TABLE 15

Description of unicast data packet fields

| Field | Length (bytes) | Description |
| --- | --- | --- |
| Preamble | 8 | Bit sync and frame sync pattern |
| Type | 1 | Packet type |
| TX ID | 3 | Transmit radio ID |
| RX ID | 3 | Receive radio ID |
| Serial number | 1 | Serial number of the message fragment |
| Sequence number | 1 | Sequence number of the first segment in this packet (max of 255 segments) |
| Priority | 4/8 | Priority of the data in this packet |
| Number of segments | 4/8 | Number of 12-byte data segment in this packet |
| Data segments | 12x | x 12-byte segments of data (x can be any integer from 0 to 15) |
| CRCC | 2 | 16-bit CRCC |
| Total | 8 + 12(x + 1) | 8 + 16(x + 1) bytes coded packet |

TABLE 16

Packet size and DTDMA slot size for unicast packet fields

| Number of Data Segments | Packet Size (bytes) | DTDMA Slot Size (DSU) 32 kbps | DTDMA Slot Size (DSU) 16 kbps |
| --- | --- | --- | --- |
| 1 | 40 | 3 | 6 |
| 2 | 56 | 4 | 8 |
| 3 | 72 | 5 | 10 |
| . | . | . | . |
| . | . | . | . |
| . | . | . | . |
| x | 8 + 16(x + 1) | x + 2 | 2x + 4 |

TABLE 17

Description of DTDMA control packet fields

| Field | Length (bytes) | Description |
| --- | --- | --- |
| Preamble | 8 | Bit sync and frame sync pattern |
| Type | 1 | Packet type |
| TX ID | 3 | Transmit radio ID |
| Sequence number | 1 | Rolling sequence number (1-255) incremented for each control packet |
| Packet Length | 1 | Length in bytes of control packet |
| Length of B-TX field | 1 | Length in DSU of B-TX field |
| Length of R-TX field | 1 | Length in DSU of R-TX field |
| Length of HP-CSMA field | 1 | Length in DSU of HP-CSMA field |
| Length of AP-CSMA field | 1 | Length in DSU of AP-CSMA field |
| No. of Slot Assignment Elements | 5/8 | Number of slot assignment elements (0-24) in the control packet |
| ACK Len | 3/8 | Length in bytes (0-3) of the ACK field in the control packet |
| ACK Bits ($A_0 \ldots A_{K-1}$) | v | Acknowledge bits. The bit $A_i$ each is used to ACK of inbound packet received in the R-TX slot i from the previous DTDMA cycle. 0 = NAK, 1 = ACK. v can be 0, 1, 2, or 3. |
| Slot assignment element | 4x | x 4-byte slot assignment element. Each element specifies the remote radio ID and slot size in DSU. |
| CRCC | 2 | 16-bit CRCC |
| Total | 8 + 13 + v + 4x | |

TABLE 18

Description of queue status packet fields

| Field | Length (bytes) | Description |
|---|---|---|
| Preamble | 8 | Bit sync and frame sync pattern |
| Type | 1 | Packet type |
| TX ID | 3 | Transmit radio ID |
| RX ID | 3 | Receive radio ID |
| Priority | 1 | Highest priority of data in the transmit queue (use only half byte) |
| Number of segments | 1 | Number of segments of data with highest priority |
| Check-in interval | 1 | |
| CRCC | 2 | 16-bit CRCC |
| Total | 8 + 12 | 24 bytes coded packet |

TABLE 19

Description of base beacon packet fields

| Field | Length (bytes) | Description |
|---|---|---|
| Preamble | 8 | Bit sync and frame sync pattern |
| Type | 1 | Packet type |
| Node State | 1 | Node state flag bits |
| TX-ID | 3 | Base radio ID |
| Latitude | 4 | Latitude of base |
| Longitude | 4 | Longitude of base |
| Base channel | 1 | Channel number of base local channel |
| Channel bit rate | 1 | Transmit bit rate of the base in DTDMA cycles. The bit rate can be either 16 kbps or 32 kbps. It can be pre-configured by network engineer or adaptable based on traffic demand. |
| Channel utilization | 1 | Ratio of the channel use to the channel available. This could be obtained from the ratio of the time that base assigns DTDMA slots for data transmission to the total available time for DTDMA cycles. |
| Neighbor base 1 channel | 1 | Channel number of neighbor base 1 |
| Neighbor base 2 channel | 1 | Channel number of neighbor base 2 |
| Neighbor base 3 channel | 1 | Channel number of neighbor base 3 |
| Neighbor base 4 channel | 1 | Channel number of neighbor base 4 |
| Neighbor base 5 channel | 1 | Channel number of neighbor base 5 |
| Neighbor base 6 channel | 1 | Channel number of neighbor base 6 |
| CRCC | 2 | 16-bit CRCC |
| Total | 8 + 24 | 40 bytes coded packet |

TABLE 20

Description of ACK packet fields

| Field | Length (bytes) | Description |
|---|---|---|
| Preamble | 8 | Bit sync and frame sync pattern |
| Type | 1 | Packet type |
| TX ID | 3 | Transmit radio ID |
| RX ID | 3 | Receive radio ID |
| Serial number | 1 | Serial number of the message fragment |
| Sequence number | 1 | Segment sequence number of the last segment received |
| Priority | 4/8 | Highest priority of data in the transmit queue |
| Number of Segments | 4/8 | Number of segments of data with highest priority |
| CRCC | 2 | 16-bit CRCC |
| Total | 8 + 12 | 24 bytes coded packet |

TABLE 21

Length of R-TX slots required to transmit an ACK packet

| Bit Rate | Length of R-TX Slots for ACK packet |
|---|---|
| 16 kbps | 4 DSU |
| 32 kbps | 2 DSU |

TABLE 22

Description of ACQ packet fields

| Field | Length (bytes) | Description |
|---|---|---|
| Preamble | 8 | Bit sync and frame sync pattern |
| Type | 1 | Packet type |
| UTI | 1 | Unit type identifier |
| TX ID | 3 | Transmit radio ID |
| RX ID | 3 | Receive radio ID |
| AVL | 1 | Data-available status bits |
| Flags | 1 | Node link state bits |
| CRCC | 2 | 16-bit CRCC |
| Total | 8 + 12 | 24 bytes coded packet |

TABLE 23

List of base data traffic in base-remote communications

| Channel | Bit Rate | Data Traffic |
|---|---|---|
| DTDMA in local channel | Base bit rate* | Application data (outbound/broadcast), ACK, ACQ |
| FTDMA in local channel | Base bit rate* | Base timing signal |
| Common channel | 16 kbps | Base beacon signal |

*Base bit rate can be configured to 16 kbps or 32 kbps

TABLE 24

List of remote data traffic in base-remote communications

| Channel | Bit Rate | Data Traffic |
|---|---|---|
| DTDMA in local channel | Base bit rate* | Application data (inbound), QSTAT, ACK, ACQ |
| FTDMA in local channel | Base bit rate* | — |
| Common channel | 16 kbps | — |

*Base bit rate can be configured to 16 kbps or 32 kbps

TABLE 25

An example of the base information table

| | ID | | |
|---|---|---|---|
| Unit Type | Base | Base | Base |
| Distance (miles) | D1 | D2 | D3 |
| Receive Signal Strength (dBm) | S1 | S2 | S3 |
| Transmit/ACK (T/A) ratio | R1 | — | — |
| RX Packet counts (packets) | N1 | N2 | N3 |
| Base Channel | C1 | C2 | C3 |
| Channel Bit rate (kbps) | 32 | 32 | 16 |
| Channel Utilization (%) | U1 | U2 | U3 |
| Common channel | C0 | C0 | C0 |
| Neighbor base 1 channel | C2 | C1 | C1 |
| Neighbor base 2 channel | C3 | C3 | C2 |

TABLE 25-continued

An example of the base information table

| | ID | | |
|---|---|---|---|
| Unit Type | Base | Base | Base |
| Neighbor base 3 channel | C4 | C4 | C4 |
| Neighbor base 4 channel | C5 | C5 | C5 |
| Neighbor base 5 channel | C6 | C6 | C6 |
| Neighbor base 6 channel | C7 | C7 | C7 |

TABLE 26

PTC Messages in wayside communications

| Message Type | Priority | Channel | Source | Access |
|---|---|---|---|---|
| WIU Status (Periodic) | 0 | Local | Wayside | FTDMA |
| WIU Status (Response) | 1 | Common | Wayside | CSMA |
| WIU Status Request | 1 | Common | Loco | CSMA |
| WIU Beacon on | 2 | Common | Loco | CSMA |

TABLE 27

Example of a configuration table for WIU message repeating functionality

| # | RX Channel Number | RX FTDMA Slot Start | TX Channel Number | TX FTDMA Slot Start | Slot Size |
|---|---|---|---|---|---|
| 1 | 1 | 0 | 2 | 90 | 30 |
| 2 | 2 | 0 | 2 | 120 | 30 |
| 3 | 2 | 30 | 2 | 150 | 30 |

TABLE 28

Waveform configuration

| Channel Bit Rate | Waveform | Pulse Shaping Filter | Roll-Off Factor | Bandwidth |
|---|---|---|---|---|
| 16 kbps | 4FM | Root Raised Cosine | 0.35 | 25 kHz |
| 32 kbps | Pi/4 DQPSK | Root Raised Cosine | 0.35 | 25 kHz |

TABLE 29

Radio transmit waveforms and channels

| Radio | Transmit Waveform | Channel |
|---|---|---|
| Wayside radio | 4FM | All |
| Locomotive radio | 4FM | Common |
| | Pi/4 DQPSK or 4FM | Local |
| Base radio | 4FM | Common |
| | Pi/4 DQPSK or 4FM | Local |

TABLE 30

Receive channel setup for wayside radios

| Receive Channel | Channel | Bit Rate |
|---|---|---|
| 1 | Common | 16 kbps |
| 2 | Selected Base | Base bit rate* |

*Base bit rate can be configured to 16 kbps or 32 kbps

TABLE 31

Receive channel setup for wayside radios with repeater capability

| Receive Channel | Channel | Bit Rate |
|---|---|---|
| 1 | Common | 16 kbps |
| 2 | Selected Base | Base bit rate* |
| 3 | Repeater RX | 16 kbps |

*Base bit rate can be configured to 16 kbps or 32 kbps

Transmit channel setup for wayside radios

| Transmit Channel | Channel | Bit Rate |
|---|---|---|
| 1 | Common | 16 kbps |
| 2 | FTDMA | 16 kbps |
| 3 | Selected Base | 16 kbps |

TABLE 33

Receive channel setup for locomotive radios

| Receive Channel | Frequency | Bit Rate |
|---|---|---|
| 1 | Common | 16 kbps |
| 2 | Selected Base | 16 kbps (and 32 kbps*) |
| 3 | Neighbor Base 1 | 16 kbps |
| 4 | Neighbor Base 2 | 16 kbps |
| 5 | Neighbor Base 3 | 16 kbps |
| 6 | Neighbor Base 4 | 16 kbps |
| 7 | Neighbor Base 5 | 16 kbps |
| 8 | Neighbor Base 6 | 16 kbps |

*If the selected base bit rate is 32 kbps

TABLE 34

Transmit channel setup for locomotive radios

| Transmit Channel | Frequency | Bit Rate |
|---|---|---|
| 1 | Common | 16 kbps |
| 2 | Selected Base | Base bit rate |

*Base bit rate can be either 16 kbps or 32 kbps

TABLE 35

Receive channel setup for base station radios

| Receive Channel | Frequency | Bit Rate |
|---|---|---|
| 1 | Common | 16 kbps |
| 2 | Base | 16 kbps (and 32 kbps*) |
| 3 | Neighbor Base 1 | 16 kbps |
| 4 | Neighbor Base 2 | 16 kbps |
| 5 | Neighbor Base 3 | 16 kbps |

TABLE 35-continued

Receive channel setup for base station radios

| Receive Channel | Frequency | Bit Rate |
|---|---|---|
| 6 | Neighbor Base 4 | 16 kbps |
| 7 | Neighbor Base 5 | 16 kbps |
| 8 | Neighbor Base 6 | 16 kbps |

TABLE 36

Transmit channel setup for base station radios

| Transmit Channel | Frequency | Bit Rate |
|---|---|---|
| 1 | Common | 16 kbps |
| 2 | Base | Base bit rate |

*Base bit rate can be configured to 16 kbps or 32 kbps

TABLE 37

Base record table

| Priority | Node 0 | Node 1 | ... | Node K |
|---|---|---|---|---|
| 0 | N(0, 0) | N(1, 0) | ... | N(K, 0) |
| 1 | N(0, 1) | N(1, 1) | ... | N(K, 1) |
| 2 | N(0, 2) | N(1, 2) | ... | N(K, 2) |
| . | . | . |  | . |
| . | . | . |  | . |
| . | . | . |  | . |
| L | N(0, L) | N(1, L) | ... | N(K, L) |

What is claimed is:

1. A method of messaging in a railroad communications system comprising:
generating a message with at an application layer implemented in a message processing system, the message associated with a message handling code;
passing the message and the message handling codes to a transport layer implemented within the message processing system;
fragmenting the message into a least one fragment at the transport layer;
passing the fragmented message and message handling codes to a network layer implemented within the message processing system;
selectively segmenting the fragmented message at the network layer as indicated by the message handling code;
passing the selectively segmented message and the message handling code to a link layer implemented within the message processing system;
forming a packet from the selectively segmented at the link layer, the packets including packet type information and data parts;
passing the packet to a physical layer implemented within the message processing system;
adding a preamble to the packet at the physical layer; and
transmitting the preamble and packet with a radio forming a part of the message processing system.

2. The method of messaging of claim 1, wherein:
the application layer is implemented on a host processor forming a part of the message processing system;
the transport layer is implemented with a link manager running on an associated processor forming a part of the message processing system; and
the network, link, and physical layers are implemented by the radio.

3. The method of messaging of claim 1, wherein the transport layer further provides time slot configuration information for use by the link layer for forming the packet.

4. The method of messaging of claim 1, wherein the preamble includes a bit synchronization pattern and a frame synchronization pattern.

5. The method of messaging of claim 1, further comprising:
receiving the preamble and the packet with a destination radio;
detecting the preamble with a physical layer implemented on the destination message processing system;
passing the packet to a link layer implemented on the destination message processing system;
validating the packet at the link layer implemented on the destination message processing system;
selectively performing forward error correction decoding on the data part of the validated packet in response to the packet type information at the link layer on the destination message processing system;
passing the selectively decoded data part of the validated packet and data handling information from the packet type information to a network layer implemented on the destination message processing system, wherein the decoded part of the packet comprises a data fragment at the network layer;
selectively routing the data fragment and the data handling information to a transport layer implemented on a selected processor at a selected destination node;
forming a message at the transportation layer implemented on the selected processor at the selected destination node to form a message; and
passing the message to an application layer running on a selected processor at the destination node.

6. The method of claim 1, wherein generating a message with at an application layer implemented in a message processing system further comprises associating the message with a priority code.

7. The method of messaging of claim 1, wherein the link layer is further operable to perform forward error correction encoding on the data parts of the packet in response to the message handling code.

8. The method of claim 7, wherein performing forward error correction encoding comprises performing forward error correction encoding on the data parts of the radio frequency packets and interleaving resulting encoded data blocks.

9. The method of messaging of claim 1, wherein transmitting comprises selectively transmitting using a selected one of fixed time division multiple access, dynamic time division multiple access, and carrier sense multiple access protocols in response to the message handling code.

10. The method of claim 9, wherein:
the physical, link, and transport layers implemented at the destination message processing system are implemented within the destination radio;
the transport layer is implemented by a link management processor; and
the application layer is implemented on a host processor at the destination node.

11. The method of claim 9, wherein validating the radio transmission packets comprises performing a cyclic redundancy check (CRC) on CRC data transmitted with each packet.

12. The method of claim 9, wherein selectively performing forward error correction decoding on the data part of the radio transmission packets comprises de-interleaving encoded blocks within each radio transmission packet and decoding resulting de-interleaved encoded blocks.

13. The method of claim 9, wherein the link layer of the destination message processing system passes decoded data to the network layer of the destination message processing system and the network layer of the destination message processing system assembles the segments into the data fragment.

14. A communications system including a message processing system operable to:
   generate a message and associated message handling codes at an application layer;
   fragmenting the message at a transport layer in accordance with a transport layer protocol;
   selectively segmenting the fragmented message in accordance with the associated message handling codes at a network layer;
   forming a packet including packet type information and data parts from the selectively segmented message at a link layer in accordance with the message handling codes; and
   adding a preamble to the packet a physical layer for transmission of the packet with a radio.

15. The communications system of claim 14, wherein the message processing system comprises:
   a host processor for performing operations at the application layer including generation of the message and the message handling codes; and
   a link manager running on an associated processor for performing operations at the transport layer including fragmenting the message in accordance with a transport layer protocol.

16. The communications system of claim 14, further comprising a radio operable to:
   perform network layer operations including selectively segmenting the fragmented message in accordance with the associated message handling codes;
   perform link layer operations including forming a packet having packet type information and data parts from the selectively segmented message in accordance with the message handling codes;
   perform physical layer operations including adding a preamble to the packet; and
   transmit the preamble and packet.

17. The communication system of claim 14, wherein the message processing system is further operable at the network layer to selectively append network layer overhead in accordance with the message handling codes.

18. The communications system of claim 14, wherein the message processing system is further operable at the link layer to include an error correction code in the packet in accordance with the message handling codes.

19. The communications system of claim 14, wherein the message processing system is further operable at the link layer to include a radio identification in the packet in accordance with the message handling codes.

20. The communications system of claim 14, wherein the message processing system is further operable at the link layer to determine a radio channel on which the packet is to be transmitted in accordance with the message handling codes.

* * * * *